(12) United States Patent
Schmidt et al.

(10) Patent No.: US 9,380,024 B2
(45) Date of Patent: *Jun. 28, 2016

(54) METHOD AND APPARATUS FOR PROVIDING SECURITY TO DEVICES

(71) Applicant: Interdigital Patent Holdings, Inc., Wilmington, DE (US)

(72) Inventors: Andreas Schmidt, Frankfurt am Main (DE); Andreas Leicher, Frankfurt (DE); Inhyok Cha, Gangnam-Ku (KR); Sudhir B Pattar, Mount Laurel, NJ (US); Yogendra C Shah, Exton, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/611,770

(22) Filed: Feb. 2, 2015

(65) Prior Publication Data
US 2015/0215281 A1    Jul. 30, 2015

Related U.S. Application Data

(62) Division of application No. 13/582,867, filed as application No. PCT/US2011/027287 on Mar. 4, 2011, now Pat. No. 8,949,997.

(60) Provisional application No. 61/314,395, filed on Mar. 16, 2010, provisional application No. 61/311,106, filed on Mar. 5, 2010.

(51) Int. Cl.
*H04L 29/06* (2006.01)
*H04L 9/32* (2006.01)
(Continued)

(52) U.S. Cl.
CPC .......... *H04L 63/02* (2013.01); *G06F 17/30327* (2013.01); *H04L 9/3234* (2013.01);
(Continued)

(58) Field of Classification Search
None
See application file for complete search history.

(56) References Cited

U.S. PATENT DOCUMENTS

2007/0224988 A1    9/2007    Shaheen
2008/0077801 A1    3/2008    Ekberg
(Continued)

FOREIGN PATENT DOCUMENTS

CN    101350044    1/2009
EP    2 146 300    1/2010
(Continued)

OTHER PUBLICATIONS

"TCG Mobile Trusted Module Specification", Specification version 1.0 Revision 6, Jun. 2008, 106 pages.
(Continued)

*Primary Examiner* — David Pearson
(74) *Attorney, Agent, or Firm* — Baker & Hostetler LLP

(57) ABSTRACT

Systems, methods, and apparatus are provided for generating verification data that may be used for validation of a wireless transmit-receive unit (WTRU). The verification data may be generated using a tree structure having protected registers, represented as root nodes, and component measurements, represented as leaf nodes. The verification data may be used to validate the WTRU. The validation may be performed using split-validation, which is a form of validation described that distributes validation tasks between two or more network entities. Subtree certification is also described, wherein a subtree of the tree structure may be certified by a third party.

10 Claims, 29 Drawing Sheets

(51) Int. Cl.
  *H04W 12/10*  (2009.01)
  *G06F 17/30*  (2006.01)
  *H04W 12/08*  (2009.01)
  *G06F 21/57*  (2013.01)

(52) U.S. Cl.
  CPC ............ *H04L9/3265* (2013.01); *H04W 12/08* (2013.01); *H04W 12/10* (2013.01); *G06F 21/57* (2013.01); *H04L 2209/30* (2013.01); *H04L 2209/805* (2013.01)

(56) References Cited

U.S. PATENT DOCUMENTS

| | | |
|---|---|---|
| 2008/0091945 A1 | 4/2008 | Princen et al. |
| 2008/0267114 A1 | 10/2008 | Mukherjee et al. |
| 2008/0288783 A1 | 11/2008 | Jansen et al. |
| 2009/0019551 A1 | 1/2009 | Haga et al. |
| 2010/0161998 A1 | 6/2010 | Chen et al. |
| 2010/0212017 A1 | 8/2010 | Li et al. |
| 2011/0173643 A1 | 7/2011 | Nicolson et al. |

FOREIGN PATENT DOCUMENTS

| | | |
|---|---|---|
| JP | 7-312592 | 11/1995 |
| JP | 2008-011573 | 1/2008 |
| JP | 2009-531972 | 9/2009 |
| JP | 2010-507328 | 3/2010 |
| WO | WO 01-06374 | 1/2001 |
| WO | WO 03-013062 | 2/2003 |
| WO | WO 2010-019916 | 2/2010 |

OTHER PUBLICATIONS

Gallery et al., "Trusted Mobile Platforms", Foundations of Security Analysis and Design IV, Aug. 2007, 42 pages.

Schmidt et al., "Tree-Formed Verification Data for Trusted Platforms", Computer Sciences>Cryptography and Security, Cornell University Library, Jul. 2010, 11 pages.

3rd Generation Partnership Project (3GPP), ETSI 132.583, "Universal Mobile Telecommunications System (UMTS); LTE; Telecommunication Management; Home Node(B) (HNB) Operations, Administration, Maintenance and Provisioning (OAM&P), Procedure Flows for Type 1 Interference HNB to HNB Management System (HMS)", 3GPP TS 32.583 V10.2.0 (Release 10), Oct. 2011, 22 pages.

Williams, D. and Sirer, E. G., "Optimal Parameter Selection for Efficient Memory Integrity Verification Using Merkle Hash Trees", Proceedings of the 3rd IEEE International Symposium on Network Computing and Applications, p. 383-388, 2004.

Japanese Application No. 2014-208128: Notice of Rejection dated Nov. 10, 2015, 3 pages.

Algorithm 1 Tree formation algorithm

Require: $V_1, \ldots, V_d \in \mathcal{V}$, $m \in \{0,1\}^{\times 160}$
Ensure: $V_1, \ldots, V_d = nil$ ▶ Initialize subtree roots empty.
1: $n \leftarrow 0$
2: while ($m$ RoTM) $\neq nil$ do ▶ Get new measurement.
3:     $m \rightarrow$ SML ▶ If non-empty, add as new leaf.
4:     if $(n)_d = 1$ then ▶ A value arriving from right
5:         $V_d \leftarrow V_d \diamond m$ ▶ extends the root at depth $d - 1$,
6:         $V_d \rightarrow$ SML ▶ which is purged to the SML.
7:     else ▶ If it is arriving from the left,
8:         $V_d \leftarrow m$ ▶ it is put into the root at depth $d - 1$,
9:         goto line 22 ▶ but not further.
10:     end if
11:     $k \leftarrow d - 1$ ▶ Update subtrees of depth $2, \ldots,$
12:     while $(n)_k = 1$ do ▶ as long as coming from right.
13:         $V_k \leftarrow V_k \diamond V_{k+1}$
14:         $V_k \rightarrow$ SML
15:         $k \leftarrow k - 1$
16:     end while
17:     if $k > 0$ then
18:         $V_k \leftarrow V_{k+1}$
19:     else
20:         break while and return "tree full"
21:     end if
22:     $n \leftarrow n + 1$
23: end while

*FIG. 4*

| Algorithm 2 | Cleanup of an incomplete tree |
|---|---|

```
24:  for k ← k - 1 to 1 do
25:     if (n)_k = 1   then
26:        V_k ← V_k ◊ V_{k+1}
27:        V_k → SML
28:     else
29:        V_k ← V_{k+1}
30:        V_k → SML
31:     end if
32:  end for
```

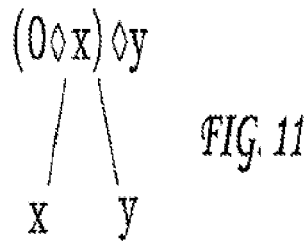

FIG. 11

---
Algorithm 1: Finding the first point of failure in a linearly linked hash chain
---

1. Let $i$ denote the start index and $j$ be the end index of the measurement chain being inspected. Therefore in the beginning, $i = 0$ and $j = n - 1$
2. Go to step 5 if $i = j$, else compute $V_{(j+i)/2}$, using $V_0$ and measurements $\{m_k : k = 0, 1.., (j+i)/2\}$, and compare it with the corresponding reference measurement $R_{(j+i)/2}$.
3. If they are equal, then we know that values $V_i$ to $V_{(j+i)/2}$ are good. Set $i = 1 + ((j+i)/2)$ and go back to step 2.
4. If they are unequal, then we know that the fault lies in values $V_i$ to $V_{(j+i)/2}$. Set $j = (j+i)/2$ and go back to step 2.
5. index $i$ is the first point of mismatch between $V_i$ and its reference value $R_i$ in the linear chain.

FIG. 12

```
Algorithm 2: Population of the binary tree with metrics
1.  Populate_metric (Node)
2.  {
3.      If (Node is leaf)
4.          Return H(component);
5.
6.      left_metric  = Populate_metric(Node->Left Child);
7.      right_metric = Populate_metric(Node->Right Child);
8.
9.      Node.metric = F(left_metric, right_metric);
10.
11.     Return Node_metric;
12. }
```

*FIG. 17*

```
Algorithm 3: Population of the tree with metrics using TPM commands
─────────────────────────────────────────────────────────────────────
1.  Reg_Number = 0
2.  Populate_metric (Node)
3.  {
4.     If (Node is leaf)
5.     {
6.        Node.metric = H(component);
7.        PCR_Register_{Reg_Number} = Node.metric;
8.        Reg_Number++;
9.        Return;
10.    }
11.
12.    Populate_metric(Node->Left Child);
13.    Populate_metric(Node->Right Child);
14.    Reg_Number--;
15.
16.    PCR_Register_{Reg_Number-1} = PCR_Extend(PCR_Register_{Reg_Number}, PCR_Register_{Reg_Number-1});
17.    Node.metric = PCR_Register_{Reg_Number-1};
18.
19.    Return;
20. }
```

*FIG. 18*

```
Algorithm 4: Population of the n-ary tree with metrics

1. Populate_metric (Node)
2. {
3.   If (Node is leaf)
4.     Return H(component);
5.   Metric_0 = Populate_metric(Node->Child_0);
6.   for ( I=1; i<n; i++ )
7.   {
8.     Metric_i = Populate_metric(Node->Child_i);
9.     Node.metric = F(Metric_i, Metric_(i-1));
10.  {
11.
12.  Return Node_metric;
13. }
```

FIG. 19

```
Algorithm 5: Population of the binary tree with surrogate child link

1. Populate_metric (Node)
2. {
3.   If (Node is leaf)
4.     Return H(component);
5.
6.   left_metric = Populate_metric(Node->Left Child);
7.   right_metric = Populate_metric(Node->Right Child);
8.
9.   Node.metric = F(left_metric, right_metric);
10.
11.  If (surrogate_link_present)
12.    Surrogate_metric = Populate_metric(Node->Surrogate Child);
13.
14.  Node.metric = F(Node.metric, Surrogate_metric);
15.
16.  Return Node_metric;
17. }
```

Algorithm 6: Compare and Prune algorithm to find the nodes and leaves with failed integrity checks

---

1. The comparison begins at the root. If the root metrics match then all nodes and leaves are intact and unmodified. Exit the algorithm.
2. If the metric do not match then continue the following steps.
3. Let $j=1$;
4. Compare all the nodes at depth $j$.
5. If the metrics at a particular node $n_{ij}$ at depth $j$ matches, then the node and the sub-tree under the node $n_{ij}$ is pruned. If the metrics at a particular node $n_{ij}$ at depth $j$ do not match then the children of the node at the depth $j$ are compared by setting $j=j+1$ and step 3 onwards is executed in recursion.
6. These steps are executed until the full depth of the tree is reached.
7. The remainder tree contains only the node and leaves with mismatched node or leaf measurement (which is considered to indicate an integrity-failed node or leaf).

*FIG. 21*

---
Algorithm 1 TPM_Reduced_Tree_Verify_Load
---
Require: $B_1, ..., B_\ell, V^* \in \mathcal{V}, ((n), n, R(n))$
Ensure: $B_1 \leftarrow r_1, ..., B_\ell \leftarrow r_\ell, V^* \leftarrow n$
    ▷ Initialize buffer with reduced tree and node to verify.
1. for $k = \ell, ..., 1$ do
2.     $V^* \rightarrow$ TSS
3.     $V^* \leftarrow (B_k | (n)_k | V^*)$
4. end for
5. if $V = V^*$ then
6.     return $V$
7. else
8.     return "verification error"
9. end if

*FIG. 22*

---
Algorithm 2 TPM_Reduced_Tree_Verify
---
Require: $B \in \mathcal{V}, ((n), n, R(n))$
Ensure: $B \leftarrow n$   ▷ Initialize buffer with node to verify.
1. for $k = \ell, ..., 1$ do
2.     $B \rightarrow$ TSS
3.     $B \leftarrow (r_k | (n)_k | B)$
4. end for
5. if $V = B$ then
6.     return $V$
7. else
8.     return "verification error"
9. end if

*FIG. 23*

---
Algorithm 3 TPM_Tree_Node_Verify
---
Require: $B, C, D \in \mathcal{U}, ((n), R(n), T(n))$
Ensure: $C \leftarrow V$ ▷ Initialise comparison register with root.
  1. for $k = 1, ..., \ell$ do
  2.    $B, D \leftarrow t_k$     ▷ Load trace child into buffers
  3.    $B \leftarrow (r_k|(n)_k|B)$
  4.    if $C = B$ then
     ▷ Compare result with current parent, and if OK,
  5.        $C \leftarrow D$
     ▷ make the trace element just verified the new parent.
  6.    else
  7.        return "verification error at level" $\| k, B$
  8.    end if
  9. end for
10. return "OK"

*FIG. 24A*

---
Algorithm 4 TPM_Reduced_Tree_Update
---
Require: $(n), n'$
Ensure: $B_1 = r_1, ..., B_\ell = r_\ell$
  1. $V \leftarrow n'$
  2. for $k = \ell, ..., 1$ do
  3.    $V \rightarrow$ TSS
  4.    $V \leftarrow (B_k|(n)_k|V)$
  5. end for
  6. return $V$

*FIG. 24B*

METHOD AND APPARATUS FOR PROVIDING SECURITY TO DEVICES

CROSS-REFERENCE TO RELATED APPLICATIONS

This application is a divisional of U.S. patent application Ser. No. 13/582,867, filed Nov. 12, 2012, which is the U.S. national stage of PCT/US2011/027287, filed Mar. 4, 2011, which claims the benefit of priority to U.S. Provisional Application No. 61/314,395, filed Mar. 16, 2010, and U.S. Provisional Application No. 61/311,106, filed Mar. 5, 2010, the disclosures of which are incorporated herein by reference in their entireties.

TECHNICAL FIELD

This application is related to providing security to devices.

BACKGROUND

With the advent of machine to machine communications (M2M), applications in e-Health, Geo-Tracking, Home Automation and Consumer Devices have been enabled. Many such applications require a network operator equipment to be placed in customer premises. Such equipments and the devices are subject to malicious attacks. In order to combat such malicious attacks, device integrity verification is required for such customer premise based equipment in addition to other forms of device protection including firewall and virus protection.

Several methods have been discussed for device integrity protection. These methods include a secure boot—where a trusted execution environment loads and executes the integrity verified software components only. But these methods require an unorganized set of measurements that may become cumbersome to manage in case the number of such measurements is very large. Hence what is required are methods and related apparatus that help in collecting, classifying and organizing the measurements to benefit efficient search of components that fail integrity.

SUMMARY

Various techniques for generating verification data are disclosed herein, including a method for generating verification data that may be used for validation of a wireless transmit-receive unit (WTRU). The WTRU may have one or more components and a secure environment with a number of secure registers. According to one embodiment, a value may be obtained, for each of a plurality of components of the WTRU, representing a measurement of the component of the WTRU. A measurement log (ML) may be generated containing a record of the component measurement values and other component-specific data may be stored on the WTRU. Verification data may be generated from the component measurement values for each component and the verification data may be stored in one or more of the secure registers within the trusted platform module. The verification data and the ML may be organized into a tree structure. The secure registers containing the verification data may define the roots of the tree structure. The ML may define inner nodes of the tree structure, and the measurement values contained in the ML may define leaves of the tree structure. The tree structure may be formed using a secure extend operation of the secure environment.

According to another embodiment, a value may be obtained representing a measurement of a component of a WTRU. Verification data may be generated from the measurement value and the verification data may be stored in a register within a secure environment on the WTRU. The measurement value may be stored at a leaf node in a tree structure. One or more extend operations may be performed within the secure environment to extend the value stored in the leaf node to a root node of said tree structure. The root node may include the data in the secure register in which the generated verification data is stored.

According to another embodiment, a method is described for validating tree-formed verification data generated by a wireless transmit/receive unit (WTRU). The tree-formed verification data may include verification data elements, a measurement log (ML), and component measurement values organized into a tree structure. The verification data elements may define the root nodes of the tree structure. The ML may define inner nodes of the tree structure. The component measurement values may define leaf nodes of the tree structure. The tree-formed verification data may be received in an organized tree structure. Starting from a verification data element at a root of the received tree-formed verification data, the tree structure may be traversed. As part of traversing the tree structure, values at branching nodes and child nodes of the branching nodes of the received tree structure may be compared to values at the same node positions of a reference tree. It may then be determined whether to validate the WTRU or an individual component of the WTRU based on the comparison of the node values.

According to another embodiment, a method is described for certifying a node value of a measurement log (ML) generated by a wireless transmit/receive unit (WTRU). The values of the ML may be stored as nodes of a tree structure comprising root nodes, inner nodes and leaf nodes. An attestation package may be received that indicates a node value to be certified by a subtree certificate authority (SCA). The node value may be recognized as a node value that can be certified by the SCA. A manifest associated with the node value may be created that includes validation information associated with the node value. A certificate for the node value may be created that is configured to bind the validation information to a secure environment of the WTRU. The certificate may be issued with the manifest and provided to the secure environment of the WTRU which stores the certificate in its ML.

Other features and aspects of the systems, methods and apparatus described herein will become apparent from the following detailed description and the associated drawings.

BRIEF DESCRIPTION OF THE DRAWINGS

The foregoing summary, as well as the following detailed description, is better understood when read in conjunction with the appended drawings. For the purpose of illustrating the systems, methods, and apparatus described herein, there is shown in the drawings exemplary embodiments; however, the invention is not limited to the specific methods and instrumentalities disclosed. In the drawings:

FIG. 4 shows an example of an algorithm (algorithm 1) showing tree formation;

FIG. 11 shows a correct configuration of values in every elementary triangle in the SML tree;

FIG. 12 shows an algorithm 1, for finding the first point of failure in a linearly hash chain;

FIG. 17 shows an algorithm 2—for determining population of the binary tree with metrics;

FIG. 18 shows an algorithm 3—for determining population of the tree using TPM commands;

FIG. 19 shows an algorithm 4—for determining population of the n-ary tree with metrics;

FIG. 20 shows an algorithm 5—for determining population of the binary tree with surrogate child link;

FIG. 21 shows a compare and prune algorithm 6—to determine the nodes and leaves with failed integrity checks;

FIG. 22 show an algorithm-1 showing TPM_reduced_Tree_Verify_Load;

FIG. 23 shows algorithm-2 showing TPM_reduced_Tree_Verify;

FIG. 24*a* shows algorithm-3 showing TPM_Tree_Node_Verify;

FIG. 24*b* shows algorithm-4 showing TPM_Reduced Tree_Update;

DETAILED DESCRIPTION OF ILLUSTRATIVE EMBODIMENTS

Figure 1:
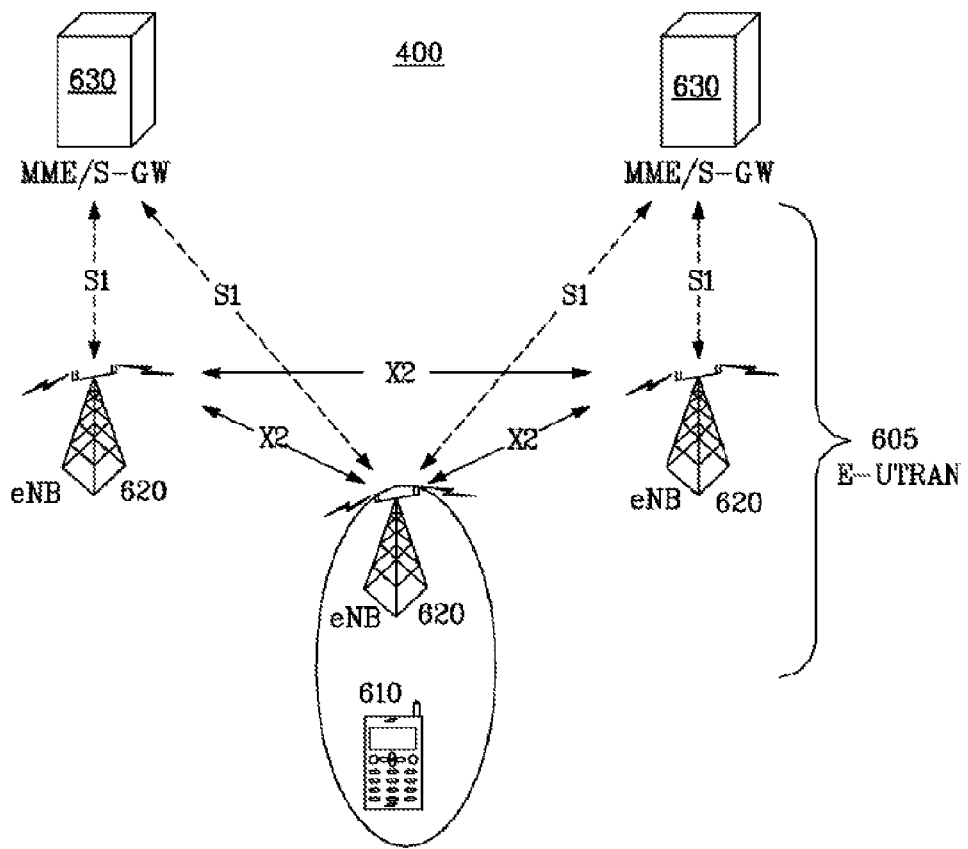
FIG. 1 shows an example Long Term Evolution wireless communication system/access network.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. When referred to hereafter, the terminology "base station" includes but is not limited to a Node-B, a site controller, an access point (AP), or any other type of interfacing device capable of operating in a wireless environment.

Various techniques for generating verification data are disclosed herein, including a method for generating verification data that may be used for validation of a wireless transmit-receive unit (WTRU). The WTRU may have one or more components and a secure environment with a number of secure registers. A secure environment may include a secure hardware and/or software environment that provides a secure execution environment. For example, the secure environment may be a trusted platform module (TPM), a smart card a Universal Integrated Circuit Card (UICC), or any combination thereof. The secure environment may be used to protect secured functions, such as cryptographic functions for example, secure resources, such as operation registers for example, memory, random number generators, timers, and/or clocks for example.

According to one embodiment, verification data may be generated by obtaining a value, for each of a plurality of components of the WTRU, representing a measurement of the component of the WTRU. A measurement log (ML) may be generated containing a record of the component measurement values and other component-specific data may be stored on the WTRU. Verification data may be generated from the component measurement values for each component and the verification data may be stored in one or more of the secure registers within the trusted platform module. The verification data and the ML may be organized into a tree structure. The secure registers containing the verification data may define the roots of the tree structure. The ML may define inner nodes of the tree structure, and the measurement values contained in the ML may define leaves of the tree structure. The tree structure may be formed using a secure extend operation of the secure environment.

According to another embodiment, a value may be obtained representing a measurement of a component of a WTRU. Verification data may be generated from the measurement value and the verification data may be stored in a register within a secure environment on the WTRU. The measurement value may be stored at a leaf node in a tree structure. One or more extend operations may be performed within the secure environment to extend the value stored in the leaf node to a root node of said tree structure. The root node may include the data in the secure register in which the generated verification data is stored.

According to another embodiment, a method is described for validating tree-formed verification data generated by a wireless transmit/receive unit (WTRU). The tree-formed verification data may include verification data elements, a measurement log (ML), and component measurement values organized into a tree structure. The verification data elements may define the root nodes of the tree structure. The ML may define inner nodes of the tree structure. The component measurement values may define leaf nodes of the tree structure. The tree-formed verification data may be received in an organized tree structure. Starting from a verification data element at a root of the received tree-formed verification data, the tree structure may be traversed. As part of traversing the tree structure, values at branching nodes and child nodes of the branching nodes of the received tree structure may be compared to values at the same node positions of a reference tree. It may then be determined whether to validate the WTRU or an individual component of the WTRU based on the comparison of the node values.

According to another embodiment, a method is described for certifying a node value of a measurement log (ML) generated by a wireless transmit/receive unit (WTRU). The values of the ML may be stored as nodes of a tree structure comprising root nodes, inner nodes and leaf nodes. An attestation package may be received that indicates a node value to be certified by a subtree certificate authority (SCA). The node value may be recognized as a node value that can be certified by the SCA. A manifest associated with the node value may be created that includes validation information associated with the node value. A certificate for the node value may be created that is configured to bind the validation information to a secure environment of the WTRU. The certificate may be issued with the manifest and provided to the secure environment of the WTRU which stores the certificate in its ML.

Structured validation is a validation methodology where the data and the operational aspects of validation are structured. Separate but related concepts and methods of structured validation are described herein. For example, Tree-formed Validation (TFV) is described herein, with a focus on a method that uses subtree certification; extensions and variants of TFV, and Split validation, where validation tasks are distributed between two or more networked entities which allows the network entities to perform device integrity validation for (connected) devices in a distributed manner such that each validating entity may not necessarily have to validate the whole device but may validate parts thereof.

FIG. 1 shows a Long Term Evolution (LTE) wireless communication system/access network 400 that includes an Evolved-Universal Terrestrial Radio Access Network (E-UTRAN) 605. The E-UTRAN 605 includes a WTRU 610 and several evolved Node-Bs, (eNBs) 620. The WTRU 610 is in communication with an eNB 620. The eNBs 620 interface with each other using an X2 interface. Each of the eNBs 620 interfaces with a Mobility Management Entity (MME)/Serving Gateway (S-GW) 630 through an S1 interface. Although a single WTRU 610 and three eNBs 620 are shown in FIG. 1, it should be apparent that any combination of wireless and wired devices may be included in the wireless communication system access network 600.

Figure 2:
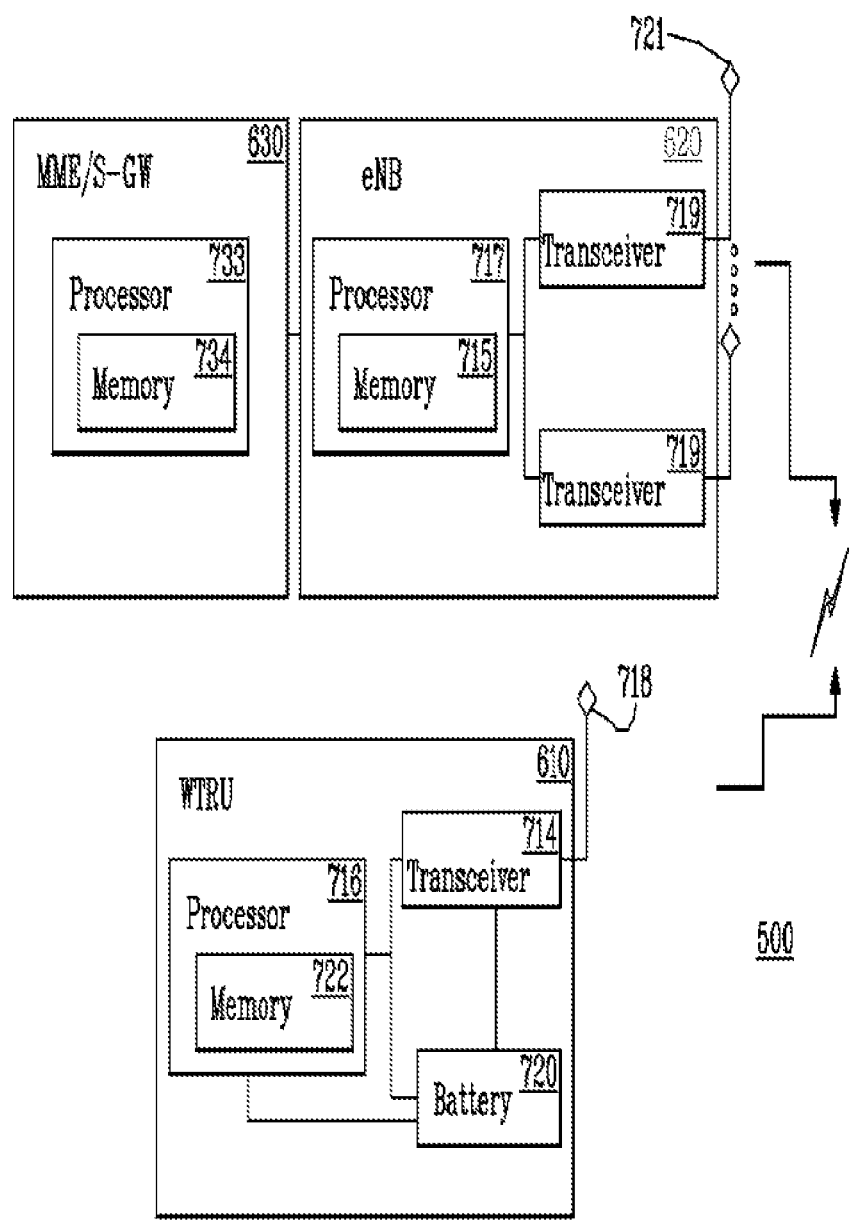
FIG. 2 is an example block diagram of the Long Term Evolution wireless communication system of FIG. 1.

FIG. 2 is an example block diagram of an LTE wireless communication system 500 including the WTRU 610, the eNB 620, and the MME/S-GW 630. As shown in FIG. 2, the WTRU 610, the eNB 620 and the MME/S-GW 630 are configured to perform a method for providing security to devices.

In addition to the components that may be found in a typical WTRU, the WTRU 610 includes a processor 716 with an optional linked memory 722, at least one transceiver 714, an optional battery 720, and an antenna 718. The processor 716 is configured to perform a method for providing security to devices.

The transceiver 714 is in communication with the processor 716 and the antenna 718 to facilitate the transmission and reception of wireless communications. In case a battery 720 is used in the WTRU 610, it powers the transceiver 714 and the processor 716.

In addition to the components that may be found in a typical eNB, the eNB 620 includes a processor 717 with an optional linked memory 715, transceivers 719, and antennas 721. The processor 717 is configured to perform a method for providing security to devices. The transceivers 719 are in communication with the processor 717 and antennas 721 to facilitate the transmission and reception of wireless communications. The eNB 620 is connected to the Mobility Management Entity/Serving Gateway (MME/S-GW) 630 which includes a processor 733 with an optional linked memory 734.

Generally, to ensure device integrity, a measurement (such as a cryptographic hash value for example) of the software/firmware or of the hardware is performed and compared against a trusted reference value. This comparison of the measurement or any function or grouping of such measurements (known as verification data) against the trusted reference value(s) may be performed in the device internally (autonomous validation) or externally by a validation entity (semi-autonomous or remote validation). In case of semi-autonomous and remote validation, measurements may be sent as an unorganized set in a payload which may be encrypted, integrity protected and cryptographically certified.

To find the component that failed the integrity verification, a comparison of the set of measurement to the set of reference values may be done resulting in the set of indices that have failed the integrity measurement. However, such an unorganized set of measurements may be cumbersome to manage if the number of such measurements is very large.

To optimize the search of the failed integrity check module, the verification data may be generated in the form of a hash tree of measurement logs, such as stored measurement logs (SMLs) for example. The term SML, which is used by the Trusted Computing Group (TCG) architecture and specifications, may be used in describing various embodiments of the measurement log described herein, however SML is one exemplary embodiment of a measurement log. One example of an organization is Tree-Formed Validation (TFV). The stored measurement log may be organized into a balanced binary tree and algorithms may be presented to generate the tree using TPM commands. The algorithm may be generic and may be extended to balanced binary trees. The SML arising from tree-formed verification may be similar to the TCG SML in its content, but may be constructed, formed, computed, used, stored, retrieved, updated, deleted, transmitted, and/or received in communication, or otherwise processed or manipulated, differently than how a TCG SML may be processed and/or manipulated.

TFV may be implemented in a TrE, such as described below for example. It gives rise to many other, use-case type, innovations and is a reference enabler for the complex types of network-side platform validation, which TrE aims at. The technical content of TFV is described herein. A summary of TFV pointing is described herein. TFV is also put in the context of TrE and its application is described herein.

One element of TFV is a hierarchical structure for verification data, which brings along various benefits for platform validation by a remote validator. Algorithms are described herein for the creation and management of tree-formed verification data. Furthermore, attestation to substructures, i.e., subtrees of verification data, of a platform, may be used to validate a platform in TFV. The topmost level of verification data in the hierarchy, called the (set of) roots, may be protected in TFV, such as by verification data registers with special, e.g., hardware, protection for example. TFV may operate by small, efficient algorithms on tree-formed verification data. A whole implementation of TFV may be implemented inside a TCB, or even a hardware-protected secure execution environment. Complex structures of validation data may be associated to and/or protected by the tree hierarchy of tree-formed verification data. Sub-trees may provide inherent semantics to verification and validation data by the structure-substructure relation. Subtrees may therefore identify functional parts of a platform to a validator.

One embodiment of TFV may use a modified TPM. Trusted Computing as an existing technology is a potential entry point toward realization and/or standardization of TFV. TFV also generalizes readily from trees, such as binary trees, to more general structures that have substructures.

Described below are elements that may be provided by TFV.

Security: Hardware protection is provided in TFV, by protecting the roots of tree-formed validation data. The reference protection level is that of PCRs in a TPM, and it is shown that this may be maintained by TFV. Small algorithms and low complexity on the platform side enable implementation on a small TCB, or on-chip.

Management: TFV includes a method and apparatus to reliably and securely single out a substructure of a platform and manage the platform based on such a collection of substructures. Modules represented by a TFV subtree can be flexibly changed, updated, or even moved between platforms, with security properties as required by any scenario.

Distribution: The hierarchy of TFV allows for a hierarchical split of validation between entities. This enables more flexible design of communication scenarios and use cases, and also benefits efficiency.

Efficiency: One efficient data structure for searches—binary trees—may be implemented in TFV. It is shown that, for example, the search for failed components (with undesired integrity measurement values) may be more efficient in TFV than in TCG-like platform attestation. The natural hierarchy introduced by TFV provides the option of load distribution in validation processes.

One exemplary feature of TFV is that TFV may be designed, by its built-in hierarchical order, for the validation of a large number of low-capability platforms by "more central" entities. Thus, TFV may be suited for devices connecting to gateways, and/or via gateways to networks. One exemplary use case may include an M2M communication scenario. This trait of TFV may render it an orthogonal concept to the many existing concepts to provide more semantics to state attestation by a trusted platform. Other approaches to platform attestation show quite the opposite philosophy. They are suited to platforms capable of producing complex validation data, but are not assuming much of a hierarchical, modular structure of it. TFV may be combined with other, orthogonal approaches such as PBA, semantic attestation, virtualization, and/or HIM.

A glossary and list of acronyms used in the description is provided below.

RIM Reference Integrity Metric(s) provide reference values to which actual measurement data can be compared. A RIM is, for the purpose of validation, the counterpart of the measured values provided by a device. They serve as reference for comparison of desired target values with reported measurement values. RIMs provide proof of integrity in the sense that they uniquely are associated with a component, for instance as cryptographic digest values of component code, obtained in a secure testing facility. They are a metric in the sense that they allow for direct (deterministic) comparison with measured values.

RIM certificates A RIM certificate contains a RIM for a specific component, signed by a TTP.

AuV Autonomous Validation.

IDS Intrusion Detection System.

DoS Denial-of-service (attack).

PVM Platform Validation and Management. The combination of platform validation by PVE and OTA management of a platform by an (e)HMS. Comprises all potential combined functionality that can be derived from the combination.

DMS Device Management System. A generalization notation (3GPP LTE) for the Home(e)NodeB Management System (HMS) (TS 32.583, [4]), applying to general devices and enhanced by PVM functions.

RIM Manager/Manager RIMman The entity managing the validation database V_DB. It is the only entity authorized to do that and the only one which cryptographically operates on digital certificates (verification, generation).

SAV Semi-autonomous validation. The validation variant PVM is based on.

TCG Trusted Computing Group.

TSS Trusted Software Stack.

TPM Trusted Platform Module

TTP Trusted Third Party.

TCB Trusted Computing Base. The part of a system which cannot be assessed for trustworthiness at runtime and therefore must be unconditionally trusted.

CN Operator Core Network.

SHO Selected Home Operator.

PKI Public Key infrastructure.

PDP Policy Decision Point.

PEP Policy Enforcement Point.

D-H Diffie-Hellman.

TFV Tree-Formed Validation.

Verification data Data uniquely identifying the total outcome of the internal verification in a secure start-up process. Prime examples are PCR values, i.e., digests, in form of chained hash values, of a multitude of measurement values.

Validation data In distinction to verification data, validation data is all data that is submitted to another party, the validator, and used to assess the trustworthiness of the state of the platform.

Validation The process of submission of validation data to the validator, for instance realized as remote attestation according to TCG, and evaluation thereof by the validator, is properly called validation. Validation data may often comprise verification data such as quoted verification data register (e.g., PCR) values. Validation may, beyond cryptographic verification of verification data, include policy evaluation and triggering of actions by the validator.

Verification data register Hardware storage protecting verification data against unauthorized access and change.

The establishment of trust relationships to a trusted platform relies on the process of validation. Validation allows an external entity to build trust in the expected behavior of the platform based on provided evidence of the platform's configuration. In a validation mechanism such as remote attestation, the trusted platform exhibits verification data created during a start up process. These data may be hardware-protected values of platform configuration registers, containing nested measurement values, such as hash values for example, of all loaded or started components. The values may be created in linear order by the secured extend operation. Fine-grained diagnosis of components by the validator, based on the linear order of verification data and associated measurement logs, may be inefficient. A method to create a tree-formed verification data is provided, in which component measurement values represent leaves and protected registers represent roots. The functioning of this method is shown using a limited number of hardware protected registers and the standard extend operation. In this way, the security of verification data may be maintained, while the stored measurement log may be consistently organized as a tree. The basic mechanism of validating a platform using tree-formed measurement logs and verification data is discussed.

The process of building trust in computing platforms may follow a unique, common pattern. During start up of the platform, components may be measured by a protected entity on the platform. For example, the components may be measured before they are loaded and/or executed. The generation of a chain of trust is an important concept for a Trusted Computing System. This chain may extend without gaps from system boot up to the current system state, including executed instructions and programs. Each component may be required to measure and report the following component before executing it. Measurement of the direct successor may prevent unmonitored execution of code between measurement and actual execution. The measurement process may be protected by the root of trust for measurement, and may be implemented for instance by computing a digest value over code and configuration data.

Verification data may be compiled from the measurement values by a protected operation and/or stored in protected storage. The verification data may identify, such as after completion of secure start up, the platform's state uniquely. Embodiments of these processes may be authenticated and secure boot specified by the Trusted Computing Group (TCG). Authenticated boot may used for PC clients. Secure boot for mobile platforms may also be used. The difference between the two may be that secure boot adds a local verification and enforcement engine that lets components start if their measurements are equal to trusted reference values.

TCG proposes to compute verification data via the extend operation of the Trusted Platform Module (TPM), respectively, the Mobile Trusted Module (MTM), from measurement values, which are hashes of component code and/or data. The data may be stored in Platform Configuration Registers (PCRs). As an example, a minimum of 16 PCRs may exist according to version 1.1 of the specification and at least 24 PCRs may be identified in version 1.2 in the TPM. The PCRs may be accessed by authorized commands. The extend operation builds a linearly ordered, nested chain of hash values, akin to the Merkle-Damgård transform, as follows:

$$V_i \leftarrow V_i \diamond m \operatorname{def} H(V_i \| m),  \quad \text{(Equation 1)},$$

where $V_i$ denotes a verification data register (i=0; : : : ; 23 for PCRs), H is a collision-resistant hash function (SHA-1 in case of the TPM), and m=H(data) is a measurement value. Thus, verification data of a TCG trusted platform may be secured against manipulation by the TPM's protected functions and shielded capabilities.

The verification data may be accompanied by a more expressive record of measurement values and/or other component-specific data in the stored measurement log (SML). In validation toward an external entity, verification and/or other data, such as the SML, may be signed by the platform and transferred to the validator. The validator may be able to assess the trustworthiness of the platform to any desired granularity, which may be limited by the total information conveyed during validation. Paradigmatic embodiments for validation may be defined by the TCG in the attestation protocols. It is envisaged by TCG, that validation may eventually be used to take remedial steps on trusted platforms, for example upon first network or service access, as envisioned by the Trusted Network Connect working group of the TCG.

A method to organize verification data and SML differently from the linear order foreseen by TCG specifications, in a tree (such as a Merkle hash tree for example), is provided. The efficiency problem with linearly chained verification data is highlighted from the viewpoint of applications. The central security problem in organizing verification data as a tree is to make their generation as secure as the measurement-extend operations of TCG specifications is also provided. A method and algorithm to generate verification data in a limited set of hardware protected registers, which truthfully represents the root nodes of a hash tree is also provided. It is also shown how tree-like verification data and SML can efficiently and effectively be used for validation. Implementation options for tree-formed verification data and the experiments performed are also discussed.

Verification data provides information about a systems state with unconditional security. For example, they may be secure independently of the SML, which, according to TCG standards, may have no particular protection on the platform or in a validation (it may not be part of the signed attestation data). The signed PCR values, i.e., verification data itself, may provide an implicit integrity control for the SML. For this, the verification data may be recalculated from the measurements in the SML, by retracing all extend operations.

The TCG-standardized way to use PCR values in authenticated boot to secure the measurement log may be based on the technique introduced by Schneier and Kelsey for securing audit logs on untrusted machines. In fact, it may be a simplification, since the last element of the hash chain is kept in a PCR, while the SML may contain the measurement values and not the intermediate entries of the hash chain. Integrity measurement using the TPM may be implemented in the Integrity Measurement Architecture (IMA) as a Linux kernel module to measure the integrity using the TPM and to generate a linear SML.

Verification data, created by linearly chaining extend operations, may be of limited value for remote diagnostics of a platform, and/or advanced management such as component-wise remediation. Essentially, the position of a manipulation of the SML, either by tampering with a measurement value before it is extended into a PCR, or by tampering with the SML itself after secure start up, may not be localized with certainty. Furthermore, the space complexity of real world SMLs with many hundreds, or thousands, of measured components, may make sifting it through for components which fail validation, i.e., for which measurement value differs from a "good" reference value, costly. For checking of code and/or data there may be a variety of cryptographic checksum functions available, and they may require that the integrity of the checksums for the "correct" data be maintained. The requirement for a centralized database of software in valid versions on the various machines may be a significant management problem, in need of an efficient solution. Future, large scale deployments of networked devices, such as required in machine-to-machine communication scenarios for example, may require a solid device and network-side, balanced and efficient trust infrastructure. Security requirements may be high for devices loosely connected to networks and operating semi-autonomously. Scenarios considered by the industry, may entail a high-level requirement for remote integrity check, or validation, of a connecting device. Methods and apparatus described herein may be used to make validation expressive, efficient, and/or secure.

The specifications of the TCG Infrastructure working group may include an approach to this problem, hierarchically distinguishing between verified components and sub-components. A Tree of Trust (ToT) concept and notation is described that represents a platform's structure. A ToT's nodes may represent platform components, from TPM up to applications, annotated with trust and security statements. It may be used to assess the trust that should be put into the platform, or even to reorganize the platform according to certain constraints.

Another technical domain where the shortcomings of a merely linear chain of trust becomes imminent is virtualization. Virtual machines may be created and/or destroyed dynamically on potentially many layers, resulting in a tree-like, dynamic structure of trust dependencies. While the community may have acknowledged that structured validation data may be required to truly assess platforms' trustworthiness, a granular association of such tree-formed data hierarchies to verification data (PCR values) may be lacking.

The verification data and SML may be organized into a binary tree structure. In such a structure, verification data registers are the roots, the SML data structure may include the inner nodes, and the leaves may be the component measurement values. The whole structure may be a tree form, such as a representative of the class of Merkle hash trees for example. The method may be generalized to n-ary and arbitrary trees. The Christmas tree of FIG. 3 is used to show the general concept of tree-formed verification.

Figure 3:
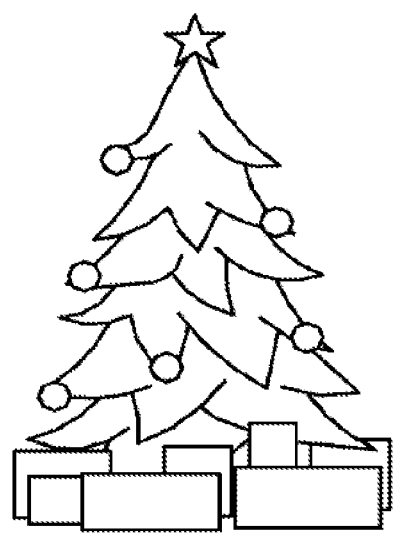
FIG. 3 shows a general structure of tree-formed stored measurement logs (SML) and verification data.

FIG. 3 shows a general structure of tree-formed SML and according to verification data. The star represents the root of the tree stored in a verification data register. Components (code and/or data) are indicated by packets at the leaves. Measurements hashes of the components are indicated by slip knots. Inner nodes (balls) transport verification information upstream to the root. The lines hint at the traversal of the tree for validation, explained in more detail later.

Secure creation of verification data which represents root nodes of hash trees may pose a problem. In the normal extend operation, the measurement value taken by the Root of Trust for Measurement (RoTM) on a component, and the current verification data register value $V_i$ are used, and the operation itself is carried out in the hardware protected TPM.

Thus, in particular, measurements stored without protection in the SML, are not used in the generation process. This may not be possible for a hash tree, where adding a new leaf may affect d−2 inner nodes of the tree, where d is the tree's depth. The challenge may be to generate tree-formed verification data inside a limited number of hardware protected registers (PCRs), such as by using a single leaf measurement value as input, and employing the TPM extend operation and other TPM capabilities.

It may be clear from the minimal requirements required on a system creating and protecting tree-formed verification data, that the methods and apparatus in the following description may not be restricted to platforms and secure hardware elements adhering to TCG standards.

Verification of programs may be performed before loading and while booting. Attestation may also be used as described herein. Code authentication is among the goals of Trusted Computing. Executed code may be protected by securing start up of a platform. For example, hardware mechanisms may be used to bootstrap trust in the host with secure coprocessors on standard PC hardware. Trusted platforms may be applied. Secure hardware may be involved in the secure bootstrap process. For instance, a secure coprocessor may halt the boot process if it detects an anomaly. This assumes that the bootstrap ROM is secure. To ensure this, the system's address space may be configured such that the boot vector and the boot code are provided by a secure coprocessor directly or the boot ROM itself could be a piece of secure hardware.

Regardless, a secure coprocessor verifies the system software (OS kernel, system related user-level software) by checking the software's signature against known values. Tamper resistance of code may be implemented in this process. One approach to the problem may be rooting trust for program execution in hardware, such as the XOM (eXecute Only Memory) processor architecture for example, and the XOM Operating System building on it. This may not solve the problems of secure loading a program, and/or attesting to external entities. AEGIS uses secure boot on a PC. For example, AEGIS uses a signed hash to identify each layer in the boot process, as does Terra, which may attest loaded components with a complete chain of certificates ending in attestation of virtual machines.

TCG specifications define a bi-lateral remote attestation to verify the integrity of a platform remotely, by verifying the binary executables. Executed code may be measured when it gets loaded. The measurements may be stored in PCRs as verification data, and the TPM may attest to these data by signing them with a TPM protected key. The verifier may, upon receipt of these metrics, decide if the platform may be considered trustworthy. Since the configuration may be transmitted and verified, the verifier may be to know the configurations of the machines. Furthermore, binary attestation discloses the configuration and thus poses a privacy risk. In different solutions, "property," and "property-based attestation" (PBA) are discussed. PBA allows assuring the verifier of security properties of the verified platform without revealing detailed configuration data. A trusted third party (TTP) is used to issue a certificate which maps the platforms configuration to the properties (in particular desired/undesired functionality) which can be fulfilled in this configuration. The TPM may then, using a zero-knowledge proof, attest these properties to the verifier without disclosing the complete configuration.

PBA moves the infrastructural problem of platform validation to a TTP, similarly to, but extending the role of, the TCG's privacy certificate authority (CA). Another alternative is presented by the Nexus OS which builds on a minimal Trusted Computing Base (TCB) to establish strong isolation between user space and privileged programs. Nexus has secure memory regions and monitoring and enforcement machines to protect them. One application may be to move device drivers into user space. Attestation by Nexus attaches descriptive labels to monitored programs and thus allows for expressiveness similar to PBA, but system immanent. Both the PBA concept, as well as the Nexus approach do not have means to validate a complex system comprised of a multitude of components, which furthermore shall be dynamically managed. Both approaches are orthogonal to the present one, and could be combined with it.

Hierarchical Integrity Management (HIM), presents a dynamical framework for component-wise integrity measurement and policy-enabled management of platform components. Components and sub-components are related in HIM via dependency graphs, the most general structure that is useful for this purpose. But HIM is not aimed at remote platform validation and does not protect structured platform verification data in a PCR. Rather, it holds measurements are together in a global Component Configuration Register (software registers) table.

One application of the hash trees, such as the hash trees introduced by Merkle for example, for integrity protection of large datasets may be in certificate management in a PM. This may yields long-term accountability of CAs, using tree structures such as Merkle trees, or authenticated search trees. The use of hash trees may be extended to general long-term secure archiving for digital data. Hash trees may be used for run-time memory protection.

A system may employ hash trees for storage and/or memory protection and may be separated into untrusted storage and a TCB. A program running on the TCB may use hash trees to maintain the integrity of data stored on an untrusted storage, which may be, e.g., an easily accessible, bulk store in which the program regularly stores and loads data which does not fit into the TCB. The root of the entire tree may be stored in an on-chip trusted register of constant size, but other nodes may be stored in main memory or cache. Another use of hash trees may include where it is shown how they may support authentication of distributed code in Wireless Sensor Networks (WSN). Also in WSN, data aggregation involving multiple nodes may be integrity protected using hash trees.

Another embodiment to make verification data searchable may include Authenticated Append-only Skip Lists, which may be sorted linked lists designed to allow fast lookup of the stored data elements by taking "shortcuts."

However, trees may be better suited for validation of a platform's state, such as to efficiently determine the subset of components at the leaves failing validation for example. Systems, methods, and apparatus are described herein for generating a tree structure, such as a binary Merkle tree for example, from component measurement values using a limited set of tamper-resistant verification data registers. The tree structure may be generated using the capabilities of a TPM, such as the standard extend operation for example. The algorithm may be small enough to be executed within a TCB, in particular on-chip. This part of the method may increase security of the generation of the root of a hash tree, which in turn may provide more security to the tree nodes. Also described herein are systems, methods, and apparatus for exploiting the tree structure for efficient validation with enhanced diagnostic capabilities over common PCR values and SMLs, to increase security features of remote platform validation, and concurrently benefiting from the efficiency of tree-like structures in the search for failure points. This use of tree structured data may be used for secure diagnostics, validation, and/or attestation.

The systems, methods, and apparatus described herein may use a limited number of verification data registers to securely generate one root verification value. Each reference to the concrete embodiments of Trusted Computing specified by the TCG, such as the TPM operations, PCRs, and/or SML for example, may be exemplary embodiments used in implementation of the systems, methods, and apparatus described herein. The algorithms and/or procedures may be applied to each security technology with the minimum capabilities which are used by them.

One of the hardware protected registers, v def $\{V_1, \ldots, V_r\}$ e.g., PCRs, may include the root of the final tree. The tree may be binary, to keep the algorithm compact and to provide a fine grained detection of failed components for example. The leaves may carry the measurement values, while the inner nodes may be stored in a modified SML. The SML may be modified in a way to support the tree structure of the validation data, i.e. it may not be a linear list of measurement values but the data structure may support standard tree operations and traversals. For efficient search during platform validation, the SML may support the addition of new leaves and retain edge relations. Adding a new measurement at a leaf to the tree at depth d may require recalculation of d−1 inner nodes of the leafs reduced hash tree and/or the tree root which is stored in a V∈v. A Merkle tree has a natural coloring of edges as "left", respectively, "right" ones, since the binary extend operation (1), is non-commutative. Leaves inherit this order and are added from left to right. The binary, d-digit representation of leaf n, $0 \le n \le 2^d-1$, denoted by $\langle n \rangle$, yields natural coordinates for the inner nodes and edges on the unique path from leaf to root. That is, the kth digit (counted from the MSB, $k=1, \ldots, d$), $\langle n \rangle_k = 1$, determines whether the node at depth k−1 on this path is connected by a left, respectively, a right edge, by $\langle n \rangle_k = 0$, or $\langle n \rangle_k = 1$, respectively.

The root of each subtree created during the execution of the algorithm may be stored securely in a V∈v. If two subtrees (measurement values are subtrees of depth 0) with the same depth d' exist, they may be merged to a single tree of depth d'+1. In using the merge operation, one of the two V protecting the roots of the subtrees may be freed after the merge operation. The update algorithm for a newly arriving measurement value may be formulated such that registers $V_1, \ldots, V_{d-1}$ contain the current state of "active" subtrees of depth $1, \ldots, d-1$, and thus $V_d$ may contain the current global root value.

"Active" here may be described as a subtree, the root of which awaits completion by merging with a subtree of the same depth. Care is taken in the formulation so that the actual measurement value, protected registers, and/or the normal extend operation are used, and no unprotected memory places are involved. Denote an empty node in the full binary tree of depth d by nil. The tree formation may be performed by Algorithm 1 as shown in FIG. 4.

The various operations involved in algorithm 1 include:
M Add measurement to $V_d$; $V_d \leftarrow m$.
$S_V$ Store a verification data register to SML; $V_k \rightarrow$ SML.
$S_m$ Store measurement to SML; $m \rightarrow$ SML.
V Copy verification data register; $V_k \leftarrow V_{k+1}$.
E1 Extend $V_d$ with measurement; $V_d \leftarrow V_d \Diamond m$.
E2 Extend inner node registers; $V_k \leftarrow V_k \Diamond V_{k+1}$.

The symbols above denote the operations and their execution times interchangeably. The one missing operation m←RoTM may be subsumed in $S_m$.

Figures 5, 6:
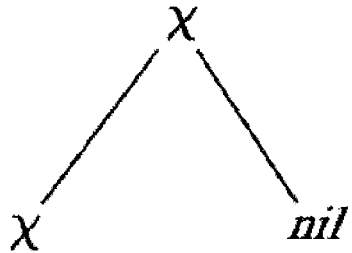
FIG. 5 shows a configuration correct at a right edge.
FIG. 6 shows an algorithm (algorithm 2) showing cleanup of an incomplete tree.

If $n < 2^d$, the tree may be incomplete at the right edge, and the cleanup procedure shown in Algorithm 2 as shown in FIG. 6 may be implemented.

Algorithm 2 (FIG. 6) may result in a final merge of roots such that $V_1$ ultimately contains all the subtree information. This cleanup procedure may be reached if the tree is not already full, due to the test in lines 17-21 of Algorithm 1 as shown in FIG. 4. The rule by which the tree is completed is that the configuration, as shown in FIG. 5, is correct at the right edge.

Inner nodes may be written to the SML, even if they are the result of forwarding along a left edge (entailing minor redundancy). Formally, the above rule by which the tree is completed may be interpreted as modifying the notion of the '$\Diamond$' operation such that x $\Diamond$ nil=x, as explained herein.

If leafs and inner nodes are appended to the SML in the order prescribed by Algorithm 1 as shown in FIG. 4, a natural serialization of the resulting tree may be obtained. This order is shown in FIG. 7 for an incomplete tree of depth 3.

Figure 7:
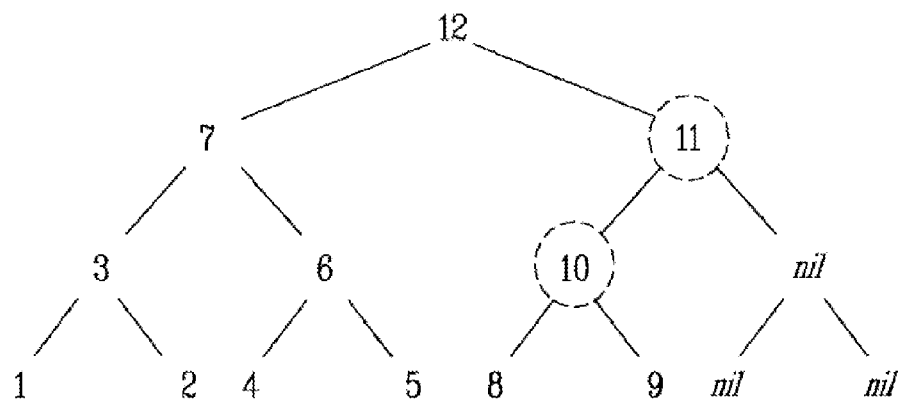
FIG. 7 shows order formation/tree branching for an incomplete tree of depth 3.

In FIG. 7, marked entries 10 and 11 in the resulting SML are identical, since 11 is created by a forward operation of the cleanup Algorithm 2. The SML order can be used to address tree nodes in the SML by a binary search. Given a sequence number K in the SML of length $2^{d+1}-1$, such a search proceeds from the root, which is the last entry. The remaining $2^{d+1}-2$ entries are equally partitioned into portions of size $2^d-1$, and it is decided if K is in the left or right part. This procedure is iterated until K points to the rightmost element in the current part. The sequence of decisions made yields the sequence of left-right edges leading from the root to the node with index K in the SML.

The tree-formation Algorithm 1 of FIG. 4 may easily be adapted to trees of arbitrary, uniform, arity (the arity of a function or operation is the number of arguments or operands that the function takes), such as b. For this, the binary coordinate $\langle n \rangle$ has to be replaced by the b-ary coordinate $\langle n \rangle^{(b)}$ and its d-th, respectively, k-th digit evaluated in line 4, respectively, 12 of algorithm 1 as shown in FIG. 4, where the evaluated expression has to be changed to $$\langle n \rangle \frac{(b)}{d} = b - 1.$$

Algorithm 2 (FIG. 6) may be adapted accordingly. A further generalization to arbitrary trees may require establishment of the associated node coordinates, i.e., of the mapping n→node. At each node with arity higher than 2, since hash extension is linear for the legs connecting to it, the disadvantages mentioned above may apply, and loss of detection granularity may occur.

It is clear from the generation procedure that, with a limited number, $V_1, \ldots V_r$, of verification data registers, a finite number of components at the leaves of trees may be covered. The maximum capacity may be calculated as follows. The procedure for the first register, $V_1$, may use the r−1 other registers as a pipeline of length r−1 to build a tree of depth r. When $V_1$ is occupied, the second register may support a tree of depth r−1, and so on, until the last register, $V_r$, for which the pipeline has length 0 and the tree depth 1. Thus the total number of leaves carried by the trees of the registers may be given by:

$$C_{trees} \sum_{k=1}^{r} 2^k = 2^{r+1} - 2 \quad \text{(Equation 2)}$$

Figure 8:
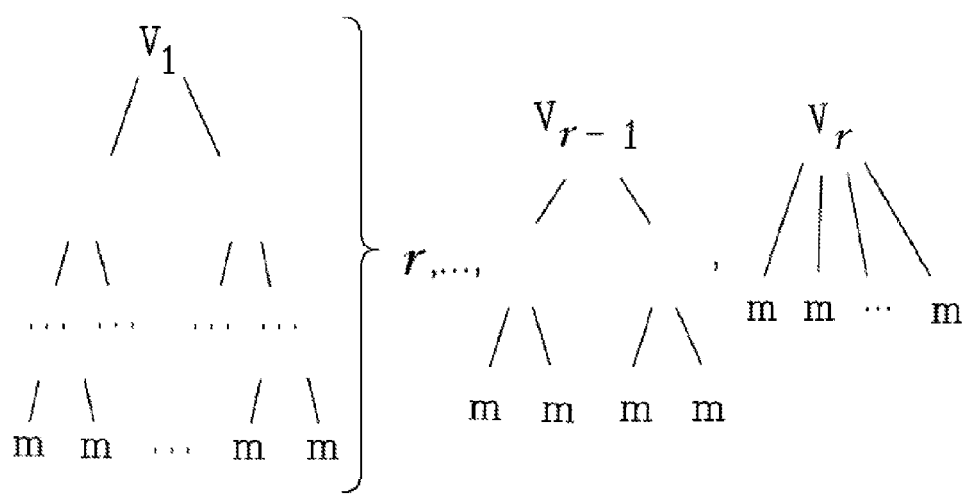
FIG. 8 shows maximum capacity arrangement of tree verification data where measurement values at leaves are indicated as m.

For r=24, the number of PCRs of a TPM adherent to the v 1.2 specification, this yields 33, 554, 430 places for component measurements at the leaves of the r trees. If restricted to the last 16 PCRs, since, for instance, according to the PC Client specification of the TCG, PCRs 0-7 are reserved, and the specification still counts 131,070 measurements. Though this capacity is high, it is not limitless, as the standard is linear extendible. Thus, since the number of measurements to be taken during start up or at run-time is not a priori known, the last register may, as a fallback, be linearly extended after the capacity limit is reached. FIG. 8 shows this arrangement-showing maximum capacity arrangement of tree verification data. In FIG. 8, measurement values at the leaves are indicated as m.

The spatial complexity of the tree formation algorithm is very small. As internal data needs precisely three: $d \in \{1, \ldots r\}$, $n \in \{0, \ldots 2^d-1\}$, and $k \in \{1, \ldots d\}$, the size of that data is at most $d + 2 \lceil \log_2 d \rceil \leq r + 2 \lceil \log_2 r \rceil d$ bits.

Additionally, depending on implementation one register may be required to receive and hold the current measurement value, and/or as intermediate register for the operations on verification data registers. The SML increases moderately in size. For a completely filled binary tree of depth d, $2^{d+1}-2$ node values, including leaf measurements, are stored in the SML (the root node is contained in a $V_i$). That is, the tree-formed SML is less than double the size of the linearly formed SML containing only measurement values.

For an estimation of the temporal complexity, a full tree of depth d, i.e., $2^d$ leaf measurements is considered. By the structure of the tree, the occurrences of the operations may be counted. $S_m$ occurs at each leaf, i.e., $2^d$ times. E1 and M occur at each inner node at depth d−1, i.e., $2^{d-1}$ times. V and E2 occur at each inner node from depth d−2, upward, i.e., $2^{d-1}-1$ times. Finally, Sv occurs at each inner node of the tree except the root, which remains in $V_1$. That is, $S_v$ occurs $2^d-2$ times. Altogether this yields the estimate: $2^{d-1}(E_1+M)(2^{d-1}-1)(V+E_2)+2^d S_m+(2^d-2)S_v$ for the algorithm's execution time, disregarding flow control. Grouping similar operations $\{E_1, E_2\}$, $\{M, S_v, S_m\}$ yields $2^{d-1}(E_1+E_2)-E_2+2^{d-1}(M+2S_v+2S_m)-2S_v+(2^{d-1}-1)V$.

Assuming that memory operations are approximately equally time-consuming and bounded by a common constant $$M \approx S_v \approx \frac{1}{2} S_m \approx \frac{1}{2} V \leq S,$$

where a factor 2 is included in V for a naïve read/store implementation, and in $S_m$ for the missing operation mentioned above, and likewise for the extend operations a $E_1 \approx E_2 \approx E$, a coarse estimate for the temporal complexity of tree formation for d>1 is given by $$\leq 2^d \left(E + 4\frac{1}{2}S\right) - (E + 4S).$$

When extend operations are the dominating factor, tree formation may need one extend operation less than the linear chain of authenticated boot.

For the validation of tree-formed verification data, generated by the procedure as described above, a validation strategy that exploits available information at each tree node is described. The average computational cost may be calculated in relation to the number, respectively, relative share of failed measurements.

Taking a linear chain of measurements generated and stored in an ordinary authenticated boot and sequentially extended to a PCR as the reference case, it is seen that tree traversal validation is significantly different. In the former case, a manipulation of the SML may not be localized in principle, while traversing a tree-formed SML may allow identification of a subtree where a manipulation has occurred. Similar considerations hold for diagnostic validation, i.e., the search for components which do not conform to a desired reference configuration of the validated platform (described as failed components herein). For the linear chained SML this may require comparing each measurement with a reference value and/or recalculating the chain of extend operations up to the PCR to verify the SML's integrity. Since manipulations in the linear SML may not be localized, a failure to reproduce the PCR value may mean that diagnostic validation may not be possible, and failed components may not be distinguished from good ones.

For tree-formed SML, the situation is much better. If a subtree is identified, where manipulation of the SML is suspected, the complement of it in the SML tree may still be validated. Also, for diagnostic validation, one may expect a significant speed-up in determining the set of failed components, and concurrently verifying the root verification data register contents.

Figure 9:
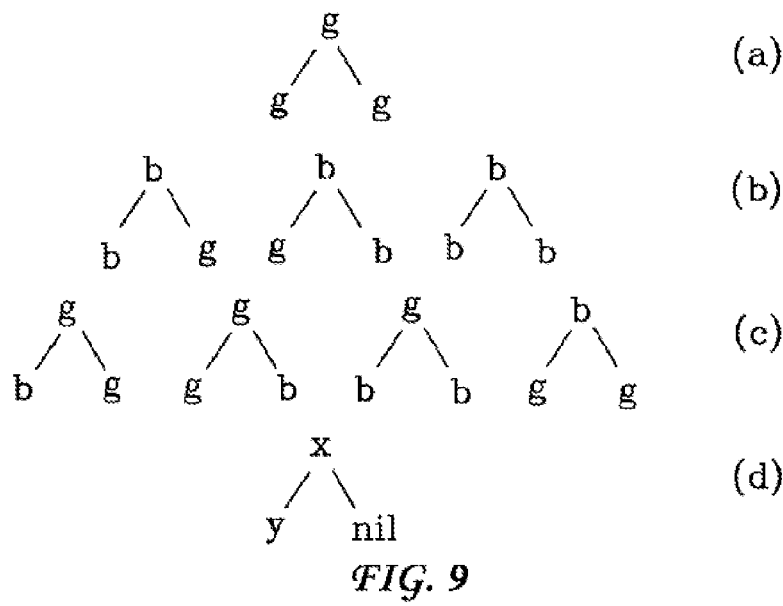
FIG. 9 shows classification of node configuration in a tree-formed SML.

The validation of a tree-formed SML may be used to find the subset of leaves failing validation, and/or to detect manipulations of the SML, where possible. It may be assumed that there is a reference tree for comparison locally available at the validator. Validation may start from the root of the tree, i.e., a verification data element V, traversing the tree of SML data. This may yield the leaf set of components for which measurements differ from reference values, called failed components. In traversing the tree, a depth-first search with pruning may be applied, and decisions may be taken at every branching node. The trees may be binary. The SML tree values at a branching node and its two children may be compared with the reference tree values of the same node positions, and the results may be noted as g (good) for agreement and/or b (bad) for discrepancy. In this notation, the following situations may occur, as shown in FIG. 9. FIG. 9 shows classification of node configurations in a tree-formed SML.

In FIG. 9, in case (a), the whole subtree below this parent node may be validated positively, and traversal may end at this node. In FIG. 9, in case (b), the parent node may be recalculated by the validator applying the extend operation to the child node values. If the recalculated value does not match the value at the parent node, this may indicate a SML manipulation in one of the subtrees with a root marked as bad. This may be handled as an exception.

Otherwise, validation may proceed to the next tree level, traversing the subtrees where bad values are found, i.e., left, right, or both subtrees in (b), respectively. In cases (c), a tree manipulation exception may be detected. This detection may take place without recalculating an extend operation. The last situation, (d), may occur when the binary tree is incomplete, and/or a right branch is null. Then value x may equal value y, in which case traversal may proceed to the left, and otherwise a tree manipulation exception may occur.

One advantage of validating tree-formed SMLs is that subtrees with a correct root may be discarded from further search for failed components. A simple, probabilistic model to quantitatively assess the performance of tree validation is now provided. Assume for example that the SML is a full tree of depth d. The validator has a complete reference tree representing a known, desired platform configuration. Recalculating hash operations may be the dominant cost factor to estimate validation complexity, while comparisons may be cheap. Assume a random set of failed leaves.

An optimistic validation strategy may be used, called diagnostic validation, which traverses the paths from the root to failed components, i.e., components with bad measurement values with respect to the leaves of the reference tree. One property of this strategy is that it finds failed components with authentic measurement values. Diagnostic validation may proceed as follows. When visiting an inner parent node which differs from the corresponding node in the reference tree, i.e., a bad parent node, one of the situations in FIG. 9, case (b), or the rightmost configuration of case (c) may be encountered. In the latter case, no recalculation of the parent node may be performed since it is an obvious SML integrity failure. The subtree with this root configuration may be discarded from further traversal, since it may not yield trustworthy information about failed components. In this case, further steps may depend on the validator's policy. The node configurations in case (b) are the ones that may require re-calculation of the parent hash from the root hash by one extend operation 0, to confirm that the configuration, which may be unknown from the validator's reference tree, is authentic. The subtrees whose roots are good children of the bad parent node under scrutiny, may be discarded from further traversal. This procedure of diagnostic validation implicitly excludes the configuration/case (a) and the three left configurations of FIG. 9 from diagnostic validation. They may be considered in further forensic evaluation of the SML tree, wherever this makes sense.

Diagnostic validation may require a visit and performing a hash operation at bad inner nodes in the union of paths from failed (bad) leaves to the root. In an otherwise untampered tree, this may implicitly exclude the right configuration/case (c) with bad parent node. A subset of independent and ideally distributed (i.i.d.) bad leafs constitute a fraction $f \in [0,1]$ of leafs. The number of bad leafs is $2^d f$. The expected number $E^{inner}$ (f) of bad inner nodes may be calculated as explained below.

One problem addressed herein may be that of bi-coloring (e.g. bad vs. good inner nodes) of a binary tree generated by a random, i.i.d. choice of leaves and coloring of the path connecting it to the root. Random choices of such leaves and paths may be equivalent to random choices of i.i.d. bit strings of length d. The expected number $E_k^N$ of colored leaves after k choices from the set of $N=2^d$ leaves is calculated. Recursively, $$E_0^N = 0,$$

and $$E_{k+1}^N = E_k^N \frac{E_k^N}{N} + (E_k^N + 1) \frac{1 - E_k^N}{N} = 1 + E_k^N \frac{E_k^N}{N}.$$

Solving this obtains: $E_k^N = N(1-(1-N^{-1})^k)$.

Since all substrings of the chosen bit-strings are statistically independent the same argument applies to inner nodes at levels d−1, . . . 0. Thus, the expected number of colored inner nodes is obtained by summation d−1

$$E_k^{inner} = \sum_{l=0}^{d-1} E_k^{2^l}.$$

Remaining to be found is the expected number of choices k which corresponds to a certain expected number $E_k^N = fN$ of colored leaves, where $0 \leq f \leq 1$ is a target fraction of leaves. Solving this equation for k yields $$k = \frac{\ln(1-f)}{\ln(1-2^{-d})},$$

where $N=2^d$ was inserted. From this, the expected number of bad inner nodes in dependency of f, $E_{inner}$ (f), may be calculated.

Figure 10:
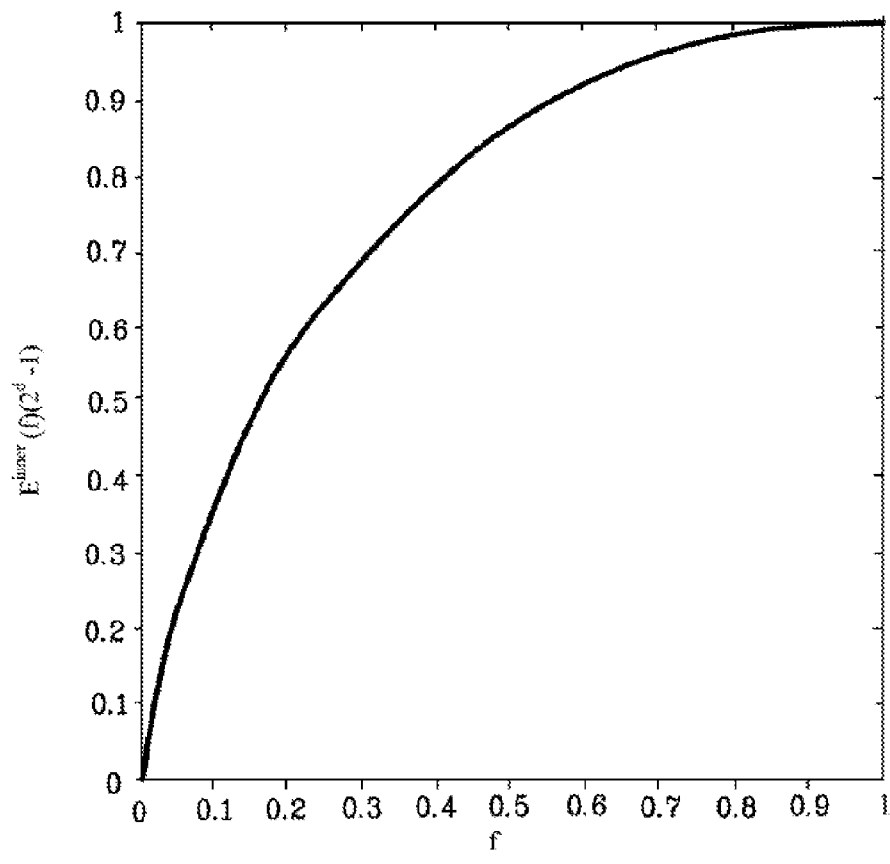
FIG. 10 an expected fraction of bad inner nodes on a random distribution of $2^df$ bad leaves for d=16.

FIG. 10 shows the fraction of the $2^d-1$ inner nodes, for d=16, at which a hash operation may occur under the above descriptions. This represents the number of hash operations which may be needed to determine the bad components with certainty. The reference case of a linear SML may require $2^d+1$ hash operations to recalculate the final PCR value. This case is roughly represented by the upper ordinate axis of FIG. 10.

With regard to comparisons to reference values, the situation may be slightly different. Tree traversal for diagnostic validation may descend along the bad inner nodes which fail comparison with the reference tree's corresponding inner node. For that, both children of a bad inner node may be compared in each case, so that the complexity in terms of comparisons may be twice the number $E^{inner}$ (f). The linear SML may require all $2^d$ measurements to be compared with reference values.

If h is the cost of a hash operation at the validator, and c the cost of a comparison of two hash values (160 Bit for SHA-1), then the total validation cost of the linear case is $(2^d+1)h+2^d c=2^d(h+c)+h>2^d(h+c)$. This is the least effort to obtain the same information from a linear SML as by diagnostic validation of a tree-formed SML. For the tree-formed SML on the other hand (including the root in the count), the cost is $(E^{inner}(f)+1)(2c+h)$. Tree-formed validation is more efficient if $$\frac{E^{inner}(f)+1}{2^d} \leq \frac{h+c}{h+2c} = \frac{\lambda+1}{2\lambda+1},$$

where $\lambda=c/h\ll1$. And even with a very generous margin, $\lambda<0.01$, which yields a bound of 0.99 for the r.h.s (right-hand side). Then for d=16, tree-formed validation may be more efficient for fractions f of bad leaves as high as 85%.

Diagnostic validation of a tree-formed SML may perform better in terms of hash operations than with a linear SML, and may outmatch the linear SML even for large fractions of bad components. Diagnostic validation of a tree-formed SML may be vastly advantageous for small fractions of failed components. Tree validation may be more efficient when the bad leaves are non-uniformly distributed, e.g., exhibit clustering.

While both directly compared linear and diagnostic tree validation are available, linear validation may be impossible if the recalculation of the final PCR fails, since then, comparison of single measurements does not yield reliable information—each measurement may be faked in the SML to hide the one which broke the hash chain. One advantage of tree-formed is that validation data may come about even at decreased computational complexity for the validator.

With regard to the tree-formation algorithm itself, to achieve the same level of security as TCG standard compliant trusted boot processes, operations on verification data registers may run inside the hardware-protected TPM environment. Although part of the operations in most operations of the tree formation algorithm listed above are non standard TPM functions that may be executed on standard conforming PCRs; in fact, the normal extend operation $E_1$ may be an internal standard function, and $S_v$ and $S_m$ may be realized by PCR read operations.

The minimal modifications that may be needed to extend a TPM to turn PCRs into tree-formed verification data registers are discussed, while the tree-formation algorithm may run outside the TPM. Then, a TPM-internal command for tree formation is described. Another implementation is described which is a software-based implementation of tree-formed verification data, where the root registers may be soft registers managed by a trusted application, and where the current state of such registers is protected by a 'real' register, e.g., a PCR. Finally, the experimental implementation of tree-formation with the TPM emulator integrated in the TPM software emulation Environment, "ethemba" is described.

A minimalist approach is taken to implement tree formation and carve out changes to a standard TPM that may enable PCRs for use with the Algorithms 1 and 2. This approach regards implementing the elementary operations listed above by TPM commands or modifications thereof. The core of the algorithm, including the bookkeeping tasks on registers representing inner nodes' current states, may be realized as a software root of trust for performing tree formation in a system integrity measurement process, such as authenticated or secure boot.

The operations $S_v$ and $S_m$ pose no problem and may be realized by TPM_PCRRead commands or directly in the tree formation software, respectively. Ei may occur at every right edge at the lowest level of the tree, and may extend a V containing an already measured value which came from the left sibling of the measurement which is extended into V. Therefore, $E_1$ may be included in the standard TPM_Extend operation defined by Equation (1). $E_2$ may occur at right edges inside the tree and, in turn, may be modeled by TPM_PCRRead followed by a TPM_Extend.

Operations M and V may occur at left edges on the lowest level respectively, inside the tree. They may pose a problem for two reasons. First, PCRs may not be directly written to, and a natural approach to reset them via TPM_PCR_Reset as a first step in M or V may be problematic, since only PCRs above 16 of a standard TPM may be reset, and only from the correct locality. Thus it is necessary that enough PCRs are resettable and that they respond to the locality in which the tree formation software is executed as a trusted code.

Second, even after reset, the operation that may modify a PCR, TPM_Extend, may not directly copy a value into the register but truly executes (1) with the existing value of the reset PCR, which is a 160 bit binary 0x00 and the input value, which yields a result different from the input value. One option, which avoids exposing new commands directly writing to, or shifting values between PCRs, may be to augment PCRs with a reset flag which indicates that they are in a pristine state after reset. Then, TPM_Extend may be modified such that it directly writes into the PCR when this flag is true, and then sets it to false.

Realizing that M and V consistently occur at left edges of a tree, and if the right sibling is empty (nil), and then deterministically produce an outcome depending on the two siblings involved, a third option would be to deviate slightly from the definition of a Merkle hash tree. The correct configuration of values in each elementary triangle in the SML tree may then be as shown in FIG. 11.

That is V or M may be modeled by TPM_PCR_Reset followed by TPM_Extend to obtain $0 \diamond x=H(0\|x)$ in the first step. The right sibling may then be normally extended in that register and the result written to the SML. A consistent treatment of nil node values in intermediate stages and finalization of a tree is also described below.

In many cases, the hash tree stored in the SML may be incomplete, i.e., contain empty leaves and inner nodes. In the continuous measurement process, such nodes, with value denoted nil, may be treated procedurally by the operations M and V which means that right nil siblings may be ignored. This happens in lines 8 and 18 of Algorithm 1 for intermediate stages of tree formation, and in line 29 of Algorithm 2 at completion of the tree after the last measurement.

Generally, i.e., transgressing the restrictions of a standard TPM, nil may be two-sided unit for the operation $\diamond$, i.e., $$x \diamond nil=nil \diamond x=x, \text{ and } nil \diamond nil=nil \tag{Equation 3}$$

This convention manifests rule/case (d) as described above. It is a reinterpretation of the usual extend operation and may also be used to eliminate the operations M and V in the algorithms' formulations. Namely, M and V may be replaced by a reset of a register V to nil followed by the operation $V \leftarrow V \diamond m$, respectively $V \leftarrow V \diamond V'$.

For the implementation of this convention, nil may be represented as an additional flag of PCR registers, and the inputs and output of ◇. For a PCR, the nil flag may be set by a particular reset command. When nil is encountered as the input of an extend operation to a PCR, then logic of the TSS, or a TPM modification, may prevent execution of the hash operation (1) and write to the PCR directly.

The split TPM/software implementation of tree formation compromises on the security level of the resulting root verification data register values. Tree-formed verification data may be produced by a TPM-internal implementation of the proposed algorithms. For this, a TPM modification may work as follows. The modified TPM may expose a command TPM_Tree_Extend with the same input parameters as the usual TPM_Extend command. The TPM may maintain flags for PCRs signifying which of them are currently designated tree roots, which are occupied and locked, and which are usable as intermediate Vs by the Algorithm. Furthermore, the TPM maintains the additional data mentioned above. In the simplest case, internal logic may prevent concurrent use of more than one PCR for tree formation. While TPM_Extend may output the update of the target PCR value, TPM_Tree Extend may return a variable number $1, \ldots d$ of updated verification register data values in sequence such that they produce the natural order described above. These return values may be the output of the SML write operations of Algorithms 1 and 2. When d values are returned, the receiver may know that this tree is exhausted and the corresponding root V locked. Another option may include the TPM_Tree_Extend to return all intermediate V s on each call.

A method is described for using Merkle hash trees to protect the integrity of the secure start up process of a trusted platform in the same way as is traditionally done with PCRs. Efficiency and flexibility gains have been demonstrated resulting from using tree-formed verification data in platform validation. This may be effective in particular in the remote validation and management of platforms via a network. Given the small size and complexity of the tree-formation algorithm, it may be implement operations directly inside the TPM, if specifications are amended accordingly. This may be a feasible approach for future TPM generations.

With regard to generalizations, trees are certainly not the most general structures for which integrity protection using cryptographic digests can be applied. For example, some researchers have extended hashes to provide identification of directed graphs. Others have applied variant one way functions, e.g., multi-set hashes to uniquely identify complex data structures such as RDF graphs. Along these lines, generalization of tree-formed verification data to, for instance, directed acyclic graphs, and dependence graphs, may be conceived. While potentially interesting for complex platform management and protection tasks, every such generalization would incur increased complexity and loose the efficiency of binary trees for validation. Application cases for such generalizations are therefore not undertaken at this stage.

The single command extension of the TPM integrity measurement functionality, TPM_Tree_Extend proposed above may be, however, the starting point of a flexible, TPM-based tree verification data management architecture. Secure updates of subtree roots may be enabled, such as for dynamic platform management for example, and ultimately to quote an inner node of a tree-formed SML with the same security assertions as TPM_Quote provides to a remote validator for a PCR value. Such further extensions are described below.

Structuring the measurements helps in identification of the component that failed integrity check. In one such embodiment of structuring, measurements may be organized in a linear chain and the verification data be derived as: $V_i = f(V_{i-1}, m_i)$, $i = 0, 1, \ldots, n-1$, where n is the length of the linear chain, $m_i$ denotes the i-th measurement, and $V_i$ denotes the verification data derived from the i-th iteration in the linear chain. The final value $V_{n-1}$, derived by processing the n measurement hash values of components, may be used as the verification data. There may exist a trusted reference value $R_i$ for every $V_i$: $i = 0, 1, \ldots, n-1$. If during a verification process, the final value $V_{n-1}$ is indicated as differing from its reference value $R_{n-1}$, then this indicates a mismatch of at least one of the interim value $V_k$ to its reference value $R_k$. Such a mismatch may be due to failure of the integrity of some component, or simply due to mismatch in comparison between a correctly computed (and/or integrity-intact) verification data Vj against a corrupted or erroneous reference data Rj. With the measurement log as a chain ($V_0$ to $V_{n-1}$), the first occurrence of the mismatch of the verification data to its reference value may be found by using Algorithm 1 as shown in FIG. 12. There are n elements and the indices range from 0 to n−1, and integer division is performed for index manipulations.

The reference values {Ri: i=0, 1, . . . , n−1} may be trusted and un-compromisable. In this case, any mismatch indicates either a failure of the integrity of the i-th component, or, the i-th component itself may be integrity-intact but its measurement m, may itself be compromised. In either case, in operational verification systems it may be declared that the i-th component is untrusted and may be remediated before loading. Algorithm 1 finds the first occurrence of the failure; but it may not find the-subsequent failures.

To optimize the search of the failed integrity check module, the verification data may be generated in the form of a hash tree of stored measurement logs (SMLs) as described in the tree-formed verification procedure as described above. The stored measurement log is organized into a balanced binary tree and algorithms are presented to generate the tree using TPM commands. The algorithm is generic and may be extended to balanced n-ary trees where n>2.

The concept of tree-formed verification as described above is extended to consider tree-formed verification where the tree is unbalanced. Further they may be extended to consider the interdependencies between the software components. The term device is used to indicate any entity whose integrity of software/firmware/hardware is being verified. Note that the entity may be a home gateway, M2M gateway, access point, H(e)NB, HNB, a Relay Node, a mobile device, a tablet device, or any other gateway or device.

Without loss of generality, certain software components may be subject to more attacks when compared to other components. For example, in a device, the communication protocol stack may be hacked more often than a component enabling cosmetic features. This argument is also applicable to functionalities. In remote validation and semi-autonomous validation, the integrity measurements are sent to the platform validating entity in the network. Such a validating entity may observe and retain history of the failed components or functionalities.

Also, it may be generally assumed that when devices (and/or their software components and/or functionalities) come under attack and/or get compromised of their integrity, the impact or cost to the devices' stakeholders may vary depending on the components/functionalities.

The above aspects render necessary a component/functionality verification strategy where the frequency and/or severity of cost or impact of the attacks may be considered and reflected in the design of the verification data structures and verification algorithms.

First, however, consider the case of different frequencies (or probabilities of occurrences) of attacks. Based on the integrity failure frequency of software components or functionality, a probability distribution function (PDF) of integrity failure over the software components or functionality may be estimated and used in the construction of the verification data structure. The probability distribution is a discrete distribution function and may be represented as a vector ($P_0$ to $P_{n-1}$), for a device with n components/functionalities. Such a probability distribution function may be generated by averaging all the observations or a windowed average where the average is performed with the last, sufficiently abundant samples. Additionally the averaging may be non-weighted mean or a weighted mean with a weight function W[n]. Examples of weight functions are, but not limited to, exponential, Gaussian, etc. Overlapping or non-overlapping sliding windows may also be used to obtain PDFs that vary in the temporal domain. This probability distribution vector (or vectors) may be communicated to the device either by messaging or configuration. Without loss of generality, we assume a temporally stationary set of PDFs $\{P_0, \ldots, P_{n-1}\}$.

Figure 13:
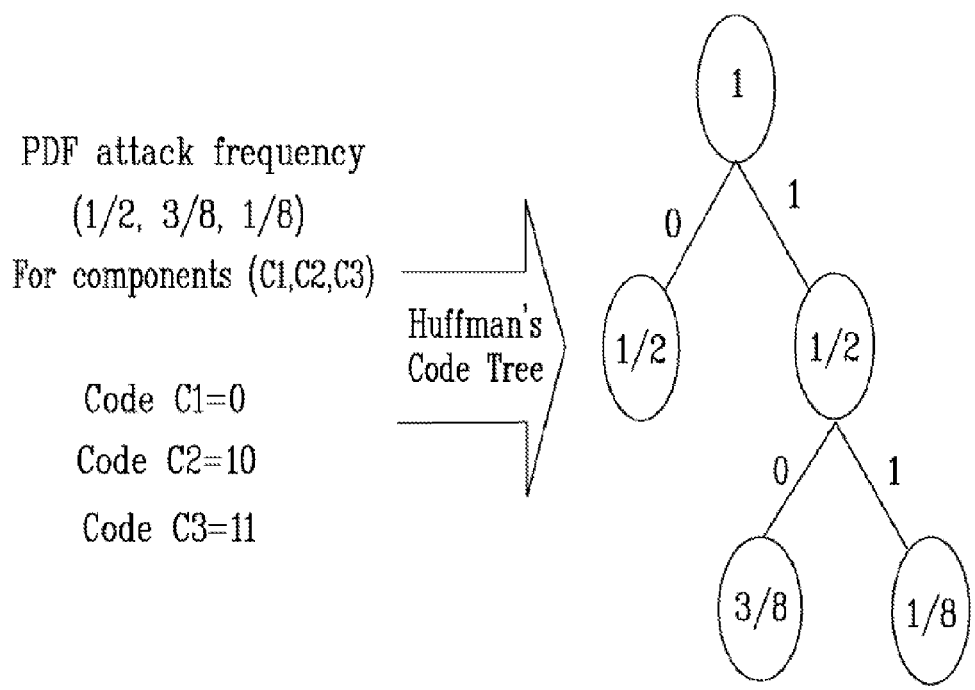
FIG. 13 shows an example of Huffman's coding tree.

At the device, using the distribution (PDF) and the hash integrity measurement values of the software components, an optimal hash tree may be constructed using Huffman's algorithm, arithmetic coding or similar such optimal coding tree constructing algorithm FIG. 13 illustrates an example of the tree construction using Huffman's code. The advantage of constructing such a tree is in the fact that the most frequently attacked components have a shorter code length and expected value of the search time is reduced. Thus the overhead in searching a failed component or functionality is reduced. Also, components that are expected to be under attacks the most frequently will be searched the earliest.

For the Huffman's algorithm or the arithmetic coding algorithm to work, the probability may be non-zero. Thus those components or functionalities whose probability of attack is zero may be dropped in constructing the tree. This may result in a reduced size of the tree reducing the communication overload and search time. Alternatively, if all nodes are to be included then a very small non-zero value of δ may be assigned to components or functionalities with zero probability of attack. Generally, since the probability distribution of attacks will be non-uniform, the resulting tree will be non-balanced.

In the network, such a tree may be pre-constructed and populated with the derived hash values by a certified authority based on the manufacturing time setup of the device or after an authenticated, authorized and integrity verifiable software/firmware update and stored securely for reference. In the device, each time the device boots securely, this tree may be reconstructed using the PDF of attack frequency by applying the optimal code tree algorithm (such as Huffman's code, arithmetic code) if it is not pre-constructed and stored and the nodes and the root are populated with the evaluated hash values (or extended PCR values).

An algorithm may be developed to populate the nodes of the tree and the root of the tree at the device using the measurements of the software components. Such a verification tree may be then sent by the device to the platform verification/validation entity in the network and compared with the reference tree to establish the trust state of the device and to uniquely identify the failed nodes. The algorithm is described herein.

Figure 14:
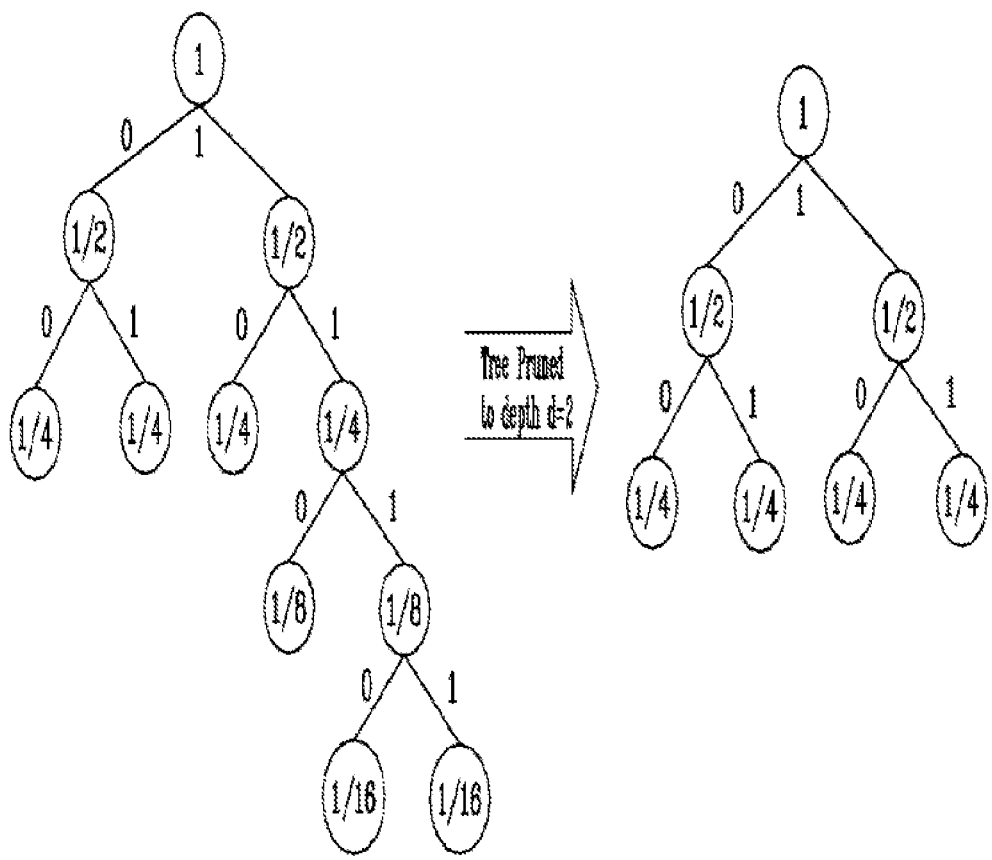
FIG. 14 shows an example of tree pruning.

To reduce the communication overload, a pruned tree of a specific depth d which includes the root and nodes at depth d, d−1, . . . , 0 may be sent. The depth d may be evaluated based on threshold values. Another method of pruning is to drop any node whose cumulative probability of attack occurrence is less than a specified threshold. Yet another, possibly more reasonable method may be to prune the tree of all remaining nodes when the cumulative distribution values for nodes that have been included in the tree have exceeded a specified threshold. FIG. 14 illustrates the tree pruning for a depth d=2.

Figure 15:
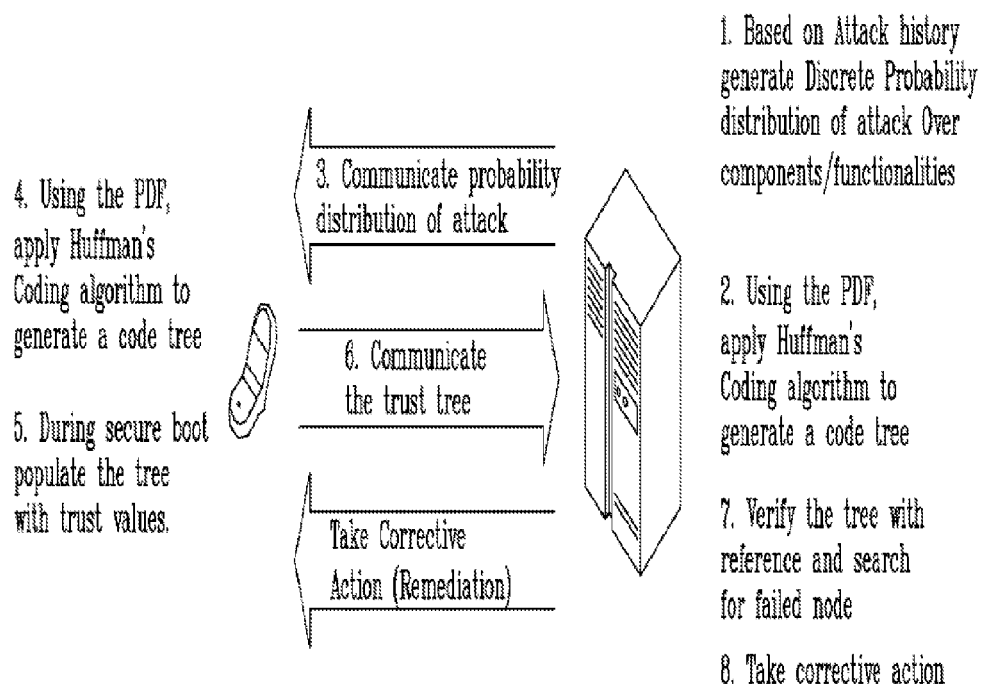
FIG. 15 illustrates optimal tree-formed verification system diagram/system diagram and associated communication.

FIG. 15 illustrates the system diagram and the communication interchange. FIG. 15 illustrates, at 1, based on Attach history, generating a discrete probability distribution of attack over components/functionalities. At 2, Huffman's coding algorithm is used to generate a code tree. The probability distribution of attack is communicated to a device, at 3. Huffman's coding algorithm is used to generate a coding tree at the WTRU, at 4. At 5, during secure boot, the tree is populated with trust values. The trust tree is communicated from the WTRU at 6. At 7, the tree is verified with reference and the tree is searched for failed nodes. Corrective action is taken at 8.

In the above description, the use of non-balanced trees resulting was seen by considering a non-uniform attack probability model for components. In addition to the attack probability, the cost or impact of any attack may also be considered. Suppose that any i-th component (i=0, 1, . . . , n−1) of a device is associated with $\{Pi, Ci\}$, where $P_i$ denotes the probability of occurrence and $C_i$ denotes the cost or impact to the stakeholder. Then, the components may be ordered by "expected cost (impact) due to attack/compromise" where the ordering is done by comparing:

$$E(\cos t)_i = P_i \times C_i.$$

Then the normalized, fractional expected cost may be determined by:

$$Ef(\text{cost})_i \frac{E(\text{cost})_i}{\sum_{k=0}^{n-1} E(\text{cost})_k}.$$

Once the components are ordered (from highest to lowest normalized expected costs), then one may use the same Huffman coding or Arithmetic coding to form the trees. A verification tree formed this way may give the most weight (for search) to the components whose failures may have the highest expected cost/impact to the stakeholder.

Figure 16:
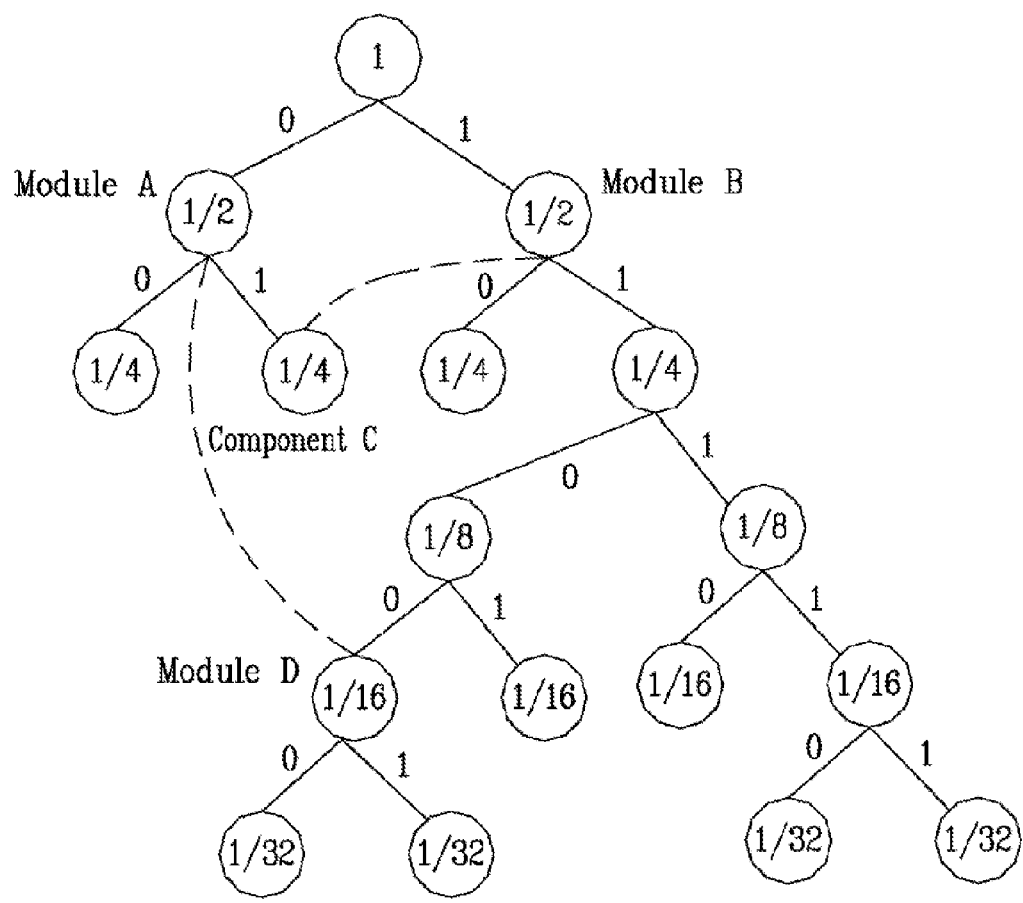
FIG. 16 illustrates a tree with surrogate child links where software components or functionalities indicated by a module utilizes another module.

A tree structure by itself may not completely capture the inter-dependencies of the software structure. For example, there may be shared libraries that may be used by different components. Therefore to indicate such interdependencies, links are added in between the nodes and the nodes/leaves of the tree after the initial optimal code tree is constructed. Thus, the tree is extended to capture the software architecture of the device or the interdependencies of the components. The tree leaves may be mapped to the software components and nodes to the libraries and archives. Interdependencies of the software modules and shared libraries may be mapped by surrogate child links. The tree thus becomes a generalized tree. The algorithm to populate the nodes with the measurement values may be modified to traverse the surrogate child links additionally. FIG. 16 illustrates a tree with such surrogate child links where the software component or functionality indicated by module A depends on or utilizes the shared library represented by module D and similarly the software component or functionality indicated by module B utilizes the leaf component/functionality C.

If the devices include a trusted execution environment, such as a TrE for example, to ensure the trusted operation of the algorithm and/or the trusted population of the nodes and/or the root with derived hash values, the algorithm may use the trusted operations and instructions provided by the TrE.

If one uses a Trusted Platform Module (TPM) and an upper-layer Trusted Software Stack (TSS) to construct such a TrE, appropriate command extensions for the TPM as well as the TSS may be considered.

As described above, any optimal code construction algorithm may be used to construct the tree. An example was presented where Huffman's algorithm was used to construct the tree.

In the following description, the leaves represent the software components or the functionalities. For simplicity, the components are referred, but the arguments may be applied to functionalities as well. A collision resistant hash function H may be used to compute the measurements of the components. Let the function F be used for computing the metric of the nodes by using the metrics of the children of the node under consideration. The algorithm Populate_metric may be called with Node set to Root of the optimal code tree. The metrics of the leaves of the tree are initialized to the measurement of the corresponding components.

Algorithm 2 shown in FIG. 17 performs the post-ordering traversal of the tree and computes the metrics of the internal nodes and populates the nodes with the computed metric values. To adapt the algorithm for a TPM, the function F is the PCR Extend operation. In the following algorithm, the Reg_Number is a subscript index indicating the PCR register number.

Algorithm 3 as shown in FIG. 18 is a modification of Algorithm 2 (FIG. 17) to work with the PCR registers and use the PCR_Extend operation. Algorithms 2 and 3, as shown in FIGS. 17 and 18 respectively, may be modified to work with n-ary trees. However, Huffman's algorithm may be modified accordingly to generate the trees. Instead of adding lowest 2 probabilities to add for left and right child, n lowest probabilities are added. Accordingly the labeling of the branches contains log 2(n) bits. For example, for 4-ary trees, 4 probabilities are added and label the 4 branches as 00,01,10,11. Algorithm 4, as shown in FIG. 19, is an update of Algorithm 2 for n-ary trees. And Algorithm 5, as shown in FIG. 20, may be updated similarly.

To construct a tree that is generalized to handle the surrogate child links as described above, Algorithm 3, as shown in FIG. 18, may be updated. Algorithm 5 is an update of the algorithm 2 in consideration of surrogate child links. Initially a binary tree is constructed using the Huffman's algorithm. The interdependencies are added later as surrogate child links. The labels 0 and 1 that are attached to the left and the right child are still used for finding the code of any leaf. The surrogate child links may be used to populate the metric in the nodes. No label may be attached to the surrogate child link itself.

After the nodes are populated with the metrics, the verification tree may be sent to the validating entity in the network. The comparison of the integrity tree with the reference tree is performed. This may be performed according to algorithm 6 as shown in FIG. 21.

Algorithm 6, as shown in FIG. 21, may be effective for (generally un-balanced) trees that do not have surrogate child links due to presence of inter-nodal dependencies.

The same algorithm may also apply if a tree with surrogate child links is processed as well. In this case, the algorithm is run without doing anything special to the surrogate child link relationships. When run this way, the algorithm still obtains the same pruned tree of failed components. The surrogate child links, however, provide additional visibility into the failure, because, when a component is identified as having failed integrity check, according to the algorithm, the surrogate child link relationship gives insights on which other node (that may not sit directly above the failed component) may also be impacted by the identified failed components.

In another variant of the algorithms described above, one may implement these and similar fault-detection algorithms in an 'interactive' way. In one embodiment, referring to back FIG. 14, for example, the sender may send measurements for nodes residing only up to a certain internal-depth $d \leq D$, where D is the depth of the longest branch. The verifier may verify those internal nodes.

If a failure is detected, then the verifier may request for more data, corresponding to the sub-tree below the failed internal node, to be sent from the sender. The sender obliges, and the verifier may then examine the integrity of the deeper-level of measurements. The method may contain more such interactions, instead of just two interactions.

An "interactive" protocol such as described above may make sense to use if it is difficult to send all tree-formed SMLs for all nodes of a tree at once, due, for example, to communication bandwidth or payload limitation reasons. A fully-formed binary tree contains at most double the data of a linear chain structure of SMLs. The extra amount of data that needs to be sent depends on the depth and fullness of the tree formation, but in some cases, the extra amount of data that even a fully-formed binary tree needs to send may be modest, for example, some more Kilobytes of measurement values. However, an interactive protocol may be more reasonable to consider if trees are annotated with more expressive, semantic validation data such as detailed certificates, RIM certificates or OMA DM information or similar and thus are large in terms of data size.

The binary tree-formed validation data structure may result from a particular, specific choice of validation system optimization criterion, which are 1) assured means to verify compromises to internal SMLs, and 2) fast search of compromised components. A binary tree-formed validation data structure, however, incurs costs such as 1) increased computational cost of fully constructing the tree at both the device and the verifier, and 2) increased cost of storage due to the need to storing internal SMLs (up to the twice the amount of linear SMLs). A tree may not be the best structure if there is a lot of inter-dependencies in various components of the device.

Other types of system optimization criteria may result in a validation structure that may be different from trees. For example, linear SML structure may be the best option if one is interested in absolutely minimizing the internal storage medium but at the cost of losing the fast and fine-granular ability to detect failures.

Another possible optimization criterion may be ease/speed of quickly determining the integrity of a vicinity (such as a small rectangle or a ring around) of one or a small number of known at-risk component(s) where the neighboring components are known to have high, unstructured interdependencies. In such cases, non-tree-formed validation data structures that may look like interconnected rings or meshes may arise, for example. For more general treatment of this topic, a graph-theoretic investigation may be applied.

Secure operations with tree-formed, protected verification data registers are described below. Functionality is conceptually added to Trusted Platform Modules (TPMs) to handle Platform Configuration Registers (PCRs) which represent roots of hash trees protecting the integrity of tree-formed Stored Measurement Logs (SMLs). This enables verification and update of an inner-node of an SML and even attestation to its value with the same security level as for ordinary PCRs. As an important application, it is shown how certification of SML subtrees enables attestation of platform properties.

More trusted functionalities may be added to operate on tree-formed verification data. It is shown inner nodes of a tree-formed SML with its root protected in a verification data register, may be verified for integrity, and updated with a new value, in a controlled way maintaining the overall security level. A variant of the TPM_Quote command for inner tree nodes is introduced, which may attest to their integrity precisely as TPM_Quote does for an ordinary PCR's value. With the defined set of commands, the integrity measurement functionality of a TPM may be complemented by a comprehensive set of commands operating with tree-formed PCRs and SMLs. Using them, tree-formed verification and/or validation data may be used with far more flexibility and expressiveness than ordinary, linearly chained TPM PCRs and SMLs.

A basic system model and notation is also described. Also provided is the TPM command extensions described above and is defined, and also provided are some pertinent structural extensions and basic usage categories for such operations. As a central use case for the introduced commands, also provided are exhibits for a protocol for certification of the root node of a subtree in a tree-formed SML by a trusted third party and a brief assessment of the tree-formed platform validation approach and an outlook to future work is also described.

Minimal elements and capabilities of a platform, which may be required subsequently, are described. TCG-nomenclature and some concepts are used and described herein, but the embodiments described herein are not restricted to platforms and secure hardware elements adhering to TCG standards, such as TPMs, SMLs, and systems designed according to the PC Client specification for example.

The tree-formation variant of the extend operation defined above operates inside a TPM, takes a single measurement value as input, and is otherwise inert with regard to the system outside the TPM. This is not the case for the update function which is described herein. The latter operates on a certain number r of verification data registers V, V def $\{V_1, \ldots V_r\}$ protected inside a TPM, and on the hash tree data stored outside the TPM in less protected storage.

That is, the hash tree contained in the Stored Measurement Log (SML) may be managed by a Trusted Software Stack (TSS) which is authorized to access the TPM functions necessary for the update operations. TSS calls TPM via an authorized, integrity protected command interface. While TCG is used as common parlance for practical reasons, the concepts presented here are not restricted to a TCG, TPM and platform. A hardware-protected set of verification data registers and an extend operation may be used. The latter may be defined by the ordinary TPM extend operation:

$$V \leftarrow V \diamond m \text{ def } H(V\|m) \quad \text{(Equation 4)},$$

where V denotes a verification data register, H is a collision resistant hash function (SHA-1 in case of the TPM), and m=H(data) is a measurement value. In the following $\diamond$ is used liberally with arbitrary registers V as arguments, so that no confusion may arise.

The SML may contain a binary tree of depth d resulting from a binary one-way operation, such as the Merkle hash tree for example, produced by the TPM_Tree_Extend command described above. Natural coordinates for inner nodes and leaves are binary strings of length 1, . . . d, where the length 1 of the string is the level in the tree on which the node resides. Let n be an inner node or leaf and write n~$\langle n \rangle$= $(n_1, \ldots, n_l) \in \{0,1\}^{x1}$ for the binary representation of the coordinates of n. Let $\langle n \rangle = n_l$, k=1, . . . 1, be the k-th digit of $\langle n \rangle$. So that no confusion may arise, a node may be identified with its value (e.g., 160-Bit hash value) in the SML, while distinguishing it from its coordinate. Otherwise, n=(n, $\langle n \rangle$) for the value-coordinate pair of a node.

The trace T of n is the ordered list of all inner nodes on the path from n to the root, including n, i.e., $$T(n) = (t_1, \ldots t_l), \text{ where } t_k \sim (n_1, \ldots n_k). \quad \text{(Equation 5)}$$

The natural partial order of nodes is written as m≤n, which is equivalent to n∈T(m). The partial order extends to sets M, N of nodes by setting M≤N if and only if ∀m∈M:∃n∈N:m≤n.

The reduced tree R of n is the list of all siblings of its trace. This is readily expressed in natural coordinates: R(n)= $(r_1, \ldots r_l)$; where $r_k \sim (n_1, \ldots \neg n_k)$, (Equation 5) where $\neg$ denotes binary negation.

The hash chain operation $x \diamond y$ def H(x\|y), is used with fixed-length input hash values x, y, in a variant which makes argument order depended on a binary parameter. For c∈{0,1}, the following may be set:

$\langle x\|y \rangle = \{x \diamond y \text{ if } c=1;$ $\langle x\|y \rangle = \{y \diamond x \text{ if } c=1;$ This chiral Merkle-Damgard operation is a version of an extend operation which allows to distinguish between left and right siblings in a tree and calculate their parent node in the correct order. Neglecting implementation issues, the (extended) TPM may be capable of performing $\langle .|.|. \rangle$ =internally.

In some cases, the hash tree stored in the SML may be incomplete, i.e., contain empty leaves and inner nodes, denoted by nil. For the consistent treatment of nil nodes in a Merkle hash tree, it is useful to assume that nil is a two-sided unit for the operation $\diamond$, i.e., $$x \diamond nil = nil \diamond x = x, \text{ and } nil \diamond nil = nil \quad \text{(Equation 6)}.$$

This is a re-interpretation of the usual TPM extend operation and can also be used to model a direct write to a V▲v, by first resetting V to nil and then performing V $\diamond$ x for some value x. For the implementation of this convention, nil may be represented as a flag of verification data registers and the inputs and output of $\langle .|.|. \rangle$. For a V, the nil flag may be set by a particular reset command. When nil is encountered as the input of an extend operation to a V, then logic of the TSS, or a TPM modification, may prevent execution of the extend and write to the PCR directly.

The operational extensions of a standard TPM to operate securely with tree-formed SMLs are described. The protection goal is to achieve the same assurance level for inner nodes and leaves of such an SML, as for a conventional verification data register value, protected in a PCR. The update of a root by a new node value is first described, and then further structural and command extensions are shown for use with tree-formed verification data.

The strategy for a secure update of an inner node or leaf of a SML tree is as follows. First, the current value of that node may be verified for authenticity. This is done by recalculating the root of the tree, protected in a register V, (which is kept fixed in the remainder of the section to simplify presentation) using the data contained in the reduced hash tree associated with the node. This verification must be a protected operation inside the TPM, called TPM_Reduced_Tree_Verify_Load. It also loads the verified reduced tree data into a set of verification data registers for use with the subsequent update operation TPM_Reduced_Tree_Update. This function takes a new value for the node to be updated, and uses the reduced tree data to update the parent nodes up to the root V. Both commands may be used separately for various purposes, for instance standalone node integrity verification. For convenience, they may also be combined into a single node and root update command.

Suppose n is the node of an SML tree of depth d at level $1 \leq l \leq d$ with root protected in a verification data register $V \in v$. The first step is to update V with a new value for n, is to verify that the reduced tree R(n) is untampered in the SML.

To maintain the security level of V, this verification may be performed by a TPM-protected operation as well. For this, TSS calls TPM_Reduced_Tree_Verify Load with arguments $((\langle n \rangle, n, R(n))$. Choose l+1 available registers from V and call them $B_1, \ldots B_l$, and V*. Algorithm 1 as shown in FIG. 22 shows how an SML node is verified and its reduced tree is loaded into a set of verification data registers.

The chiral extend used centrally in this algorithm ensures correct order of the child nodes in the calculation of their parent element on the trace of n. The TSS obtains the calculated trace T(n) and the verification status as return values. In algorithm 1, as shown in FIG. 22, 1+1 there are additional verification data registers.

A simple variant of Algorithm 1 in FIG. 22 may operate using a single verification data register, by processing the reduced tree sequentially, without storing the reduced tree inside the TPM. This auxiliary command TPM_Reduced_Tree_Verify may be useful for a plain verification of the SML by the TSS or another party. This is shown in Algorithm 2 as shown in FIG. 23. The serialization of R(n) required by this variant may be done using an input buffer realized in a software layer below the TSS, e.g., a TPM device driver, or by corresponding TPM internal logic.

Like the original tree formation algorithms as described (FIGS. 4 and 6) Algorithms 1 and 2 (FIGS. 22 and 23, respectively) use non-standard operations, in particular chiral extend. Since the output target of chiral extend is always a verification data register, the operation may be implemented by loading the other argument into another verification data register (if it is not already there, as in Algorithm 1 in FIG. 22), and preceding the TPM-internal operation $\Diamond$ with a register swap, depending on the middle argument of chiral extend. This may ensure the same protection level for all arguments.

The verification performed by algorithms 1 and 2 of FIGS. 22 and 23 respectively has a limited meaning since it assures the integrity of the input node value with respect to the input reduced tree. In case of an integrity breach of the SML tree, more detailed information is desirable. At least the tree level at which an integrity breach occurs may be obtained, by performing the validation strategy via the downward tree-traversal described above.

The command TPM_Tree_Node_Verify shown in Algorithm 3 (FIG. 24a) returns the level at which an incorrect reduced tree and/or trace element first broke the integrity chain from the root to n. It does not allow to determine which sibling broke the chain. Further diagnostics may be possible when a reference tree is available as described above.

TPM_Reduced_Tree_Verify_Load may be performed for a node n which may be updated with a new value n'. The command TPM_Reduced_Tree_Update, shown in Algorithm 4 (FIG. 24b) is called with argument n' and may operate on the result of a determined, preceding TPM_Reduced_Tree_Verify_Load, which fixes the node coordinate (n) and the register V to be updated. To achieve this binding in a command sequence, various methods can be employed.

First, the TPM may store and manage states and additional data for tree operations as described below. Furthermore, the sequence of commands TPM_Reduced_Tree_Verify_Load and TPM_Reduced Tree_Update may be bound cryptographically, for example by rolling nonces as implemented by TPM protected OIAP/OSAP authorized command sessions. Finally, the two commands may be joined to a single update command TPM_Tree_Node Verified_Update, with arguments $(\langle n \rangle, n, n', R(n))$. The node update commands return the new trace of n" and the new value of V, with which the TSS then updates the SML.

With the association of verification data registers to certain nodes or roots of hash trees, and the associated commands TPM_Tree Extend (defined above), TPM_Reduced_Tree_Verify_Load, TPM_Reduced_Tree_Update, these registers V acquire statefulness. States of particular importance may be:

Active Root (AR) signifying a root of an SML tree currently under construction by the TPM_Tree_Extend operation.

Complete Root (CR) signifying the root of a tree which is the completed result of the measurement of a number of components, i.e., TPM_Tree_Extend operations. AR may transition to CR when the tree is full, i.e., contains 2d leaf measurements, or triggered by the TSS if it is desired to close a tree at a certain stage. A V in CR state may be protected against further updates with TPM_Tree_Extend, but may be accessed by TPM_Reduced_Tree_Update or even the normal TPM_Extend operation depending on policies and authorization.

Tree Build (TB) signifying a register used to build an active tree in another, AR register by the TPM Tree_Extend operation.

Reduced Tree Node (RT) signifying the result of TPM_Reduced_Tree_Verify_Load, i.e., one of the registers $B_k$. An RT V may be protected until the corresponding TPM_Reduced_Tree_Update, or another, authorized command occurs.

When more than one tree is managed, Vs' states need to be associated to their respective trees, e.g., using Unique Identifiers (UIDs). Furthermore node coordinates may need to be stored for each or some register(s). These data may be held in a Verification Data Allocation Table (VDAT) inside the TPM, and managed by a Tree Data Management Unit (TDMU).

TPM protected verification of a node value may enable a new core semantic for platform validation by attestation. In particular, a variant of TPM_Quote may be defined that attests to a certain node value. Such a command TPM_Tree_Node_Quote may be called with the same arguments as TPM_Quote plus the arguments of TPM_Reduced_Tree_Verify. It then executes Algorithm 2, as shown in FIG. 23, but additionally keeps a copy of n in another PCR V'. Upon success it executes TPM_Quote on V'. The receiver of such a quote should be made aware that the signature obtained is over an SML tree's inner node. One possibility would be to change the fixed string contained in the signed blob of the TPM_Quote command, which normally is "QUOT" to say, "TREEQUOT".

Attestation to a node value with this command provides to the node the same security assertion as quoting a verification data register (PCR) value with TPM_Quote. However, it may bear the additional semantics that the value corresponds to some inner node of an SML tree, i.e., it effectively attests to the state of a certain subtree of which n is the root. To explicitly convey this semantics to a validator, additional data may be included in the AIK (Attestation Identity Key) signed attestation package, e.g., a string "Tree Node". The meaning of such an attribute can be sensibly strengthened, if it is assigned by TPM_Tree_Node_Quote if the root register is a controlled SML root register resulting from TPM_Tree_Extend commands, i.e., it is in the CR state, as discussed above. This control may be part of the quote generation.

For the validation of an attestation message, the validator may need the value n of the quoted node n=(n, ⟨n⟩). More information transfer to the validator may not be needed, therefore the above description of TPM_Tree_Node_Quote follows a principle of minimal revelation. A variant of the command may also sign the node coordinate (n), if the position of the node in the SML tree matters for validation. Extended validation data transferred to a validator may include the reduced tree of n and root verification data register.

As an alternative embodiment, it may be possible to task the validator with the verification of the reduced tree. This approach is used elsewhere to attest to the integrity of Web pages delivered by a Web server, and to bind this to an attestation of the server's state using the ordinary TPM_Quote command. This brings forth a variant realization of TPM_Tree_Node_Quote, as follows.

The command receives as arguments the node value n, the node values of R(n), and a selector for the root V. The TPM signs this (concatenated) data after controlling the CR state of V and with a "REDTREEQUOT" fixed string attribute. It is notable that for the approach used to attest the integrity of Web pages, a workaround method is used to bind a reduced tree to a quote from a TPM, by inserting a hash of these additional data into the nonce input of the TPM_Quote command, which is normally used to guarantee freshness of the quote.

The first and second realization variant for quoting an inner node represent opposite possibilities, in the sense that the first puts verification load with the platform, while the second puts it with the validator. Therefore, both may have different domains of practical efficiency. For instance, many, distributed validating platforms as in M2M communication for the first, and many, distributed validators (such as the Web clients as described above) for the second variant. But the second variant has, by principle drawbacks with regard to information revelation of the platform, since the validator is shown the complete state represented by V. This may be detrimental to privacy.

The various extensions of the TPM integrity measurement functionalities introduced here may be grouped into the following categories. TPM_Tree_Extend is used in the continuous measurement process that builds a particular SML tree with PCR protected root. TPM_Reduced_Tree_Verify_Load, TPM_Reduced_Tree_Verify, and ultimately TPM_Tree Node_Verify are commands for platform-internal diagnostics. Apart from the usage of TPM_Reduced_Tree_ Verify_Load as a preparation step to TPM_Reduced_ Tree_Update, they may be used to verify certain properties of a platform, represented by SML subtrees, before other events may happen.

TPM_Reduced_Tree Update and TPM_Tree_Node_Verified_Update may be used for the controlled update of subtrees. Particular usages of an inner node update operation are described as follows:

Update of a single system component. In this case the new value updates a leaf.

Update of a system module represented by a subtree. In this case the root of the new subtree updates an inner node of the original tree.

Finally, TPM_Tree_Node_Quote is the command which makes tree-formed SML usable for validation of a platform by a remote party. It exhibits the key new element of validation using tree-formed data, namely the possibility to attest to subtrees representing only a defined part of the system state. A particular use case is described below.

Command extensions may be used in tree-formed validation separately. Described below is a method which combines command extensions to validate subtrees in a modular fashion.

Validation using tree-formed SMLs and verification data registers adds semantics to remote attestation. The possibility to attest to subtrees of an SML enables expressiveness far beyond conventional remote attestation. Tree-formed verification data is one way to substantiate other proposals to add semantics to platform attestation, e.g., association of properties to validation data, as in PBA. One problem of Trusted Computing is the association of semantics to platform attestation. TCG specifications define a bilateral remote attestation in which executed code is measured when it gets loaded. The measurements are stored in PCRs as verification data, and the TPM attests to these data by signing them with a TPM protected Attestation Identity Key (AIK). Since a digest of a complete configuration is transmitted, the verifier may know configurations of the machines (at all times, if system dynamics are considered). The transmitted data for validation thus lacks expressiveness to enable versatile and efficient remote platform validation. The need for semantic attestation was recognized early on, where it was proposed to restrict the scope of a single attestation to a virtualized subsystem with limited complexity, allowing for attestation of complex, dynamic, and high-level program properties.

Property and property-based attestation (PBA) are described herein. PBA allows assuring the verifier of security properties of the verified platform via a trusted third party (TTP), called Subtree certificate authority (SCA). The SCA issues a certificate which maps the platforms configuration to the properties (in particular desired/undesired functionality) which may be fulfilled in this configuration. PBA moves the infrastructural problem of platform validation to an SCA, similarly to, but extending the role of, the TCG's privacy CA. Certification of subtrees is one way to overcome the problems described. One related embodiment is that of hardware-supported updates, performed by a TPM command which reseals data for another platform configuration based on an update certificate.

In distinction to verification data, validation data is all data that is submitted to another party, the validator, and used to assess the trustworthiness of a state of the platform. The process of submission of validation data to the validator, realized as remote attestation according to TCG for example, and evaluation thereof by the validator, is properly called validation. Validation data may comprise verification data such as quoted verification data register (e.g., PCR) values. Validation may, beyond cryptographic verification of verification data, include policy evaluation and triggering of actions by the validator.

Tree-formed verification data and validation data associated to an SML tree, provide structured data which may be used in addition to the approaches as described above to enhance the semantics of platform attestation. Another method for using tree-formed verification data is provided to realize concepts related to PBA.

It is shown how an SCA may replace a node in an SML tree with a meaningful, trusted statement—a subtree certificate—about the subtree of measured components of which the latter node is the root. This process realizes a partial validation of the platform by the SCA and results in a trusted assertion that is ingested in the available validation data of the plat-form. This may later be used toward another validator to validate the platform more fully. Next, a generic base protocol for subtree certification which may be implemented for variant realizations and use cases is described. Variants are also described.

Subtree certification is a process by which a Trusted Platform (which may be, but is not limited to the combination of TPM and TSS in a simplified system model) obtains a certificate for the value of an inner node of a tree-formed SML from an SCA. For this, the platform submits a signed statement to the SCA, signifying that the node value is contained in an SML tree with root value protected in a verification data register. TPM is one possible implementation and any verification data register may be used. Based on this evidence, the SCA may issue a certificate with additional attributes about this node value to the platform, which is then ingested into the SML tree. The process uses protected tree operations.

Figure 26:
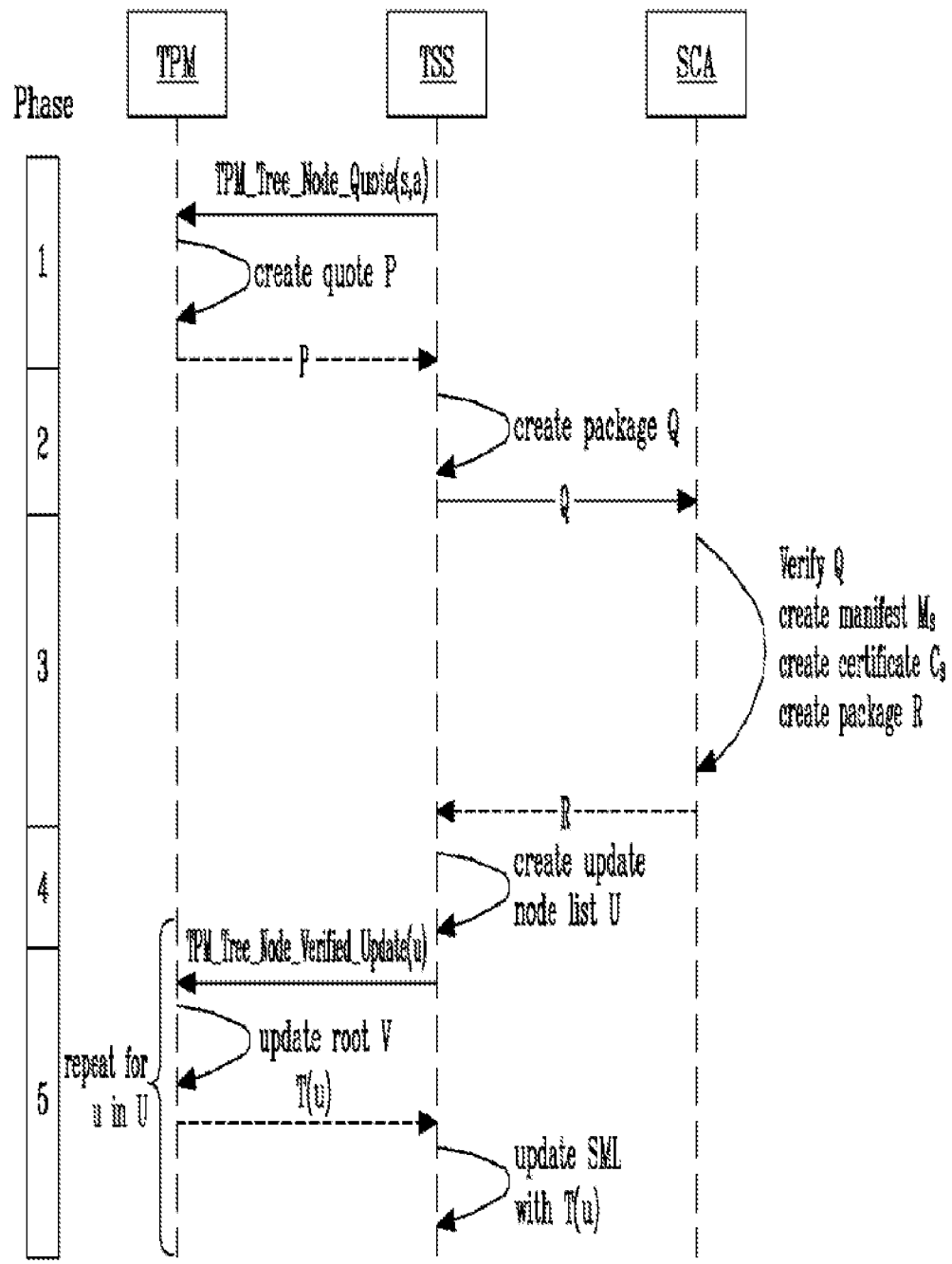
FIG. 26 shows Subtree certification Protocol for a subtree with roots.

The platform may possess an active AIK a, with certificate $C_a$ issued by a trusted Privacy CA (PCA). Communication between the platform and the SCA is encrypted and integrity protected to mitigate man-in-the-middle attacks. An inner node s is selected for certification. In the protocol, failure conditions and negative responses are not mentioned. The subtree certification protocol proceeds in at least five phases, as depicted in the FIG. 26.

Phase 1 creates a quote over s. For this, TSS calls TPM_Tree_Node_Quote with arguments ($\langle s \rangle$,s,R(s),a) (for brevity, FIG. 26 does not show all arguments that may be called) and receives back P=$Sig_a$ (s).

If the root of the tree, i.e. the register V is selected for certification, then TPM_Quote is to be used on V instead. In phase 2, the TSS creates an attestation package Q. It contains information for the verifying SCA, at least: $Q \subseteq \{P,s, C_a,a_{pub}\}$. The public part $a_{pub}$ of a may be contained in Q when it is not evident from $C_a$. Also, the value of s may be known to SCA and then be omitted from Q.

More information may be included, for example the node coordinate $\langle s \rangle$, when it is part of the quote. Q is sent (encrypted with a public encryption key of SCA and integrity-protected) to SCA. This phase is similar as in remote attestation specified by the TCG.

Phase 3 comprises the activities of SCA. First, SCA may verify Q by verifying the signature of P and/or tracing the certificate chain, up to the root certificate of the PCA. If the SCA recognizes s as a node value which it may certify, it creates a manifest $M_s$ for it. This manifest may contain additional information about the platform state associated with the presence of the subtree with root s in the SML, such as a time stamp, a functionality of the platform, the identification of a module combined from the loaded components represented by the leaf measurements of the subtree, and/or another platform property. The manifest is the validation data added by subtree certification which provides semantic meaning to the node value s to a validator. The SCA may create a certificate for s. This certificate, Cs, binds the properties represented by M to the platform, by binding it to the AIK a. This may be done in two ways, namely:

$$C_s = \begin{cases} Sig_{SCA}(M_s \| P) & \text{if } s \text{ is revealed;} \\ Sig_{SCA}(M_s \| \text{bind}(a)) & \text{if } s \text{ is concealed.} \end{cases}$$

In the first case, SCA signs the manifest and the AIK-signed node value, thus establishing an indirect binding to a. The binding of Cs to a, may then be verified if the platform reveals the node value s. In the second option, the binding is achieved directly, by letting the SCA sign some data bind(a) which uniquely identifies a, such as a's public part, $C_a$, the serial number, or the fingerprint of $C_a$. In the semantics of Public Key Infrastructures, $C_s$ is, by the binding, an attribute certificate associated with $C_a$. Finally, SCA creates a package R containing at least $M_s$ and $C_s$, and bind(a) in the second case, and returns it to the platform.

Phase 4 prepares the update of the SML with certain data derived from R. The SML update may produce a binding association between the subtree certificate and the certified node's position $\langle s \rangle$ in the tree.

This may allow the platform to assert to a validator that the property attested by $C_s$ and $M_s$ is present in the platform's configuration. Various ways of SML update to bind $C_s$ to the represented subtree are conceivable, each suited differently for particular use cases.

A set $U=\{u_1, \ldots, u_k\}$ of new node nodes (values and positions in the SML tree for example) is created with the following properties. First, it may hold $U \leq s$, so that the subtree below s is touched by the update. This may be performed because old SML tree nodes $n \leq U$ strictly below U, i.e., $n/\epsilon U$ are invalidated by the update, and may not be verified anymore with respect to the updated root verification data register. Second, U is dependency-free, i.e., $u,u' \epsilon U: u \leq u'$.

Dependency free is a property ensuring consistency of the tree update by U with the one-way (upward) information flow embodied in Merkle hash trees. In particular it makes the update result independent of the order in which elements of U are processed.

Phase 5 is the SML tree update proper. Iterating over $u \epsilon U$, TPM_Tree_NodeVerified_Update is called with arguments (u,n,u,R(n)), where n is the old SML node value at position $\langle u \rangle$. This returns the new trace T(u) with which the TSS updates the SML. Executing the tree update in the way described above maintains a consistent security level for the SML and root verification data register. Namely, the operation $\diamond$ is executed inside the TPM. When U contains many elements, it may not be efficient to perform the update in the way described for Phase 5, since TPM_Tree_Node_Verified_Update would in such a case verify many overlapping reduced trees and thus incur redundancy in (complex) hash calculations. A more efficient update algorithm is described below, called "Efficient Secure Node Set Update".

As mentioned above, updating a large set U of inner nodes may be inefficient using TPM_Tree_Node_Verified_Update, since many redundant hash operations for verification may occur, depending on the overlap of the reduced trees of the elements of U. A bulk update strategy may be applied to improve the naïve algorithm of Phase 5 of the subtree certification protocol, using the TPM_Tree_Extend command described above. It rests on the observation that subsets of the update set U span subtrees which are independent of the old SML values, i.e., their roots depend on nodes in U. Thus the roots of the trees spanned by such sets may be pre-calculated without expensive verification.

Some definitions are provided. Assume $U=\{u_1, \ldots u_k\}$ is a dependency-free update set. A node in the SML tree is called U-intrinsic, if a) it is an element of U, b) its sibling is in U, or c) its sibling is U-intrinsic. This recursive definition captures nodes whose updated values depend on U and not on SML nodes in the complement of U. The span root of a subset $V \subseteq U$ is the unique intersection point of the traces of all elements of V. The subtree spanned by a subset $V \subseteq U$ is the union of traces of elements of V with nodes strictly above the span root omitted. The subset V is called U-intrinsic if all elements of its spanned subtree are U-intrinsic.

With these settings, more efficient update of the SML with U is done as follows:

1) Identify the (mutually disjoint) U-intrinsic subsets $V_1, \ldots V_k \subseteq U$.
2) Iterate over $V_i$, $i=1, \ldots k$.
   a. Normalize the coordinates of elements of $V_i$ by
      i) truncating the prefix given by the coordinate of the span root of Vi, and
      ii) post-fixing zeroes until all coordinates have equal length, the depth of the subtree spanned by $V_i$.
   b) Order the elements of $V_i$ alphabetically according to their normalized coordinates, producing an ordered list $\tilde{V}_i$.
   c) Fill up all gaps (in the normalized coordinates) in $\tilde{V}_i$ with nil values.
   d) Select a free verification data register V'.
   e) Sequentially use TPM_Tree_Extend on the elements of $\tilde{V}_i$ with target V'.
   f) Remove $V_i$ from U.
   g) Insert (V', $\langle v_i \rangle$) into U, where $v_i$ is $V_i$'s span root.
3) For the remaining elements of U, apply the normal update procedure of as described above using TPM Tree_Node_Verified_Update.

A variant of the subtree certification protocol may combine the roles of PCA and SCA for AIK, respectively, subtree certification in a single protocol run. An advantage would be that no explicit generation and verification of an AIK certificate $C_a$ may be necessary, because generation, activation, and use of the AIK are bound into one session. This combination of protocols is straightforward.

Binding the received subtree certificate to the platform state means binding it to the tree-formed SML in the correct configuration, i.e., the position of the certified subtree's root. As mentioned above, this is essential for meaningful subtree certificate-based validation in the context of an overall platform configuration. One particular goal of binding the $C_s$ to the SML tree is integrity protection, since, for example, later replacement with a different certificate may be prevented. The binding may be achieved by updating parts of the tree with data which uniquely and verifiably identifies the subtree certificate. A wide range of data items may be produced from the subtree certificate and entered into the SML tree in various positions.

In one example the SML update may be trivial and U may be empty. This may be possible if a is composed by the first option of described above, revealing s. Then s may be retained in the SML tree and whether the subtree below it is also retained depends on the use case. The binding association is via the actual node value s signed by C.

Figure 27:
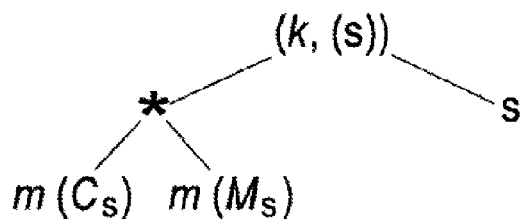
FIG. 27 shows Certificate Subtree Binding.

As another example, consider the case that data concerning the platform property attested by the certificate may be protected by the updated tree, e.g., for forensic use. That is, the three data items s, $M_s$, and $C_s$ may enter the update set. While the node value s is already in the correct data format, the other two are first processed to $m(M_s)$) and m(C(s)). The operation m may be the generation of a hash value by the platform's Root of Trust for Measurement (RTM), or another appropriate one-way operation. If some data item already contains suitable, uniquely identifying data of the appropriate node value format, then it may be directly extracted and used as node update value. A particular example may be a certificate fingerprint contained in C(s). The three update nodes may then be configured in an update set to produce, for example, the configuration of updated nodes in the SML tree as shown in FIG. 27.

The root of the updated subtree is inserted in the old position of s and has the value $k=(m(C_s) \diamond m(M_s)) \diamond s$. This configuration provides independent integrity protection to the subtree certificate and manifest, and retains the old node value independently. Attestation to the platform property represented by $C_s$ may, in this configuration, still be done without revealing information about s, by quoting only the left inner node * of the subtree.

Variants of certificate to subtree binding abound. The platform may also want to include (integrity protection values of) own generated data therein, for example an internal time stamp from a secure clock. Implementation here may be use case specific.

For the attestation of the property represented by a subtree certificate to a validator, the platform may quote, using TPM_Tree_Node_Quote, any node in or above the updated subtree which protects the intended validation data, which comprises at least the manifest and the certificate proper. The platform may then submit validation data as necessary to the validator, at least all data needed for verification of the asserted property, again comprising at least $M_s$ and $C_s$. The validation data which is already protected by the submitted quote does not, in principle, require additional integrity protection.

The validator may verify platform binding of the validation data. Proving this property, i.e., that the validating platform is the same that performed sub-tree certification toward the SCA, may be non trivial. One way to achieve it is to use the same AIK, a, in subtree validation as in certification. The platform may then also submit $a_{pub}$, and if necessary also $C_a$ as part of the validation data. Whether $C_a$ may be needed depends on the semantics of the subtree certificate, i.e., SCA may already have checked the AIK certificate and $C_s$ may state its veracity. According information may be placed in the manifest. Reusing the same AIK partially compromises privacy, and other methods to solve the problem may also be considered.

One step for the use of subtree certification is the discovery of subtrees for which a platform may obtain certificates from a particular SCA. Without going into details of the interactions between platform, SCA, and validator, two categories of subtree discovery methods are described below. The first one places the workload of subtree discovery with the platform, while the second one assumes a "dumb" platform and places more load on the SCA.

In one example, the SCA sends some subtree discovery data to the platform, in the simplest case a list of node values which it is ready to certify. The platform may search for these values in its SML tree and perform subtree certification for each identified node. This baseline procedure suggests various refinements, in particular enriching the discovery data and extending the discovery procedure to a negotiation protocol between platform and SCA. For example, discovery data may contain root node positions as conditions on certifiable roots, which would, in the case of an SML produced in an authenticated boot process, correspond to the fact that the components loaded during the build of the latter subtree are loaded at a defined stage of the platform start up.

Such conditions on absolute positioning of nodes may be difficult in practice for complex platforms whose configurations may change dynamically. More refined conditions may therefore also express relative positions of some, e.g., pairs of certifiable roots. The SC may state expressions, such as an expression saying "s is certifiable, if it is preceded by r" for example (i.e., r may rely to the left of s in the ordered SML tree). This may be interpreted to the end that a certain functionality is operational on the platform if another functionality was made operational before it.

A more fundamentally different variant of the model is that the discovery data does not consist of subtree roots, i.e., inner nodes, but rather of leaf, i.e., measurement, values. A "bottom up" discovery procedure may require that the platform makes an "educated guess" about which inner nodes are certifiable, based on the received leaf measurement values which the SCA asserts to know as trusted values. One method is to find the set of span roots of subtrees whose leaves are all in the discovery data. The platform may then quote a subtree root and send it together with its SML subtree to the SCA. In general, the SCA may have to verify the SML subtree and decide if it is ready to certify that root, since this may still depend on the order of the leaves. In some cases, the platform may want to obtain a certificate for a subtree for which the SCA knows some leaf values, i.e., the leaf set of the corresponding subtree may have gaps with respect to the discovery data. If the platform has other trusted data, for example RIM certificates obtained from a party which the SCA trusts, the platform may submit these data in Phase 2 of the subtree certification, to aid SCA with its decision to certify the subtree root.

In the case that the device is not capable to perform a local discovery of subtrees, an implementation may be used which moves the computational to the SCA. The platform selects an inner node n, with the aim to retrieve certificates from the SCA for any suitable subtrees below n. The node n may be equal to the root of the complete tree (V), in the case that the platform wants to get all certifiable nodes certified. The next two steps are the same as described in Phases 1 and 2 above, i.e., the platform performs a TPM_Tree_Node_Quote, or TPM_Quote, respectively, if V was selected. An attestation package is wrapped together with the SML subtree below the quoted root. The SCA receives this information and may then, using tree traversal techniques, verify the integrity of the tree and concurrently find one or multiple (disjoint) subtrees $S_i$ with certifiable set of roots S.

The SCA then iterates phase 3 of the protocol as described above, creating certificates for all $s_i \in S$. Since the protocol allows for the update of multiple nodes, incorporated into the update node list U, the update of all found subtrees may be done in a single protocol run. A variant may be for the platform to not send a TPM_Tree_Node_Quote or TPM_Quote in the first step, but provide the SCA with the SML, starting from the selected node n. The SCA then searches for potential candidate sub-trees to be certified and then requests the platform to provide a TPM_Tree_Node Quote for the root nodes of the identified subtrees. This is a trade-off in the sense that it allows the platform to send the SML without having to perform cryptographic operations in advance. Nevertheless, the platform may provide appropriate quotes prior to the certification by the SCA to provide integrity protection for the sent SML.

Described above are systems, methods, and apparatus for implementing TFV. Described below are variants and/or extensions of TFV.

A method for a validator to traverse a tree-formed SML submitted by a platform, may be by descending level by level as described above. Described below is a variant procedure in which the validator first looks for known good values of roots of subtrees in the SML tree, to identify known good parts of the validated platform, before traversing the SML tree for failed leaf components.

It may be difficult to keep reference trees of the SML trees of a whole platform. Such a tree may be large and depend sensitively on platform configuration, such as load orders of components for example. The tree traversal validation assumes a static measurement sequence in determining that the diagnostic validation described therein identifies components which do not conform to a desired reference configuration of the validated platform. In fact, since the Merkle-Damgard transform is neither commutative nor associative (it is not a multi-set hash function) the tree root values depend on the exact measurement sequence. Since the same holds for linearly created PCR values, the performance comparison described above is still fair. The problem of order-sensitivity of the tree root is addressed further below. The methods described there may be combined with the ones described here.

The state of affairs may, in a naïve solution, necessitate to maintain reference trees for effectively (functionally and with regard to security) equivalent configurations of a platform. Thus, a finer-grained dataset for validation, than complete reference trees may be desired.

Instead of keeping a database of known good values of roots of SML trees and corresponding reference trees, the validator keeps an extended database of known good subtree root values of subtrees of various depths. These values are stored as pairs (r,d), where r is the node value of the subtree root and h is the depth of the subtree. The depth d ranges from the depth D of the full SML tree to 0, where d=0 means that the corresponding known good reference value is actually a leaf measurement. When reaching a certain level L in diagnostic tree traversal, and after cryptographic verification, the validator compares, by breadth-first search, the node values of the received SML tree at this level to the known good values $\{(r,d)|d=D-L\}$. The subtrees with matching roots are marked as known and excluded from further diagnostic traversal, which then proceeds with level L+1.

Keeping a database of known subtree roots also allows for a different validation strategy, as opposed to descending the tree from the root, for the validator. The validator may look, by any search procedure it deems efficient, for (a subset of) known good subtree root values in the SML tree. Then the validator may verify the integrity of these subtree roots. For this the validator may use the reduced tree of the subtree root node and the verification procedure for this value described elsewhere. If the value is integrity verified, then the corresponding subtree may be marked as OK, and omitted from subsequent diagnostic validation.

Identification of known subtrees as such leaves room to different configurations of a platform, in particular different load sequences of known components and failed components. For example there may be two subtrees A and B with 8 measurement leafs each which have another subtree containing failed components between them. If the validator identifies A and B as known, but normally would accept them in sequence B, A, and in immediate sequence, or with another known subtree C in the middle in sequence A, C, B then the validator may have to decide based on policy whether to accept the platform configuration as valid.

As an extension of the described variant, the validator may dynamically feed the reference tree database by interactive learning based on previous platform validation results. One possibility is to perform diagnostic validation the first time a platform validates, and generate known good subtrees from subsequences of leaf measurements which correspond to a good platform configuration according to the validators component (i.e. leaf) trusted reference values and policy, as mentioned herein. When more and more platforms validate, the validator may build a statistically weighted database of known good subtrees and platform configurations according to criteria such as commonality and risk (associated with configurations). Commonly appearing subtrees may be searched for first, for example.

The described method is similar to the subtree discovery methods described for the subtree certification method. It is a method that may be applied, together with or separate from a learning strategy, by the SCA entity.

The method for a validator to traverse a tree-formed SML submitted by a platform, is descending level by level. For this, the whole tree is submitted in one communication step to the validator and evaluated against a reference tree. Here an alternative embodiment is described which sequentially transmits the tree nodes at the various levels, one by one.

The whole SML tree may be submitted to a validator. This may not be optimal in general, in particular when the ratio of failed leaf measurements is small. Then, many sub-trees would be transmitted as part of the whole SML tree, but their contained node data may not be used for validation, since their subtree roots are correct with respect to the corresponding node in the reference tree.

The basic approach to minimize transmitted data in TFV is to transmit only such data to the validator, that is actually needed for the current step in tree-traversal validation, as described elsewhere. The validator first receives the root verification data register of the SML tree and evaluates it as level L=0 of interactive tree traversal validation. If its value coincides with the root of the reference tree, validation ends. Otherwise, the validator requests the two child nodes of the root from the platform. After receiving them, the validator either detects an integrity failure condition c) in FIG. 9 described herein and stops, or recalculates the root from the children. The message containing the child nodes needs, in principle, no cryptographic protection for integrity nor for freshness, since its contents are verified with respect to the parent node by recalculation of the extend operation. The root, in turn was assumed to be transmitted with protection by a TPM_Quote or similar operation, e.g., a digital signature.

Comparing the two children at L=1, the validator may find which of them are correct with respect to the reference tree. They are discarded from further search. The validator then requests the children of all 'bad' nodes at tree depth 1 (that is, either 2 or 4 child nodes at tree depth 2). For each of them, verification and reference tree comparison proceeds as before. The procedure continues by iteration. In this way, the bad inner nodes needed to find failed leaf measurements are actually transferred to the validator. As mentioned, this may be done very efficiently with short message sizes and without cryptographic overhead. The amount of data relative to the size of the tree-formed SML depends on the proportion of failed leaves. It is shown in FIG. 10 described herein.

There are various combinations of tree-formed verification data with other methods for TFV's suitability: First, to provide validation data for frequently changing, dynamic, platform (partial) states, and second, provide extensible space for verification data.

A PCR, or verification data register, is just one (hardware) protected memory space, and a platform is notoriously short of those. Hash trees, as described herein, lift this restriction in principle. But the secure generation process of tree-formed SMLs with root protected verification data registers, e.g., PCRs, may lead to trees of fixed depth and thus limited capacity for leaf measurements. A problem may arise when a platform has more components to measure than fit into its tree-formed SMLs.

Another problem may arise if verification data protects records of a frequently changing, partial platform state, such as a memory region. The hardware protected operations which update a PCR value, the TPM_Extend operation, are slow. Thus a PCR is not suited for protection of frequently changing data. PCRs may thus be unsuitable for direct runtime memory protection. Various systems employ Merkle hash trees for this, but their roots are normally not stored in hardware-protected registers, since their update would be too slow to keep pace with the platform's dynamics.

The basic idea employed to protect a dynamically changing platform state, represented by some data W(t) depending on (discrete) time t, is a cache-then-update strategy for an associated verification data register R. Some trusted software APP_R protects this state sequence in R. APP_R collects intervals of states W(kL+1), . . . , W((k+1)L) of length L, caching them before measuring them with a digest function and extending them into R, using the PCR extend operation or a similar chaining operation, e.g., based on a Merkle-Damgard transform.

Various heightened security requirements apply to APP_R. In particular, sufficient protection is applied to APP_R against modification and tampering must be applied (methods are known, e.g., virtualization or integration into security kernels). Furthermore, the operation of APP_R may be open to assessment by an external validator. A minimum requirement for this may be that the trustworthiness of APP_R is verified, for example during secure start-up, registered, by measuring APP_R before load, and bound, in a way which is verifiable by the validator, to the actual sequence W protected in R.

A method providing the desired features is as follows. The sequence W(t) may be cut into intervals of length L:

$$\underbrace{W(L(k-1)+1), \ldots, W(Lk)}_{\text{length } L}, \underbrace{W(Lk+1), \ldots, W(L(k+1))}_{\text{length } L}, \ldots$$

And a digest function is applied to the partial sequences to produce an interval measurement value: $M_k = m(W(L(k-1)+1) \| \ldots \| W(Lk))$, k>0 As a variant, it may be useful to incorporate time-stamps coming from a secure source, in the interval measurement, for example as:

$$M_k = m(W(L(k-1)+1) \| \ldots \| W(Lk) \| \text{TPM\_Tick(now)})$$

Adding timestamps to intervals of measurement values allows reordering of (sub)-structures without losing information on the load order of components. Furthermore it allows 'aging' of measurements, where a validator can request the renewal of measurement values after a given time period. The interval measurement values are protected by extending them into a verification data register for instance by the extend operation: $R(k+1) = R(k) \diamond M_{k+1}$ resulting in a sequence similar to a normal, linearly chained SML $$\rightarrow R(k) \rightarrow R(k+1) \\ \uparrow M_k \quad\quad \uparrow M_{k+1}$$

in which intermediate states are also protected in the SML, i.e., the SML protecting W looks like:

$$\text{SML}_W \subseteq [R_{init}, R(0), M_1, W(1), \ldots, W(L), R(1), \ldots]$$

The desired binding to the trustworthy state of the managing application APP_R may be achieved as follows. A secure or authenticated boot facility of the platform measures APP_R before load and extends the measurement value m(APP_R) into a verification data register Q (which might be initialized with the value of a preceding PCR P in a transitive chain of trust). Then, the sequence of the actual recording register R is initialized with P and an initialization value R_init, for instance a session nonce or a time-stamp, or both. This results in a structure $$P \to \underset{m(APP_R)}{Q} \to \underset{R_{init}}{R} = R(0)$$

If there is a shortage of verification data registers, P, Q, and R may be one. Verification proceeds on the extended SML for W which may contain:

$$[(W(Lk+1), \ldots, W(L(k+1))), M_{k+1}, R(k+1),$$
$$R(k), \ldots, /R(0), R_{init}, Q, m(APP_R), P]$$

and a quote of P, Q, and R. If present, the SML may also contain the values of time stamps.

Figure 29:
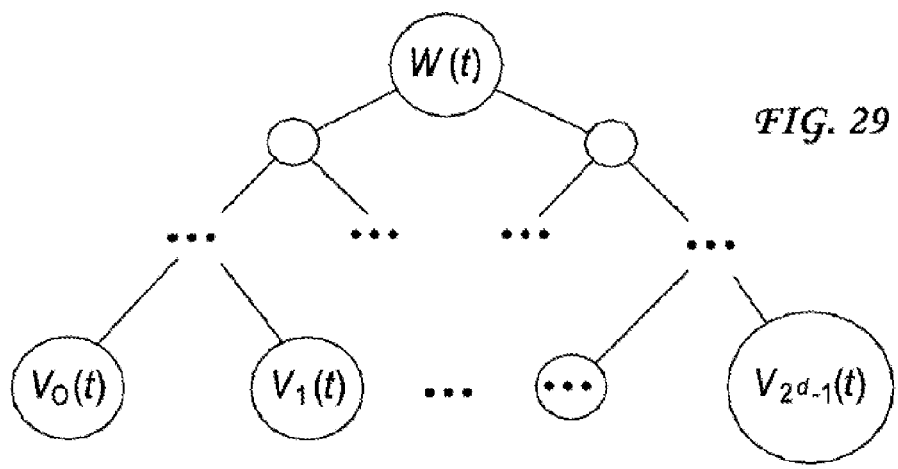
FIG. 29 shows an exemplary embodiment of a tree structure as described herein.

The actual hardware-protected verification data registers may be decoupled from the root of tree-formed SMLs, which may then be stored in less protected memory spaces but are protected by the former ones. For this, special software TFV_APP manages hash trees protected by a root W, which may still be an ordinary memory space, in an internal tree of depth d, with leaves V_1, V_(2^d−1). The state sequence of W(t) is in turn protected by a hardware protected, actual verification data register R, for example by using the interval method of the last subsection. The virtual registers V may then be used as roots of SML trees and are managed by TFV_APP. For them, TFV_APP may expose the commands described elsewhere to external applications, as if they were root verification data registers. The structure of R is as before:

$$\to \underset{W(t-1)}{R_{(N+1)}(t-1)} \to \underset{W(t)}{R_{N+1}(t)}$$

while the coupled Ws represent tree roots as shown in FIG. 29.

Verification of a $V_i(t)$ may extend over the following verification data: $V_i(t)$, $R(V_i(t))$, $W(t)$, $R_{N+1}(t)$, $R_{N+1}(t-1)$, $R_N$, $R_{N-1}$, m(TFV_APP), $Q(\{R_{N-1}, R_N, R_{N+1}\})$ where Q is a quote of the PCRs $R_{N-1}$, $R_N$, $R_{N+1}$, and proceeds according to:
i. Check $V_i(t)$ w.r.t. its reduced tree $\underline{R}$ ($V_i(t)$) and the root W(t)
ii. Check $R_{N+1}(t) = R_{N+1}(t-1) \diamond W(t)$ according to (2)
iii. Check $R_{N+1}(0) = R_N \diamond W(0)$ if additionally $R_{N+1}(0)$, W(0) are transmitted
iv. Check $R_N = R_{N-1} \diamond$ m(TFV_APP)
v. Check m(TFV_APP) against reference values
vi. Check the quote Q.
Additionally, time-stamps may be applied as described above. It is assumed that binding of TFV_APP occurs to the root $R_{N+1}$ similarly as:

$$R_{N-1} \to \underset{m(TFV\_APP)}{R_N} \to \underset{W(0)}{R_{N+1}(t=0)}$$

where W(0) is some initialization value.

Figure 28:
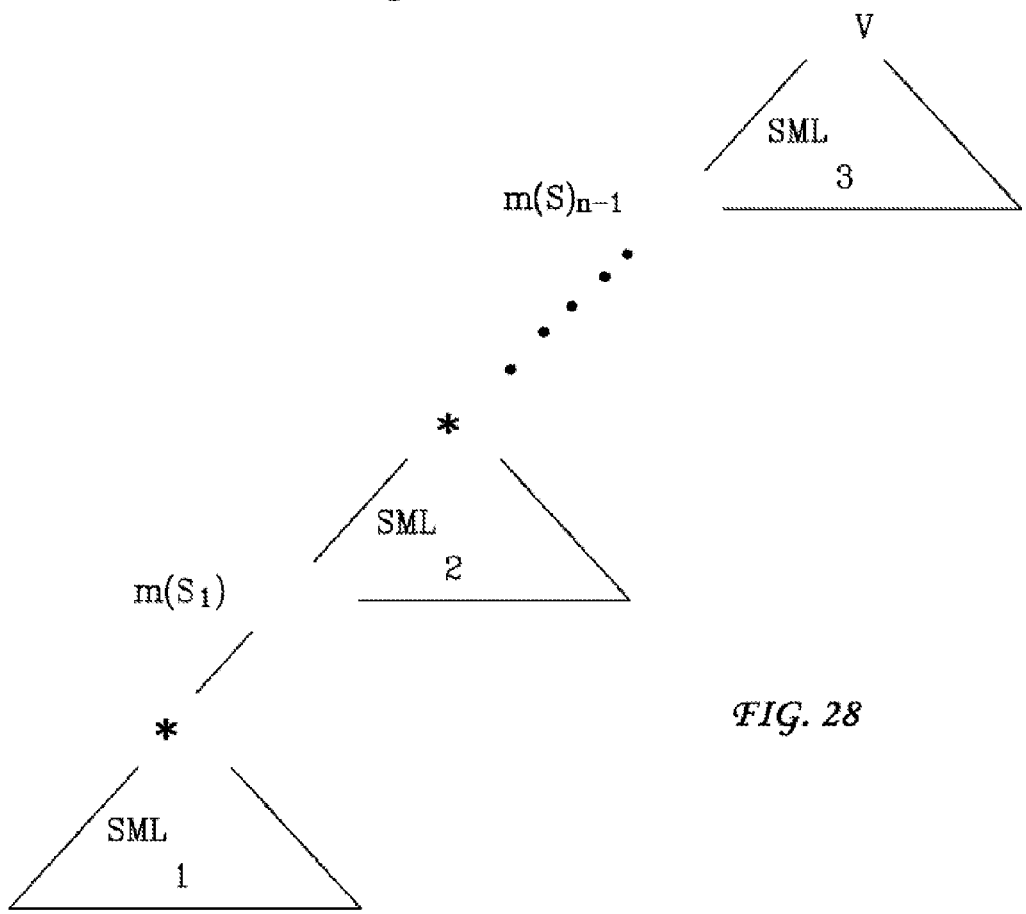
FIG. 28 shows a left-unbalanced multi-tree structure.

The secure formation of SML trees has a natural capacity limitation. A method to lift this limitation is a simplified profile application of the subtree certification method above. An SML tree of a certain fixed depth is filled up completely, the platform (self-) certifies the tree and inserts the obtained certificate as first measurement into the next, empty SML tree. This results in a left-unbalanced multi-tree structure as shown in FIG. 28.

A register V may protect the root of the tree-formed SML, SML_1. A stand-alone way to continue securely with the next tree is as follows. The platform calls TPM_Quote(V,a_1) to obtain a signed statement Q_1 using the AIK a_1. The TPM_Quote represents a signature command that may be executed inside the TP's TrE (e.g., by the TPM) on the designated verification data register V. Thus, Q_1 asserts to any verifier, upon verification of the signature and the PCA certificate of al, that the value V was once contained in the verification data register V. The platform saves the augmented SML_1: SML_1*:=SML_1||V||Q_1||Cert_PCA(a_1), that is, the original SML_1, the value of its root, the quote, and the according AIK certificate, for later verification. The platform resets V. By the properties mentioned above, SML1* is semantically equivalent to SML1 and the register V containing its root. The register V is now free for the next tree build.

Subsequent trees may be bound to previous ones to assure continued internal verification by the root of trust in charge, i.e., a continuous assurance of integrity for contained leaf measurements. One exemplary method for this is to start (for instance by way of a modification of the platform's RTM) the next tree, SML_2, with a first measurement value that binds to the last tree. Various examples for doing this are described below.

For example, the last root value V may be used directly as first measurement. This may not preserve sequence of events, since then the next tree does not contain any hint to the semantics of the applied certification of the last tree. According to another example, measurement m(Q_1) may be used as first leaf of SML_2. According to another example, m(V|| (Q_1)||Cert_PCA(a_1)) may be used as first leaf of SML_2. According to another example, m(SML_1*) may be used as first leaf of SML_2.

The last three options may be semantically equivalent, but are of different practical import, in terms of verification and/or generation complexity. The certified continuation of tree-formed SMLs may iteratively continue without limitation. Instead of the internal continuation by certification, a trusted third party may be invoked to certify the SML_1 tree.

The certified continuation of a tree may be extended with additional semantics by the TTP invoked. In particular, if the SML 1 is submitted along with root certification request and verified, i.e., consistency checked by recalculation of root. Then, a hash value of the SML_1 may directly be embedded in the certificate obtained from the TTP. This provides a validator later on with assurance that the SML_1 was untampered with when submitted for TTP certification. This makes root value V of SML_1 obsolete, in principle. The validator needs to verify the global hash over the SML_1 blob, and the signature of the TTP certificate over it, to check the integrity of SML_1. This is advantageous since it means, for a validator who wants to use a reference tree on the SML for tree traversal validation, that no recalculation of hash operations of inner nodes may be necessary, direct comparisons with reference tree nodes may be used. This may expedite the search for failed components. As further variants, TPM tick-stamps or TTP time stamps may be added to the certification.

Some methods and options to bind more expressive validation data into the verification data of a tree-formed SML are described below.

By itself, the expressivity of an SML of any structure is limited to bare measurements of component code and data. In general, this does not yield enough information to a validator to handle validation efficiently and manage a platform effectively according to validation results. For this reason, TCG enriched notions of SMLs to event logs recording also component identifiers, load time, parameters and related information, and TCG IWG introduced the notion of an (actually tree-structured) IML, a complex, expressive data structure to capture associated information gathered in authenticated boot.

Such enriched and structured validation data, however, may lack binding to verification data of an appropriate associated structure, such as tree-formed SMLs. In particular for tree-formed SMLs the question arises, how contextual information about components and platform properties, or other useful validation data, may be securely bound into the hash tree comprising the actual verification data.

In the actual measurement process, i.e., during the start-up phase of the platform, meta-data may be added to the validation data and bound to the SML tree essentially by establishing a small subtree for the measured component. One example realization (however, regarding a multitude of component and their measurement leaves) is described above. The measurement process, in the context of TFV, may be extended as follows to include meta-data in the SML tree.

1. The agent performing measurement and SML building (identical to or co-operating with the RTM), loads a component measurement manifest containing prescription on which data has to be gathered and included in the SML tree for this component.

2. If the next leaf in the SML tree is a right sibling (the least significant digit of its binary coordinate is '1'), the agent writes one nil to the SML tree and protects it using TPM_Tree_Extend. This ensures that the component starts a new, separate subtree.

3. The agent measures the component itself and writes the measurement value to the SML and extends it to the root PCR using TPM_Tree_Extend.

4. The agent iterates over the manifest and, for each entry: Gathers the meta-data required; Appends it to the validation data sequence; Takes a measurement of the meta data, e.g., a cryptographic digest; Inserts this meta-data measurement into the SML tree, and; Extends it to the root PCR using TPM_Tree_Extend.

5. The agent fills up the subtree for the component by appending nil values until the length of the measurement sequence for this component reaches a power of 2.

Figure 30:
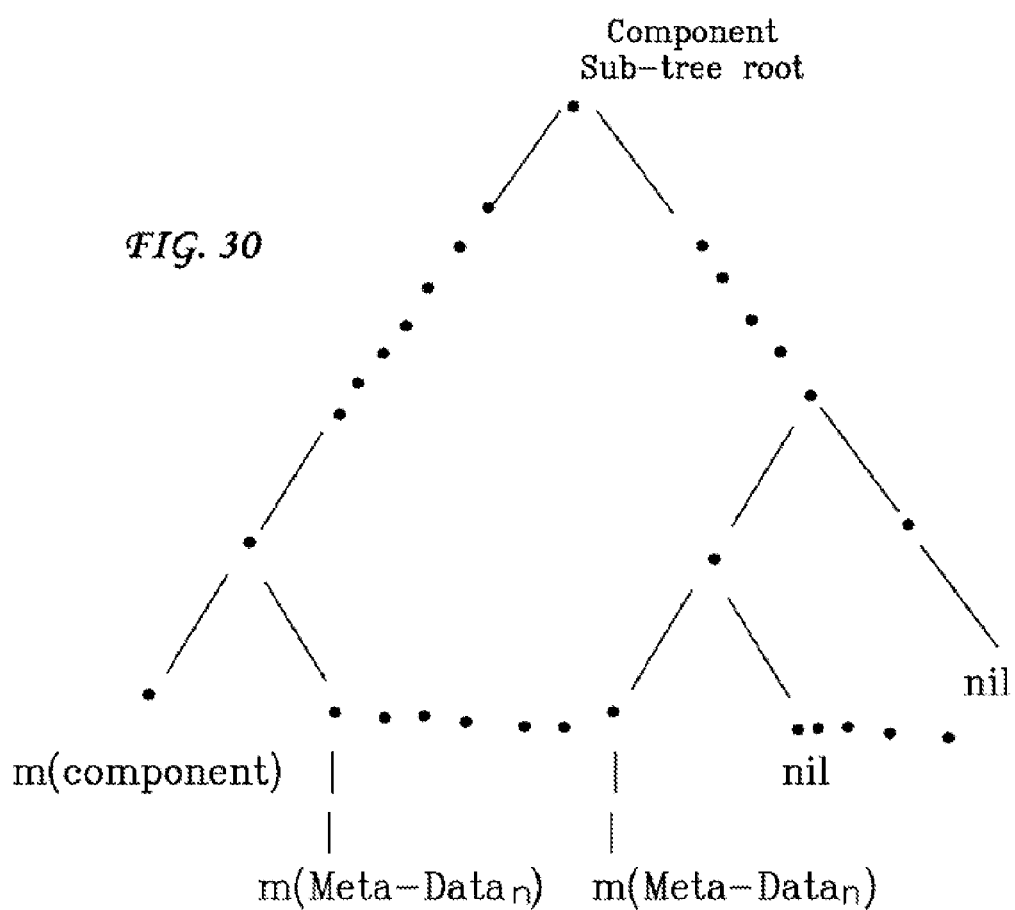
FIG. 30 a component subtree structure.

This obtains a component subtree structure of the form shown in FIG. 30, where m(.) denotes the appropriate measurement function (which may be different for various forms of meta-data).

Meta-data measurements may be inserted at other places, e.g., inner nodes. The insertion of meta-data may be procedurally decoupled from the measurement process, which may be useful for example to expedite the start-up of the platform. Then, meta-data may be gathered by a different process and securely stored (applying at least some form of integrity protection) until its insertion into the SML tree. The Measurement agent prepares enough free space in a subtree, by filling it with nil values, according to the number of elements in the component measurement manifest. After completion of the tree-formed SML with bare component measurements during start-up, the meta-data may be measured and then inserted into the appropriate places using TPM_Tree_Node_Verified_Update command.

Some useful species of meta-data that may be included in a component subtree and describe their potential usefulness are described below.

Component identifier: A component identifier, composed for example of component manufacturer, name, version, build, release date, etc., may be the most basic meta-data to include. Although in principle the measurement value of the component itself identifies it uniquely already, an independent identifier adds semantics in a non-trivial way. It asserts that the platform attempted to load the named component, independently of the measurement outcome. Thus, in particular if component code or data was compromised, this provides independent information to the validator about which component thus failed integrity verification. This information is very useful since it allows finding the correct TRVs for the component in question It is useful as an order criterion for components for the methods described above. An event log or IML according to TCG standards may already include component identifiers, but they are not normally protected by verification data. Here they may be bound to verification data of the SML tree and thus obtain a higher assurance level by the provided integrity protection. The component identifier may already be in a format (for instance a string of 160 bits) for inclusion, or may be measured to obtain this format.

RIM certificate: An appropriate identification of a TRV may be useful meta-data to bind to the component's SML tree. It may be realized for example as the fingerprint of an according RIM certificate. It may be used, for example, (by the validator) to find according to the proper certificate, the contained RIM (TRV), either in an own database or via a TTP, or to obtain certificate status information. In this case, the RIM certificate proper need not be incorporated in the platform's validation data and may not be transmitted to the validator. If the platform's start-up process is secure, e.g., is realized as a secure boot process, then inclusion of according RIM certificate information acquires additional semantics. Namely, it asserts that the TRV certified by that particular RIM certificate was used for comparison with the component's measurement value. In this case, the actual measurement value of the component may be obsolete in the tree-formed SML, depending on requirements on forensic evaluation, for example.

Component context: The component context may comprise a description of the runtime environment into which the component is loaded.

Time stamp: A protected time stamp added as metadata adds context to the measurement by providing the validator with the load time of the component. This allows the validator to verify the load order of components, which may be of importance if component dependencies have to be validated. It also allows assessing the freshness of a single measurement, and if the data structure allows for it, the validator may request a new measurement of the component. This may be done based on a measurement aging process, where measurements may have a defined lifetime, after which validators may request a new measurement of the component. Furthermore, applying individual timestamps to a measurement allows re-ordering of the structured data and enables the validator to derive the original boot-loader.

Component start parameters such as runtime/lead-time settings that may be set differently according to the current condition of the device or operating environment.

Component security policy: When there is an enforcement entity included in the platform, the security policies associated with each component and enforced by the entity are important data to the validator to assess the platform's trustworthiness. By organizing a component's measurements and meta-data in a subtree, validation thereof may be delegated to a TTP such as an SCA as described above for the subtree certification method.

Geo-location information at the time of component invocation adds another dimension (location) to the expressiveness of the measurements. This metadata field may be useful especially for moving devices, which change location often and where applications may also be location dependant (e.g. asset/cargo tracking reporting software). Instead of reporting that a component was measured at a specific time this may also include a location where measured.

For practical realization of TFV, the component subtree may contain data that is mostly of 'static' nature, to avoid the recognition problem described below. If desired meta-data includes frequently changing data, or data which is rather individual to a platform, it may make sense to reserve, for such data, a completely separate SML tree, protected by its own root verification data register, or a designated subtree of the component SML tree. The positions in such an ephemeral meta-data SML tree may be bound to the original SML tree simply by order, by repetition of the component identifier, or component measurement leaf, or by any other means to link the ephemeral meta-data SML tree's contents to the according component subtrees in the original SML tree.

Like linearly chained SMLs and resultant PCRs, tree-formed SMLs and root verification data registers are sensitive to small changes of the sequence of measurement values. Thus, a problem arises in efficiently recognizing known tree and subtree roots, since their values depend on exact measurement leaf order. Different possibilities to approach this problem are described. They consist in measures to organize the measurement leafs according to an order known to platform and validator, thereby reducing the combinatorial complexity stemming from sequence sensitivity. Methods and technical procedures to organize leaf measurements according to technical criteria for efficient TFV are also described.

PCR values resulting from a Merkle-Damgard transform, i.e., combining results of one-way functions by a non-associative and non-commutative operation, are very sensitive to the order of inputs. This principle, is desirous from a security viewpoint, and a feature of this transformation, reflecting the ability to detect the smallest changes in input data. The property holds likewise for tree-formed and linearly chained SMLs and root verification data registers, respectively, PCRs. This information preserving feature of the Merkle-Damgard transform entails complexity when it comes to interpretation of the contained information.

The sequencing complexity problem shows itself particularly in TFV, when a validator attempts to assess a platform according to a submitted tree-formed SML. A generic tree-traversal procedure for the search for failed components is discussed herein. It showed to be efficient when compared to evaluation of a linear SML even for high proportions of failed (i.e., unknown to the validator) leaf measurements. However, failure in this validation model may also result from modifications or sequence failures, i.e., measurements appearing in an unknown, with respect to the reference tree used by the validator, position. A single permutation of two known measurement leafs produces two unknown ones. Insertion or omission of a measurement leaf at a certain position invalidates all following ones, i.e., leaf positions to the right of this position. Without due consideration of this problem, the efficiency gains of TFV may be lost.

In fairness, this is not really a problem when compared to linear SMLs, since they suffer from the same order sensitivity, and tree-formed validation is not more complex and/or computationally costly than the linear case. For the resulting PCRs of linear SMLs the same problem may emerge as a requirement to keep reference PCR values for all permutations of input measurements, i.e., as spatial complexity. TFV, on the other hand, may lose part of its advantageous features by the sequencing problem.

Merkle hash trees may be used for the run-time verification of memories in various research and demonstration systems. The sequencing problem does not appear there, trivially to the static assignment of memory addresses to leaves of the memory protection tree. To restore, if only partially, such an order known to both platform and validator, is one idea behind the methods described below.

The problem under consideration is of an information-theoretic nature, as it regards an asymmetry of information between the platform (sender) and validator (recipient of tree-formed validation data). The sequence of measured components is the piece of information that may be shared between those two parties in an efficient way, where efficiency means in particular that the validator neither has to keep a too large database of reference validation data (SML trees), nor that the validator is required to do costly, on-the-fly pre-calculations.

Efficient pre-sharing of information is one method to meet requirements described. For this, coding will be employed by platform and validator, established through conventions which both follow in the TFV process. The methods described below include realizations of this general strategy. The methods described below are not restricted, in applicability, to the case of tree-formed verification and validation data. They may also directly apply to the traditional case of a linear SML, though the benefit they bring there may be limited. The efficiency gain by conventional sorting of verification data for platform validation increases with the inherent structuring of the latter data (presuming that sensible realizations of verification data would be order-dependent). Thus, ordering methods may be applied to other structures such as (directed, acyclic) graphs, or annotated skip lists (which are also optimized structures for rapid search).

Besides ordering methods described, there is another approach to the problem of recognizing verification data by the validator. Namely, the validator may learn typical platform configurations over time. This may be less effective for platforms with frequently changing configurations and less frequent validation, such as personal computers, for which configuration may differ for practically every boot cycle, or weekly updates are common, while re-connection to a corporate VPN occurs only some days in a week for a remote workplace. The configuration of such a PC, transmitted via its PCR values, and attested to the network via remote attestation and additional protocols such as TNC, may be different each time. On the other hand, mobile devices, M2M Gateways, and special embedded devices like HeNBs and multimedia STBs have more static configurations, and concurrently connect to the networks—and thus validate more frequently. Also, updates on them are managed by network entities which may keep track of the known device configurations. For such devices, it may suffice if a learning strategy for device configurations is applied by the validator. For example, a validator reference SML tree may be built at first validation by the device from known TRVs (e.g., RIMs with according certificates). Such a tree may not actually be used as reference for devices with the same configurations. Subtrees of these learned reference trees may even be found, by identification of their root values upon first validation of another platform, and appropriately used for validation and composition of newly learned reference trees.

There are two fundamental options to provide the desired ordering to tree-formed SMLs. Either, a known order is applied before the measurement is effected by the RTM (pre-ordering), which results in a rigged SML formation, or the measurement process is left untouched and ordering is applied later, on the completed SML tree, in a secure way (post-ordering).

One realization of pre-ordering changes is the actual load sequence of programs so as to conform to a given SML sequencing. If this is feasible on a particular platform, it may leave the secure start-up and measurement process otherwise undisturbed. Another option, is to store the measurement sequence in a secure cache and inserting them into the protected SML tree only after the platform's start-up. This method however may require a secure transfer of measurement values into the cache, where they may then be integrity protected until all measurements are performed. Afterwards, the ordering operations may have to act on the stored data without allowing modifications to them. Hence this option may have additional requirements, which if not met properly may introduce security weaknesses.

Post-ordering is interesting as it allows for 'lazy execution' as a background task while the system is already operational. The time restriction that applies is that the SML may be ordered, when it is used for validation. Since there is now a direct way to securely shuffle the leaves of a tree-formed SML, post-ordering may operate on a second, empty SML tree, protected by another root verification data register. The steps applying for the build of this post-ordered SML tree from the original one are executed by some trusted agent on the platform and are as follows. The post-ordering agent iterates over the sequence of component identifiers for the desired SML sequence and: 1. Identifies the leaf position of the next identified component (for this, identifiers of the actually measured components are needed. They may be recorded in an event log for the measurement process or directly attached, such as in digested form for example, as a sibling of the component's measurement leaf). 2. Verifies the leaf measurement against the root verification data register using for instance the TPM_Tree Node_Verify command described elsewhere. 3. Upon success, inserts the measurement into the ordered tree using TPM_Tree_Extend. And 4. Pre-ordering may not be feasible for all components of a platform, for instance due to dependencies.

Extensive post-ordering may not be desirable, since it incurs computational cost. So mixed forms of pre-ordering and post-ordering are suggestive. Specifically, a subset of components of the platform may be pre-ordered, while another, presumably smaller, portion of components undergoes post-ordering after measurement. This may result in at least two SML trees from measurement, which may then be joined to a full measurement tree, for example by subtree certification.

While pre-ordering and post-ordering reside at the platform and are operations executed before transmitting validation data, a third, different option is to impose some computational burden on the validator to obtain the correct sequencing of the reference tree. For this, the platform may transmit a sequence of component identifiers, indicating the sequencing of the measurements of the tree-formed SML or a subtree thereof. Alternatively, the platform may send the plain list of leaf measurement values by which the validator may also be enabled to uniquely identify the component at each leaf, if known. The validator may then use the time lapse between receipt of this component identifier sequence and actual validation to build a reference tree in the order that is to be expected. This may require less hash operations than building the full reference tree of the platform, at least if the portion of permuted leafs is not too large. In this case, many subtrees of the platform's SML tree may already be contained in the validator's tree and may be reused. The task of the validator, upon receiving the ordering information from the platform, is to identify the subsequences of leaves which correspond to known subsequences and at which corresponding known subtrees may be inserted in the order-corrected tree.

This procedure may be effective if large parts of the full SML tree for validation are of fixed sequence by convention, and a smaller subtree is of unknown sequence to the validator. In this case the platform may submit the sequence of the subtree, and its position in the full tree, together with or before the full SML tree for validation, and the validator may build the subtree of unknown sequence from reference values and insert it in the correct position in his reference tree.

One implementation may apply lexicographic ordering of components, wherein the sorted data may be the component's reference measurement value, e.g., RIM value (not the actual measurement taken by the RTM, which may differ if the component is compromised). Another sort criterion may be the unique identifier of a component or a digest value thereof. This data may also be included in the tree-formed SML according to the method described above. A variant of lexicographic ordering is to assign an encoding to measurement values and/or other data and use the resulting code as lexicographic sort criterion.

Measured components may be ordered according to their failure probabilities. To make this practical, the validator may define failure probability classes for known components, for instance from failure rates estimated from a large population of validated platforms. The components of a certain failure rate class may then be communicated to the platforms and then included into a reserved subtree for the latter class. This may result in an SML tree which is optimized for tree-traversal validation, since it contains subtrees (with low-failure-probability components) which are likely to be discarded from search in the traversal.

If there is a hierarchical organization of components of a platform, then measurements may be ordered accordingly. As an example, if the platform is comprised of functionalities which consist of subordinate modules, then a subtree may be reserved for functionalities and contain the measurements of their respective modules. Inside the subtree belonging to a functionality, any other ordering that is applicable may be used. In turn, the functionality subtrees may be ordered to combine into the full tree-formed SML of the platform.

In a hierarchical organization of system components, for example according to a functionality module relationship, there may be dependencies which may affect the resulting measurement sequence. A particularly common case may be modules which belong (akin to a shared library or similar) to more than one functionality. Such modules may be loaded, and thus measured, once during secure start up of the platform. One way to capture such modules correctly in an SML tree organized hierarchically by functionalities is as follows. The agent performing secure start up may keep track of all loaded modules and thus may be able to identify repetitions—for example if a module identifier appears again in the prescribed measurement sequence. When building the hierarchically ordered SML tree, the agent, when hitting on a repetition of a module, first seeks the place of first occurrence in the SML tree, then verifies the actual measurement value at this first occurrence position and then inserts it in the tree at the new position.

A special situation occurs when a platform loads components whose integrity is correctly verified (against a reference value), but which is unknown to the validator. Inserting without order into an SML tree may result in a failed component, and placement failure of following components. If the validator and the platform share knowledge about which components are known to the validator, then the platform may be able to sort the unknown measurement values into a separate subtree, while the subtree of known measurements is prepared in an order known to the validator. The two trees may then be joined for tree-traversal validation, for example so that the known SML tree is the left subtree, while the unknown component tree is the right one. The latter one is prepared, in the validator's reference tree, as an empty tree containing nil values. That lets tree-traversal validation proceed undisturbed for the known (left) subtree.

The above-described systems, methods, and apparatus generate and use a hierarchical structure, such as a tree structure, for verification data and validation. Described below are further embodiments for use of such a tree structure in network validation.

Tree-Formed Validation (TFV) is an enabler for complex types of network side platform validation. TFV is a realization of Structured Validation, which means use of structured data by a validator to assess the state of a platform. The structure of data may reflect the structure of the platform to an extent and thus aid validation. Structured Validation is an implementation of the abstract platform validation and management processes defined in Platform Validation and Management (PVM) discussed elsewhere. Platforms that allow for an effective and efficient, remote PVM, exhibit a modular, hierarchical architecture. Categories of data are introduced with which platform validation operates.

In describing PVM, basic notions of data transferred between a platform and a validator, and other entities facilitating platform management functions, may be defined. Those may be divided into three categories, according to security related properties and semantic content.

Figure 25:
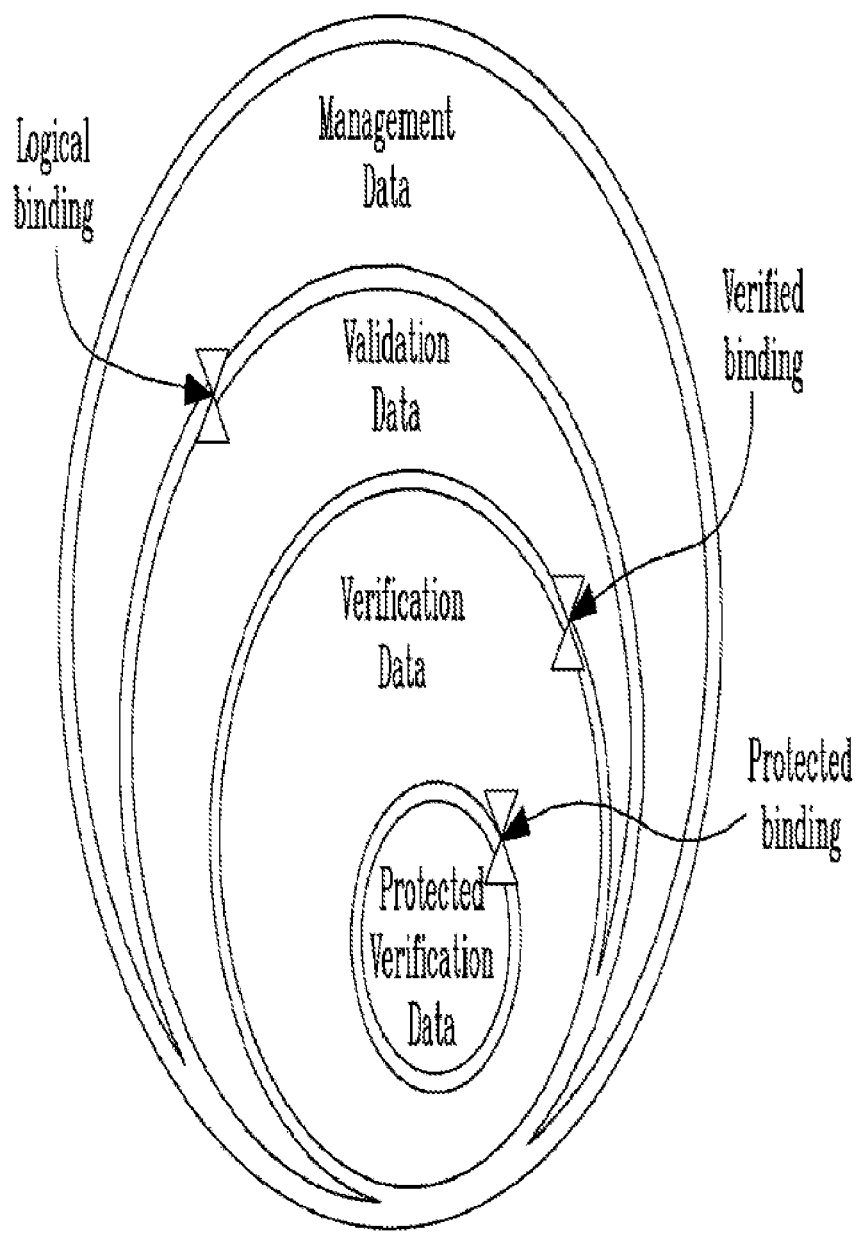
FIG. 25 shows data categories for PVM.

There are the four categories of data for PVM that are created by a platform and used throughout the PVM processes. They are intrinsic to the validating platform. A different, additional category is the trusted reference data, which is used, to compare validation data to known good values. It may reside at the validator for use in validation of a platform, or inside the platform, where it may be used for secure start-up or be transferred as validation and/or management data to the validator. This is shown in FIG. 25 where interrelation between the notions is depicted.

Verification data is data which verifiably identifies a platform state, or a partial state with a well defined level of assurance. Verification Data is generated internally in a platform in a verification process, for example during secure start up of the platform, and/or during run-time. One protection goal for verification data is integrity which may be maintained during its generation, i.e., verification, and at least throughout a platform's operational cycle (e.g., boot cycle). Another protection goal is freshness. One way to define (and raise) the assurance level of verification data is to separate out part of the verification data as protected verification data with a special protection level, for example, by hardware protection, in which case the storage space is called as a verification data register.

Verification data may require a protected binding, e.g., cryptographic, to protect the verification data. The strength of the binding and the strength of the protection define the assurance level of the verification data. Some realizations of verification data and verification are the described below.

The SML may include a sequence of 160-Bit SHA-1 values generated in the authenticated boot process from measurements of loaded components. These hash values uniquely identify the loaded component. The assurance level of SML values may depend on: a security of the RTM that carried out the measurement, and on the integrity protection of the SML, for instance by verification data registers, e.g., PCRs. A variant are tree-formed SMLs of TFV.

PCRs of a TPM paradigmatically represent protected verification data registers. One general method for the internal verification of a TS is authenticated boot, and uses capabilities of the TCB to assess the trustworthiness of loaded or started software or hardware components at the time the TS is initialized, e.g., on power on. Authenticated boot is realized by starting certain functions of the RoT and the TCB before other parts of the TS. These parts operate as a RoT for Measurement (RTM). This means that components that are started or loaded later on, are measured, i.e., they, and their status and configuration after start are uniquely identified, e.g., by forming cryptographic digest values over a (binary) representation of hardware components embedded code and loaded programs. According to the specific requirements, the measurement values may be stored in secure storage, e.g., PCRs, which form the protected part of verification data.

Secure boot is an extension of authenticated boot. It is of particular importance for devices such as set-top boxes or mobile handsets that may have some stand-alone and offline functional requirements. The common characteristic of devices equipped with secure boot is that they may operate in a trustworthy set of states when they are not able to communicate assertions on their trustworthiness to the exterior, e.g. before network access. In secure boot, the TS is equipped with a local verifier (a verification entity) and local enforcer supervising the boot process, which establishes the combination of a Policy Enforcement Point (PEP) and Policy Decision Point (PDP) to control the secure boot process. The local verifier compares measurement values of newly loaded or started components with Reference Integrity Measurement (RIM) values which reside in the TCB, or are protected within the TS by a TR, e.g., they are located in protected storage space, and decide whether they are loaded, resp. started, or not. Thus, the system is ensured to boot into a defined, trustworthy state.

In Secure boot, an extension of authenticated boot, the platform is equipped with a local verifier (a verification entity) and local enforcer supervising the boot process that establishes the combination of a PEP and PDP to control the secure boot process. The local verifier compares measurement values of newly loaded or started components with RIM values which reside in the TCB, or are protected within the TS by a TR, for example, they are located in protected storage space, and decide whether they are loaded, resp. started, or not. Thus, the system is ensured to boot into a defined, trustworthy state. The sequence of RIMs used in secure boot comprises the verification data. The measured sequence may additionally be extended into a verification data register as protected verification data. In this case, RIM certificates (more precisely their cryptographic fingerprints) are also protected parts of verification data, with protection afforded by the TTP issuing them, and the underlying certificate infrastructure.

An exotic variant of verification of a platform is proposed for WSNs by some researchers and called 'software attestation'. It consists in executing a probe code, sent by a remote validator to the platform, which checks the platform state, for example memory contents. In the tradition of zero knowledge proofs, the information returned to the validator as verification data may be the runtime of the probe. Obfuscation ensures, to a certain extent, that an attacker may be able to produce the return signal after a measurable delay.

Distinct from verification data, validation data is the superset of verification data of data that can be gathered and submitted to another party, the validator, and used to assess the trustworthiness of the state of the platform, in particular by checking it against contained verification data. The process of submission of validation data to the validator, for example realized as remote attestation according to TCG, and evaluation thereof by the validator, is properly called validation. Validation data may comprise verification data such as quoted verification data register (e.g., PCR) values. Validation may, beyond cryptographic verification of verification data, include policy evaluation and triggering of actions by the validator, using for example additional management data which may be associated to the validation data.

Similar to verification data, validation data identifies a full or partial system state, but additionally provides more information to make the validation efficient for the validator and determine the level of granularity of the validation result. Examples for validation data are: Named system properties such as generated by PBA, or names and versions of components, their status and parameters, the platform certificate of a TS, as defined by the TCG, and vendor certificates of system components; Names of TTPs, where further data may be fetched, e.g., certificate chain information; Component-subcomponent relationships, for instance captured in nested XML data structures, as specified by the TCG IWG; A platform identity for validation, called validation identity, realized, e.g., by an AIK key pair.

One aspect of validation is the binding of validation data to according verification data. This binding, in the spirit of transitive trust chaining, transfers the assurance level of verification data to validation data. Thus, this binding may be verified, for example by a digital signature. The notion of validation data may be restricted by the requirement of binding. Validation data is such data which can be verified by the validator, in particular for data integrity, using verification data. Thus, validation data is less arbitrary than general management data defined below.

Remote attestation is a realization of an initial stage of validation, namely the secure transmission of validation data to the validator, signed by the platform. In turn, an example of this binding is the TPM_Quote operation which signs a PCR value with an AIK. Verifying this signature, and recalculating the PCR from the SML and associating the SML measurement values to RIMs of known components which are named in the validation data, the validator may verify that the named components are the ones the platform has measured during authenticated boot, for example.

Management data comprises and is supplementary to validation data. It adds expressiveness to the other data specifically for management of a platform based on validation data and results. The binding of management data to validation data is logical, that is, elements of management data link symbolically to associated elements in the validation data, or vice versa. The trustworthiness of management data (for example by its source) may be assessed separately from validation of the plat-form, in particular if management data comes from a TTP.

Typical examples of management data are: policies which infer management actions from validation results; places, where code updates can be fetched from; incident reporting data; user notification data; service credentials provided to the validating platform conditioned on validation results.

Trusted reference data is data that is used to compare validation data to known good values. Those values, that constitute trusted reference data, are called Trusted Reference Values (TRV). Their best known examples are RIMs, as specified in the TCG's MPWG specifications for example. They may be used genuinely, a) by the platform itself in secure start-up, to ensure that components whose measurements conform to a TRV are started, or b) by the validator, to compare validation data to known good values and thereby assess the platform state in validation.

As such, trusted reference data becomes trusted through certain security assertions about it, which are verifiable by the validator or the agent using the TRV in question. Such verifiable assertions may be realized for example by digital certificates issued by a TTP, giving rise, in the concrete example, to the so called RIM certificates. The trust assertions of trusted reference data may also contain additional information for example about external evaluation (e.g. according to a Common Criteria EAL) of a component or platform.

Split Validation describes a concept that allows distributing validation tasks between two (or more) networked entities. The idea is focused on the validation procedure itself and not bound to a specific architecture. However, an architecture model is chosen to present the general concept, mainly the architecture of a M2M device acting as M2M gateway for M2M devices connected to it, with the M2M gateway being connected to the MNO's network. The concept itself is not limited to that architecture and may be applied to different architectures, which exhibit a certain hierarchical structure (e.g. HeNB and connected UE/WTRU, clusters of devices with a master node in the cluster, etc.).

The general methods described herein, such as subtree certification procedures and/or discovery options are a base technology to implement split validation as described here.

A client-server model is assumed where a client C wants to access a service S where the server provides the service to C if C is in a trustworthy state. The C may able to convey validation data v (e.g. measurement values) to S.

In this scenario, S may have tools to derive the state of C from the received validation data v, which is achieved by reference values r to which S may compare v. The reference values r are not restricted to reference metrics which provide known good values for v. The reference values provide a mapping between the received data v and the trustworthiness of the device. Hence, r may be seen as a mapping of v to access policies for the service, which means that r may be any kind of reference, which allows S to derive a statement on the trustworthiness of C from the received V.

In some scenarios C may be connected to S via a gateway device G (e.g. M2M gateway, HeNB as gateway for WTRU). If G is able to perform initial parts of validation of connected Cs, i.e. G is equipped with r for connected devices, the load for validation tasks may be distributed between G and S.

This distribution of validation between two networked entities is referred to as Split-Validation. For Split-Validation to work, it must be possible for G to validate single connected Cs, and S may trust G to perform this validation in a secure manner. Furthermore, if the validation data v exhibits an internal (hierarchical) structure, it may be easier to perform an efficient split-validation.

As one implementation of Split-Validation, entities may be able to use Tree-formed Validation (TFV) data. G may be able to generate its own structured validation data. G may be able to perform tree updates, including removal and addition of subtrees. G may be equipped with a measurement agent (MA), with MA being able to integrate validation data of Cs into the validation tree of G. These subtrees may be certifiable (and hence validated and signed) by either G directly or by a TTP.

Figure 31:
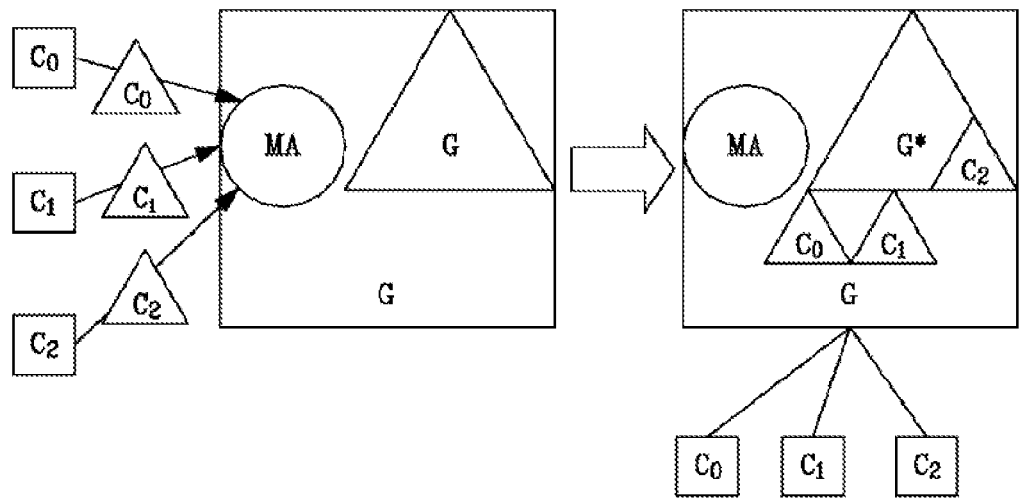
FIG. 31 shows a Split-Validation Step 1: Collection of Measurements.

The MA inside G collects measurements from the connected Cs and integrates them into the tree of G as new subtrees. The collection of measurements may be performed during a local signify verification of the Cs to G (e.g. by performing SAV, Hybrid Validation, Remote Validation on the C-G link) or after authentication in an additional protocol step. This step may be bound to a device authentication of the Cs, to prevent replay and forged validation data. However, this authentication may not be required to represent the authentication used by the Cs to access S (e.g. MNO credentials used to access the network), since this authentication may be performed in an additional step, when G establishes the connection to S for this specific C. This is shown in FIG. 31.

Figure 32:
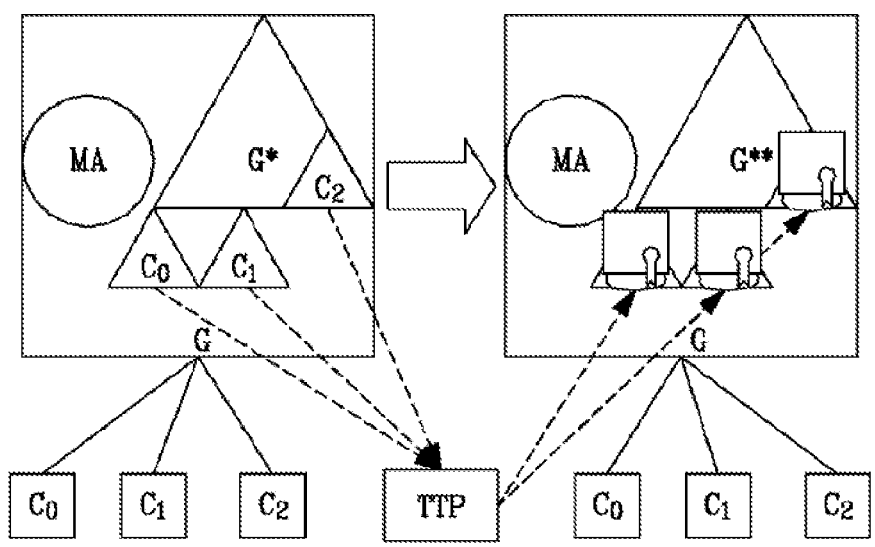
FIG. 32 shows a Split-Validation Step 2: Certification of Subtrees.

After collecting the relevant data, G contacts a TTP which issues certificates for the subtrees to G. G is then able to incorporate the certificates into its own validation tree, resulting in a new and up-dated validation tree. As a variant, the TTP may also be a part of G, e.g. implemented as an application which runs inside the TrE of G or integrity protected by the TrE. This is shown in FIG. 32.

Figure 33:
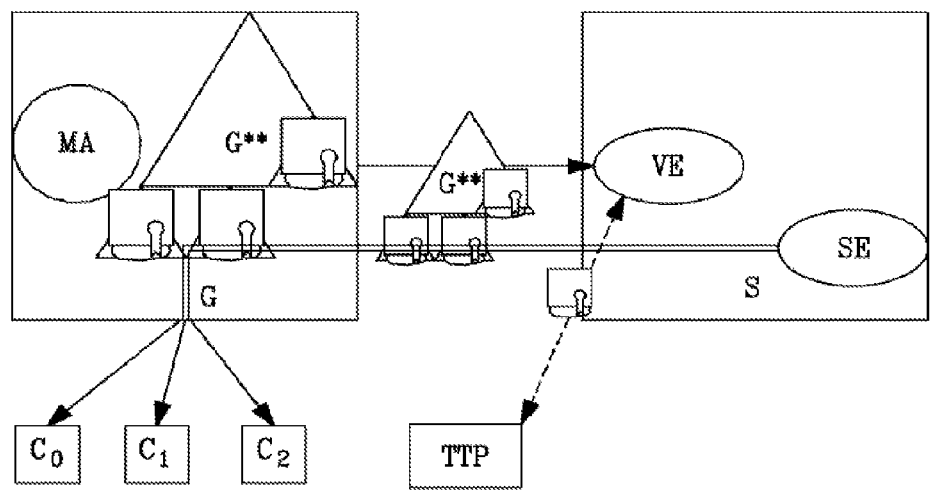
FIG. 33 shows a Split-Validation Step 3: Service Connection.

In the final step, G sends the updated validation tree including the certificates replacing some or all of the subtrees for the connected devices to S. S may be decomposed for exemplary purposes into two subunits, a Validation Entity VE and a Service Entity SE. While VE is able to validate the received data from G (either autonomously or with the help of a TTP), SE is responsible for the actual service being provided to the Cs (and optionally services provided to G). In a variant, where G is not able to authenticate the Cs with the credentials to access S, SE may also perform authentication, e.g. S may perform the 3G authentication, while G authenticated the TrE in the devices to verify authenticity of the received validation data and device/TrE identity of the connected Cs. This is shown in FIG. 33. After successful validation, the service may be provided to C.

In Split Validation, G may preserve the privacy of connected Cs towards S, since S may receive certificates, which replaces subtrees of connected devices. S may trust the TTP and the MA in G, where the trust in MA may be derived from the validation data received from G, since the validation data contains measurements of MA.

In a further variant, split validation may be extended to support dynamic updates, including support for roaming Cs between different Gs, involving a handover of C-subtrees between Gs. Another variant for Split validation is a partial validation of single Cs at the gateway G, replacing only parts of a subtree with certificates.

The methods and algorithms described herein allow for an efficient implementation of the operations for Split validation. They enable the use of split-validation, based on an extended version of a TPM which allows the devices to build, report, update and quote trees or subtrees. Furthermore, algorithms provide for the efficient replacement of subtree nodes with certificates by subtree certification.

One issue in split validation is to determine which Cs may be validated by the TTP (and hence replace their subtrees at G) and which portion of the Cs may be validated by S, i.e. which reference values are available at the TTP which G can use to certify subtrees of connected Cs. In general, solutions to this discovery problem may be divided in three classes: TTP based, Gateway based, and Shared discovery.

The TTP based approach is suitable for Gs lacking the computation power to perform complex analysis to find suitable subtrees for certification. In this approach, the TTP receives the complete tree from G and returns the results in the form of a set of subtree certificates for subtrees that the TTP can verify. The TTP may then discard the remaining data which it cannot certify. The certificates are sent back to G with an indicator as where they fit in the tree. The MA at G performs an ingestion of the certificates, i.e. replacing the now certified subtrees with the received certificates. G may not have to perform discovery again, since TTP passes indicators to the location of the subtrees in the message with the certificates.

In a variant procedure, G does not transmit the complete tree, but a part of it to the TTP, allowing the TTP to search for potentially certifiable subtrees in a subset of measurements from attached devices. Such a mechanism may be useful, for example, if the tree-formed validation data exhibits a certain structure, which allows G to decompose the tree into subtrees based on certain device characteristics (e.g. device classes). Depending on the device class, different TTPs may be able to validate a certain set of devices.

In the gateway based discovery, G has metrics to decide which Cs may be certified by the TTP and the TTP may receive the necessary data. This approach allows a minimization of the amount of communication between G and TTP, since all transferred data belongs to certifiable subtrees. However, G may be pre-equipped with suitable metrics, which may allow G to discover the right subtrees and their TTPs which may certify them. Furthermore, in this method G may search its own validation tree for suitable subtrees, putting more computational effort on G.

In a shared discovery model, the TTP and G make a joint effort to determine which devices and hence subtrees may be certified. The result of such a discovery step protocol is a list of subtrees that may be certified. This discovery protocol may include the exchange of additional (meta) data, such as device classes, capabilities, device profiles, dynamic parameters, such as load and bandwidth. Despite the initial communication needed to determine the set of certifiable subtrees, this approach also minimizes the amount of data, since no unnecessary data is transmitted from G to the TTP. The communication load may be more than in the gateway based discovery, but may be less than in the TTP based discovery. G may be able to store the outcome of the negotiation phase, which allows G to subsequently perform a gateway based decision. In the shared discovery model, G may be pre-provisioned with a set of certifiable subtrees which may then be updated during a shared discovery phase.

In one variant, G fully validates some Cs, where the selection of Cs may, for example in the case of G being a femtocell, be based on CSG (Closed Subscriber Group). S then fully validates the remaining Cs. The set of Cs to be validated at G may be based on static or dynamic data and the set of devices to be validated by S would then be the remaining Cs or may have an overlap, meaning that some devices may be validated twice.

G and S may validate aspects defined in aspect sets that may be pre-provisioned or dynamically adjusted and may have overlaps. Such aspect sets may comprise: integrity of device profile, integrity of boot codes/OS/drivers, integrity of capillary network functions/components, integrity of WAN connectivity functions/components, integrity of high-level applications, and integrity of trusted reference values used at G.

The validation may be split dynamically based on loading. In this dynamic approach, G and S or G and TTP compare computational load on themselves and on the links between G and connected Cs and between G and S or G and TTP. Based on the load, the TTP or S determine the sets of devices which may be validated directly at G. A pre-provisioned set may exist, which is then dynamically updated.

In a knowledge-based split, the split may be determined between S (or TTP) and G based on knowledge sets and validation policies. Knowledge sets may include several factors, such as behavior (past observed, or predicted for future), trustworthiness (past history, current value, or future predictions), cost versus benefit analysis, importance of validating, etc. which may allow S and G to derive or update validation policies.

In one example, a H(e)NB may use Split Validation of a UE. For the HeNB case, the architecture may comprise an H(e)NB being able to validate some or all of the connected UE by the following procedure and shown in FIG. 34.

Figure 34:
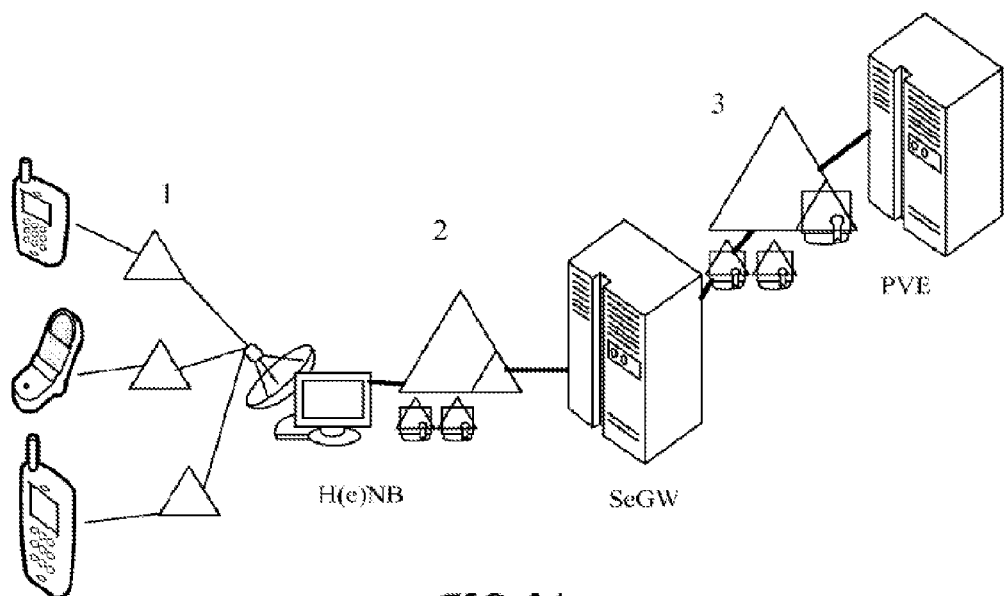
FIG. 34 shows H(e)NB use case for Split-Validation.

As illustrated in FIG. 34, the WTRU sends integrity measurements to H(e)NB at 1. At 2, the H(e)NB integrates the received data and validates some (or all) WTRUs. At 3, SeGW/PVE perform validation of H(e)NB tree including connected devices. The PVE validates yet-to-be-validated devices and issues a reference certificate at 4, which may be sent back to the H(e)NB to be included in future communication, e.g. enabling the H(e)NB to validate the WTRU in future connection attempts.

Another variant may be in a corporate deployment scenario, where the HeNB is able to validate a subset of the components of each WTRU, for example corporate software, which may not be exposed to the MNO (SeGW and PVE). The PVE, may perform the network side validation of the underlying platform components of the WTRU.

Figure 35:
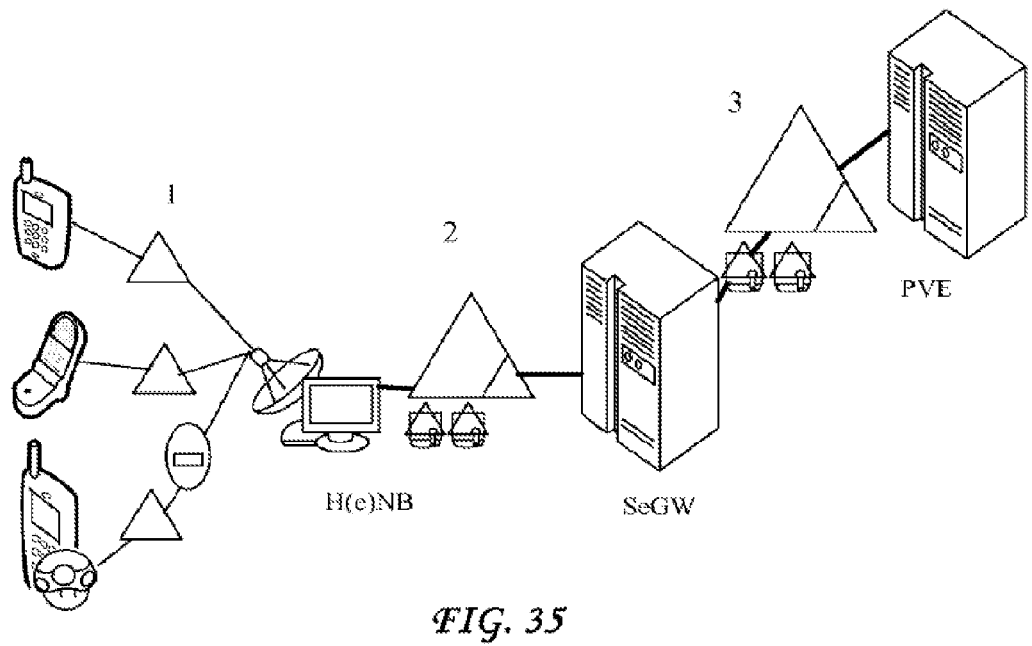
FIG. 35 shows H(e)NB blocking access to rogue devices.

In the case of a rogue device connecting to the H(e)NB, the H(e)NB may include the integrity tree of the UE for reporting purposes. The PVE or a validating network entity on the corporate network may be able to verify the received data and can then command the H(e)NB to block access for the device or engage in remediation steps, such as replacing components or software, perform antivirus updates, etc. This is shown in FIG. 35.

Since the M2M architecture has some similarities with H(e)NB, Split validation may bring some benefits to M2M scenarios. In a typical M2M deployment, smaller but more devices might be connected to a single gateway, providing access to the network. Furthermore in M2M scenarios, a broad variety of different devices may be connected via a single gateway, and hence the gateway may not be able to validate all devices (or all device types). Performing split-validation may allow the network to offload some effort to the M2M gateway.

Figure 36:
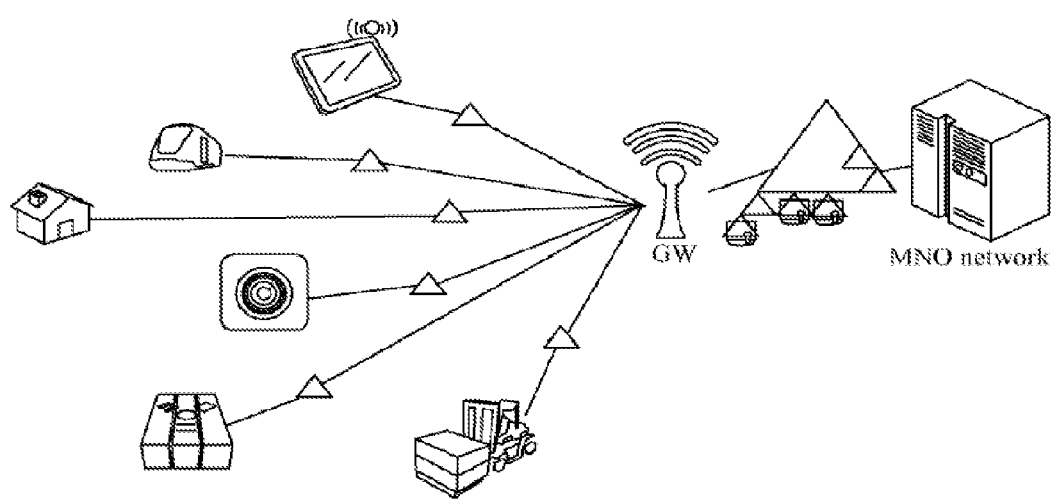
FIG. 36 shows an M2M GW grouping devices based on their type, device class, device properties, or connection profile and providing group certificates for the device validation trees.

In a further variant, the M2M GW may group connected devices based on their type, device class, device properties, or connection profile (protocol, connection network, bandwidth) and then provide group certificates for the device validation trees. This is shown in FIG. 36.

Another variant is a Peer-to-Peer approach, in which multiple M2M gateways (GW) exhibit a clustered structure, which may allow them to communicate over better links (e.g. more bandwidth, less latency, etc.). Each M2M GW has an own backhaul link to the network. However, local communication may be cheaper (e.g. via WiFi, Bluetooth, ZigBee, MBUS, etc), than using the backhaul link (e.g. 3G) which means that offloading traffic to the local network provides some benefit. The local network between the M2M GWs is referred to as Local Area Exchange Network (LAEN). All M2M GWs on the LAEN may be mutually authenticated, which allows M2M GWs to trust messages coming from other M2M GWs on the LAEN. The communication on the LAEN may be protected for integrity and authenticity. In privacy demanding scenarios, a fully encrypted LAEN may be established to provide confidentiality protection.

Figure 37:
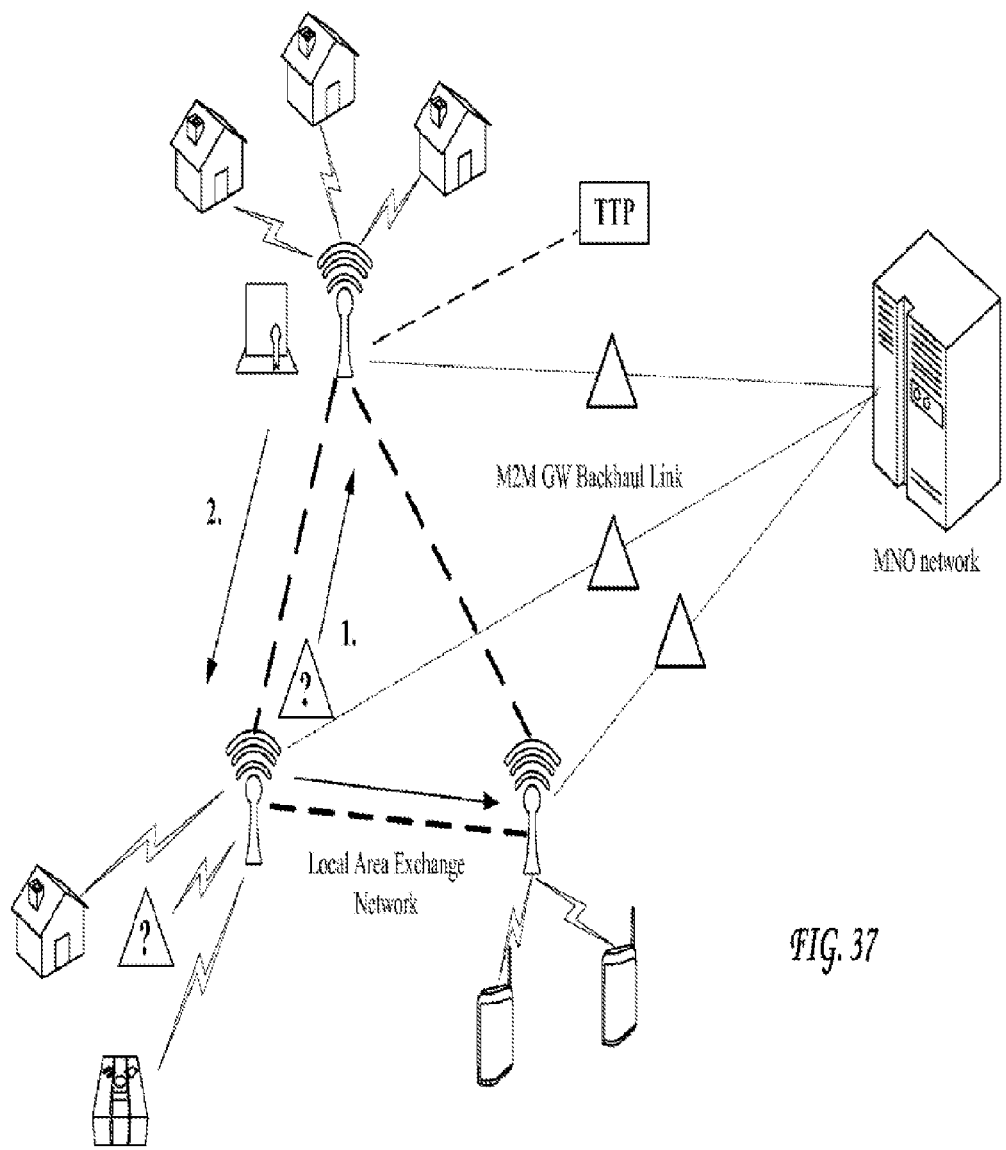
FIG. 37 shows M2M GW P2P Split Validation.

If an M2M GW is unable to certify a subtree (e.g. no TTP may be found to certify the subtree or the device is unknown to the M2M GW), the M2M GW pushes out the subtree on the LAEN (step 1 in FIG. 37), with a request message to acquire a suitable certificate. If another M2M GW is able to certify the subtree (either on its own or via a TTP, which might not be reachable or not known by the first M2M GW), the M2M GW returns the certificate to the requesting GW (step 2 in FIG. 37). The M2M GW may then integrate the certificate in its own validation tree. The M2M GW can also store the certificate (or reference values needed to create a certificate, or the address of the TTP) for future validation of connecting devices of the same device class.

The exchange of subtrees may be performed using the Tree Hash Exchange (THEX) format, which allows to exchange Merkle hash Trees. The exchange format consists of a serialized representation of the hash tree. It uses the Direct Internet Message Encapsulation (DIME) format that allows for multiple payloads, either text or binary. The Merkle Hash Tree serialization format consists of two different payloads. The first is XML encoded meta-data about the hash tree, and the second is binary serialization of the tree itself.

The localization of network entities on the LAEN, e.g. other M2M GWs, that are capable to validate a given subtree may use the Distributed Hash Table (DHT) structure to store the network address of the node on the LAEN that was capable to validate the specific device type or device class. The DHT concept, known from P2P networks, allows for a fast detection of the relevant nodes for validation. Furthermore it may be possible to store the hash table at every node in the LAEN, and update it via LAEN multicast messages between the nodes, such that every node in the LAEN may know where specific subtrees can be validated.

The concepts and methodologies developed above for split-validation and other structured validation techniques such as subtree certification, may be used not just for system validation but also for other security-related functions.

For example, in a split-authentication model for a network that comprises of the network entity NE, gateway G, and multiple devices D, it may be envisioned that the gateway G may, when it interacts with the NE so that the latter may authenticate it, include authentication information about D so that the NE could authenticate the collection of G and D at the same time. In a variant, the G could authenticate D's, and includes a report about that authentication step and results, in a message that it later sends to the convey information that is needed by the NE to authenticate the G. As described above, it may also be possible to divide the D's so that a G may authenticate versus D's that the NE may authenticate, according to several different criteria.

Similarly, other security functions such as key derivation and key management (including distribution, refreshing, and deprecation for example), authorization, and access control, may also be done in similar ways.

The techniques developed for sub-tree verification may also be used in similar ways to these other security functions.

The methods, algorithms and apparatus may be applied to any technology area including: Security/Privacy/Rights Management, Hybrid Networks, Cooperative Communications, and may be used in/at-a User Equipment (UE), wireless transmit/receive unit (WTRU), Handset, Data Card, Laptop/Netbook, Gaming Device, Infrastructure Equipment, Base Station/Node B, Femto base station, Access Point, BSC/RNC, Gateway, Application Server, System, Session Layer, Presentation Layer, Application Layer, DSP, Software, Hardware, ASIC. The methods and algorithms are also applicable to: Applications, System Information, Platform Security, overall system Security, Call Admission, Home eNode B (HeNB), HNB, Femtocells, hardware or software implementation, charging management, Subscriber Management, Policy Control, Quality of Service (Qos), Security, Trust, Ciphering, Registration/AAA etc.

Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (WTRU), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or ‾Ultra Wide Band (UWB) module.

Further work may pursue this direction and consider concrete architectures for platform validation with tree-formed verification and validation data—what is called tree-formed validation (TFV). One conceivable option is to efficiently organize a database of reference trees by an SCA and/or a validator in a way that allows for the modular building using subtrees of known component substructures, e.g., dependent programs loaded in sequence, or components with uniform associated security policies. Architectures and methods for subtree discovery, expression of dependencies between validated platform components, and management (updates, remediation) of platforms according to results of TFV are subjects of ongoing research.

Figure 38:
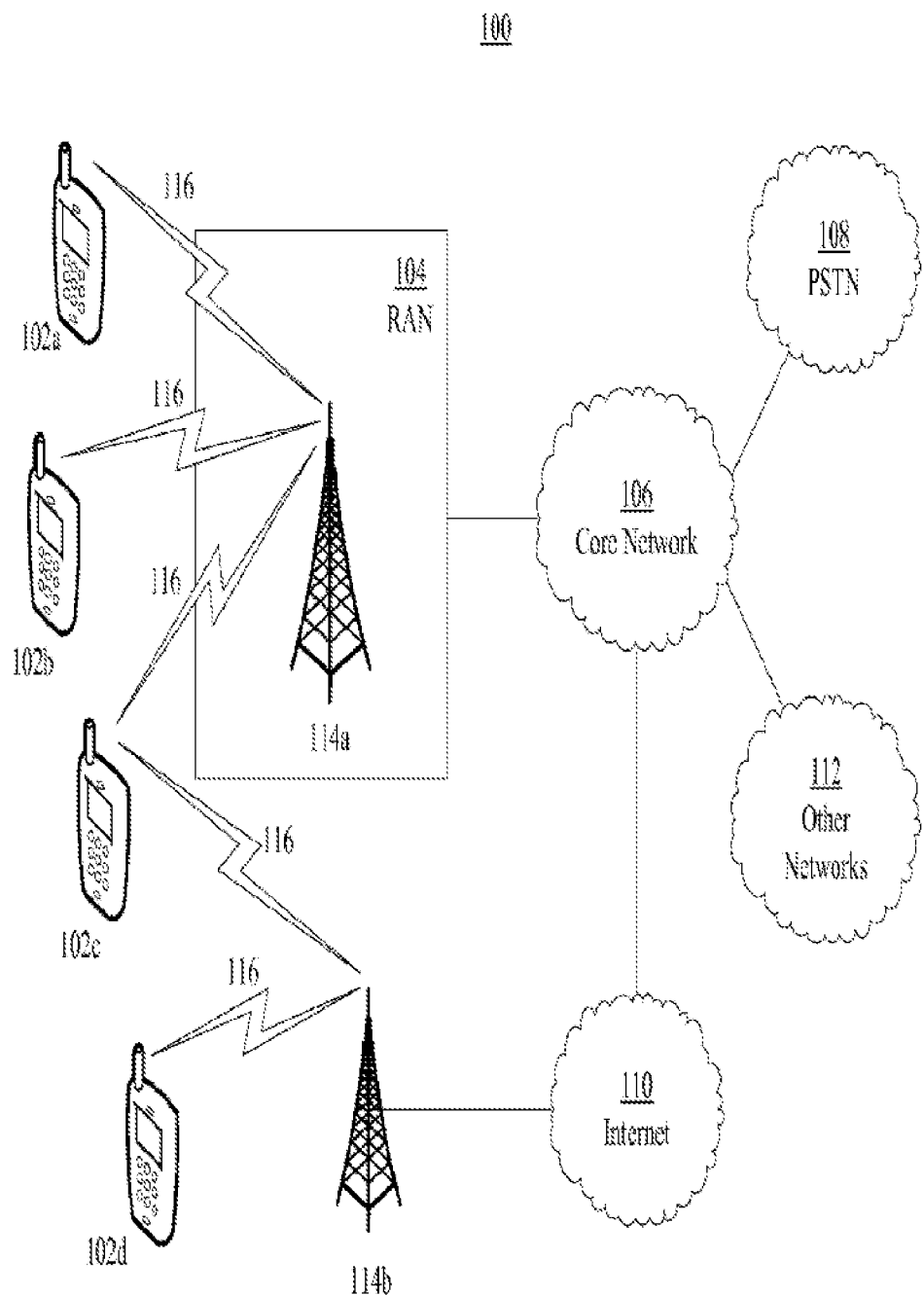
FIG. 38 is a system diagram of an example communications system in which one or more disclosed embodiments may be implemented.
Figure 39:
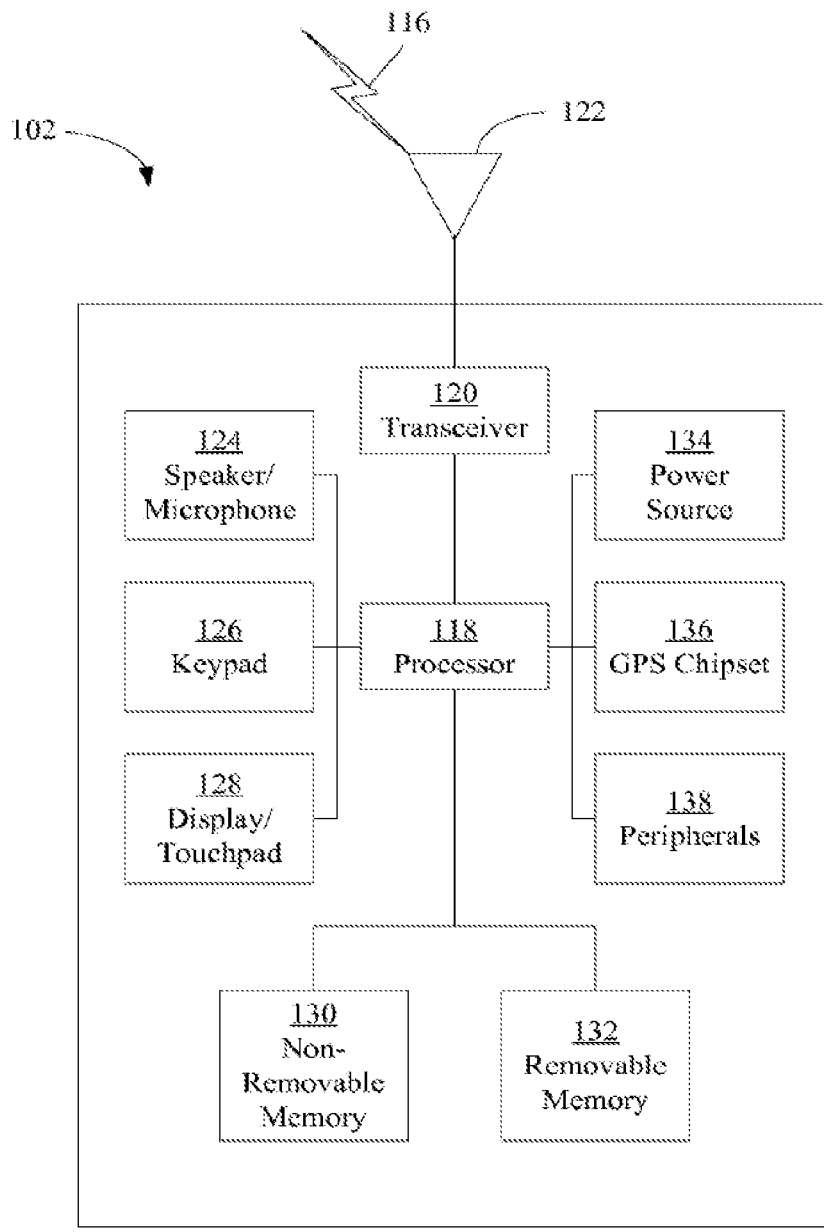
FIG. 39 is a system diagram of an example wireless transmit/receive unit (WTRU) that may be used within the communications system illustrated in FIG. 38.
Figure 40:
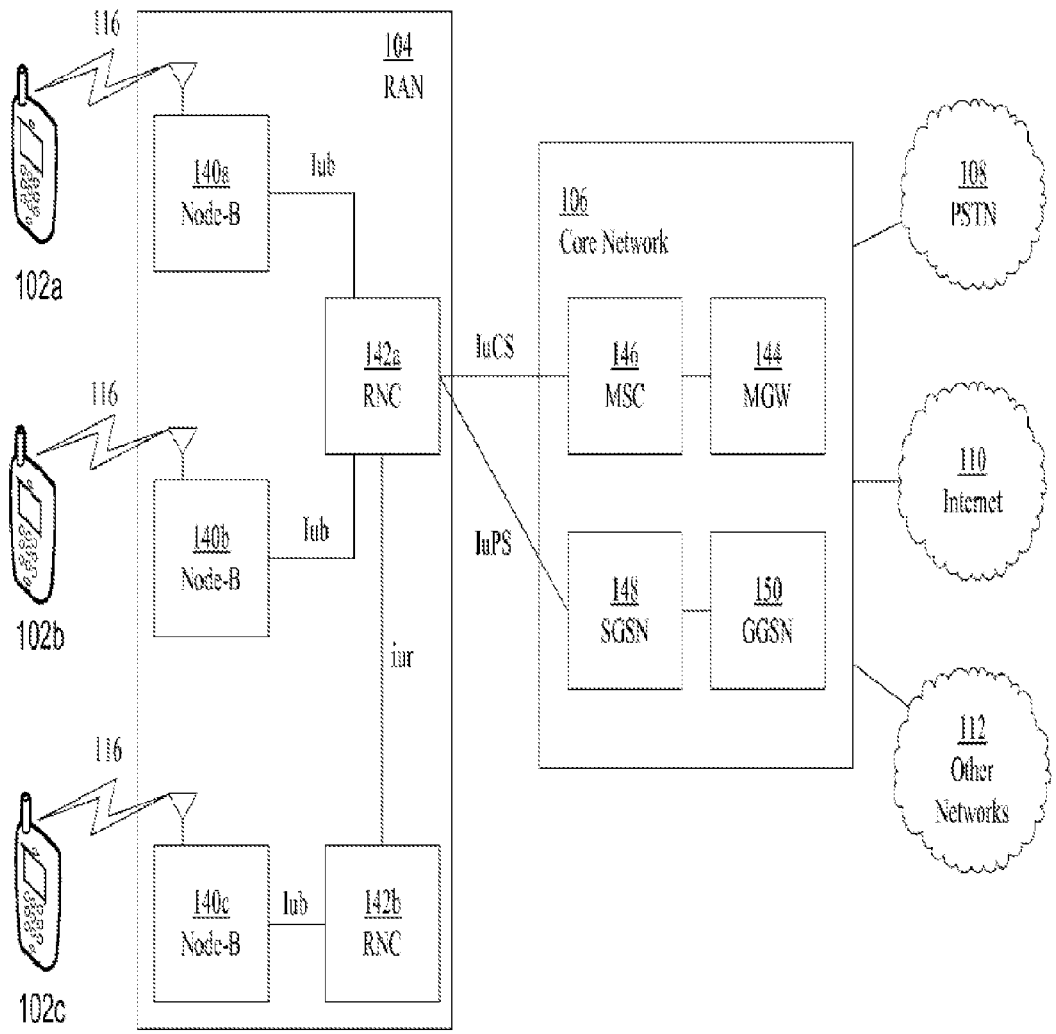
FIG. 40 is a system diagram of an example radio access network and an example core network that may be used within the communications system illustrated in FIG. 38.

The systems, methods, and apparatus described herein may be implemented in a communication system, such as the communication system described below, and as illustrated in FIGS. 38, 39, and 40.

FIG. 38 is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 38, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 38 may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet an embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 38, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 38, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 38 may be configured to communicate with the base station 114a, which may employ a cellular-based radio technology, and with the base station 114b, which may employ an IEEE 802 radio technology.

FIG. 39 is a system diagram of an example WTRU 102. As shown in FIG. 39, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 39 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 39 as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

What is claimed:

1. In a gateway device comprising one or more components and having a secure environment, wherein a client device connects to the gateway device and may use the gateway device to connect to a service through the gateway device, a method for generating verification data that can be used for validation of the gateway device and the connected client device, the method comprising:
    obtaining, for each of a plurality of components of the gateway device, a value representing a measurement of the component of the gateway device;
    generating a measurement log (ML) containing a record of the component measurement values;
    generating verification data from the component measurement values for each component and storing the verification data in one or more secure registers within the secure environment of the gateway device;
    organizing the verification data and the ML into a tree structure, wherein the secure registers containing the verification data define the roots of the tree structure, the ML defines inner nodes of the tree structure, and the measurement values contained in the ML define leaves of the tree structure; and
    collecting component measurement values and verification data from the connected client device and integrating the measurement values and verification data from the connected client device into the tree structure of the gateway device as a subtree of the tree structure.

2. The method recited in claim 1, wherein the tree structure is formed using a secure extend operation of the secure environment.

3. The method recited in claim 1, further comprising:
    contacting a trusted third party and receiving from the trusted third party a certificate issued by the trusted third party for the subtree; and
    updating the tree structure of the gateway device to incorporate the received certificate into the tree structure.

4. The method recited in claim 3, wherein the trusted third party comprises an application running inside of the secure environment of the gateway device.

5. The method recited in claim 3, further comprising:
    sending the updated tree structure to a service which the connected client device is attempting to access via the gateway, so that the service can validate the trustworthiness of the gateway device and the connected device.

6. A gateway device comprising one or more components and having a secure environment, wherein a client device connects to the gateway device and may use the gateway device to connect to a service through the gateway device, the gateway device configured to:
    obtain, for each of a plurality of components of the gateway device, a value representing a measurement of the component of the gateway device;
    generate a measurement log (ML) containing a record of the component measurement values;
    generate verification data from the component measurement values for each component and store the verification data in one or more secure registers within the secure environment of the gateway device;
    organize the verification data and the ML into a tree structure, wherein the secure registers containing the verification data define the roots of the tree structure, the ML defines inner nodes of the tree structure, and the measurement values contained in the ML define leaves of the tree structure; and
    collect component measurement values and verification data from the connected client device and integrate the measurement values and verification data from the connected client device into the tree structure of the gateway device as a subtree of the tree structure.

7. The gateway device recited in claim 6, wherein the tree structure is formed using a secure extend operation of the secure environment.

8. The gateway device recited in claim 6, wherein the gateway device is further configured to:
    contact a trusted third party and receive from the trusted third party a certificate issued by the trusted third party for the subtree; and
    update the tree structure of the gateway device to incorporate the received certificate into the tree structure.

9. The gateway device recited in claim 8, wherein the trusted third party comprises an application running inside of the secure environment of the gateway device.

10. The gateway device recited in claim 8, wherein the gateway device is further configured to:
    send the updated tree structure to a service which the connected client device is attempting to access via the gateway, so that the service can validate the trustworthiness of the gateway device and the connected device.

* * * * *